US012682304B2

(12) United States Patent
Lobell et al.

(10) Patent No.: US 12,682,304 B2
(45) Date of Patent: Jul. 14, 2026

(54) COMPUTER SYSTEM WITH ECONOMIC DEVELOPMENT DECISION SUPPORT PLATFORM AND METHOD OF USE THEREOF

(71) Applicant: Atlas AI P.B.C., Palo Alto, CA (US)

(72) Inventors: David Lobell, Stanford, CA (US); Marshall Burke, Menlo Park, CA (US); Stefano Ermon, Menlo Park, CA (US); George Azzari, Ladera Ranch, CA (US); Abraham Tarapani, San Rafael, CA (US); Anthony Perez, Sunnyvale, CA (US); Gabriel Cadamuro, Vancouver (CA); Sarah Ciresi, Seattle, WA (US); Deven Desai, Irvine, CA (US)

(73) Assignee: Atlas AI P.B.C., Palo Alto, CA (US)

( * ) Notice: Subject to any disclaimer, the term of this patent is extended or adjusted under 35 U.S.C. 154(b) by 219 days.

(21) Appl. No.: 18/228,853

(22) Filed: Aug. 1, 2023

(65) Prior Publication Data

US 2023/0385738 A1 Nov. 30, 2023

Related U.S. Application Data

(63) Continuation of application No. PCT/US2022/014941, filed on Feb. 2, 2022.
(Continued)

(51) Int. Cl.
*G06Q 10/0637* (2023.01)
(52) U.S. Cl.
CPC ................................ *G06Q 10/0637* (2013.01)
(58) Field of Classification Search
CPC ... G06Q 10/0637; G06Q 50/165; G06N 20/00
(Continued)

(56) References Cited

U.S. PATENT DOCUMENTS 9,600,146 B2 * 3/2017 Cervelli ................ G06F 3/0482
9,684,727 B1 6/2017 Katragadda et al.
(Continued)

FOREIGN PATENT DOCUMENTS

WO WO-2009134981 A2 * 11/2009 .......... G06Q 10/107
WO WO-2017171734 A1 * 10/2017 ....... G06Q 10/06313
(Continued)

OTHER PUBLICATIONS

A. G. Billé "Modelling spatial regimes in farms technologies", Apr. 2018, Journal of Productivity Analysis 49:173-185 (Year: 2018).*
(Continued)

*Primary Examiner* — Romain Jeanty
(74) *Attorney, Agent, or Firm* — RMCK Law Group PLC

(57) ABSTRACT

The present disclosure provides computer-implemented systems, platforms and methods that support decisions related to investments in infrastructure and other assets intended to promote economic development. A geographical region is selected. Historical observations taken over a predefined timeframe associated with image and survey data for the geographical region are received. The historical observations are stored. A first categorical model is generated. The first categorical model has a first geospatial dataset related to one of economic, agricultural and infrastructure information based on the historical observations. A navigation map is generated that displays the first categorical model across the geographical region. An existing market summary is generated that reflects first statistics related to existing markets. A proposed market summary is generated that reflects second statistics related to proposed future markets in regions of interest. Comparisons are generated that illustrate projected differences in existing market results with projected results in proposed future markets.

30 Claims, 51 Drawing Sheets

Related U.S. Application Data

(60) Provisional application No. 63/292,092, filed on Dec. 21, 2021, provisional application No. 63/234,417, filed on Aug. 18, 2021, provisional application No. 63/145,284, filed on Feb. 3, 2021.

(58) Field of Classification Search
USPC ........................................................ 705/7.36
See application file for complete search history.

(56) References Cited

U.S. PATENT DOCUMENTS

| | | |
|---|---|---|
| 2006/0253481 A1 | 11/2006 | Guido et al. |
| 2009/0048884 A1 | 2/2009 | Olives et al. |
| 2009/0157465 A1* | 6/2009 | Heathfield ......... G06Q 10/0637 |
| | | 705/7.36 |
| 2011/0161137 A1 | 6/2011 | Ubalde et al. |
| 2012/0095802 A1* | 4/2012 | Wilberding ........ G06Q 10/0635 |
| | | 705/7.28 |
| 2013/0226667 A1* | 8/2013 | Terrazas ............. G06Q 30/0205 |
| | | 705/7.34 |
| 2014/0270524 A1* | 9/2014 | Diamond ........... H04N 1/00209 |
| | | 382/170 |
| 2016/0048556 A1 | 2/2016 | Kelly et al. |
| 2016/0179994 A1 | 6/2016 | Levine et al. |
| 2017/0052655 A1 | 2/2017 | Cervelli et al. |
| 2017/0091627 A1 | 3/2017 | Terrazas et al. |
| 2017/0103339 A1 | 4/2017 | Pandit et al. |
| 2017/0371897 A1 | 12/2017 | Strong et al. |
| 2018/0121576 A1 | 5/2018 | Mosher et al. |
| 2019/0102714 A1 | 4/2019 | Albert et al. |
| 2019/0138995 A1 | 5/2019 | Currin et al. |
| 2019/0303773 A1 | 10/2019 | Kuan et al. |
| 2019/0311146 A1 | 10/2019 | Garcia et al. |
| 2020/0160200 A1 | 5/2020 | Newman et al. |

FOREIGN PATENT DOCUMENTS

| | | |
|---|---|---|
| WO | 2020106720 A1 | 5/2020 |
| WO | 2020120301 A1 | 6/2020 |
| WO | 2020204732 A1 | 10/2020 |
| WO | 2021007352 A1 | 1/2021 |

OTHER PUBLICATIONS

Magid Al-Araki "Method and Concepts of Growth and Development", Dec. 2014, A Forerunner of Modern Sociology , pp. 1-166 (Year: 2014).*

Marcos et al Non-linearities in regional growth: Anon-parametric approach, Nov. 2015 , Papers in Regional Science, vol. 94, pp. 20-38 (Year: 2015).*

Extended European Search Report for EP Application No. 22750326.5 mailed Nov. 4, 2024.

Al-Darwish et al., "Predicting the future urban growth and it's impacts on the surrounding environment using urban simulation models: Case study of IBB city-Yemen" Alexandria Engineering Journal, Dec. 2018.

International Search Report and Written Opinion for International Application No. PCT/US2022/014941 mailed Jun. 16, 2022, 31 pages.

Min et al., "Light Every-Night—New nighttime light data set and tools for development" World Bank Blogs, Jan. 21, 2021.

Santhanavanich, "How to Download Dataset from OpenStreetMap" Towards Data Science, Apr. 20, 2020.

Yeh et al., "Using publicly available satellite imagery and deep learning to understand economic well-being in Africa", Nature Communications, May 22, 2020.

* cited by examiner

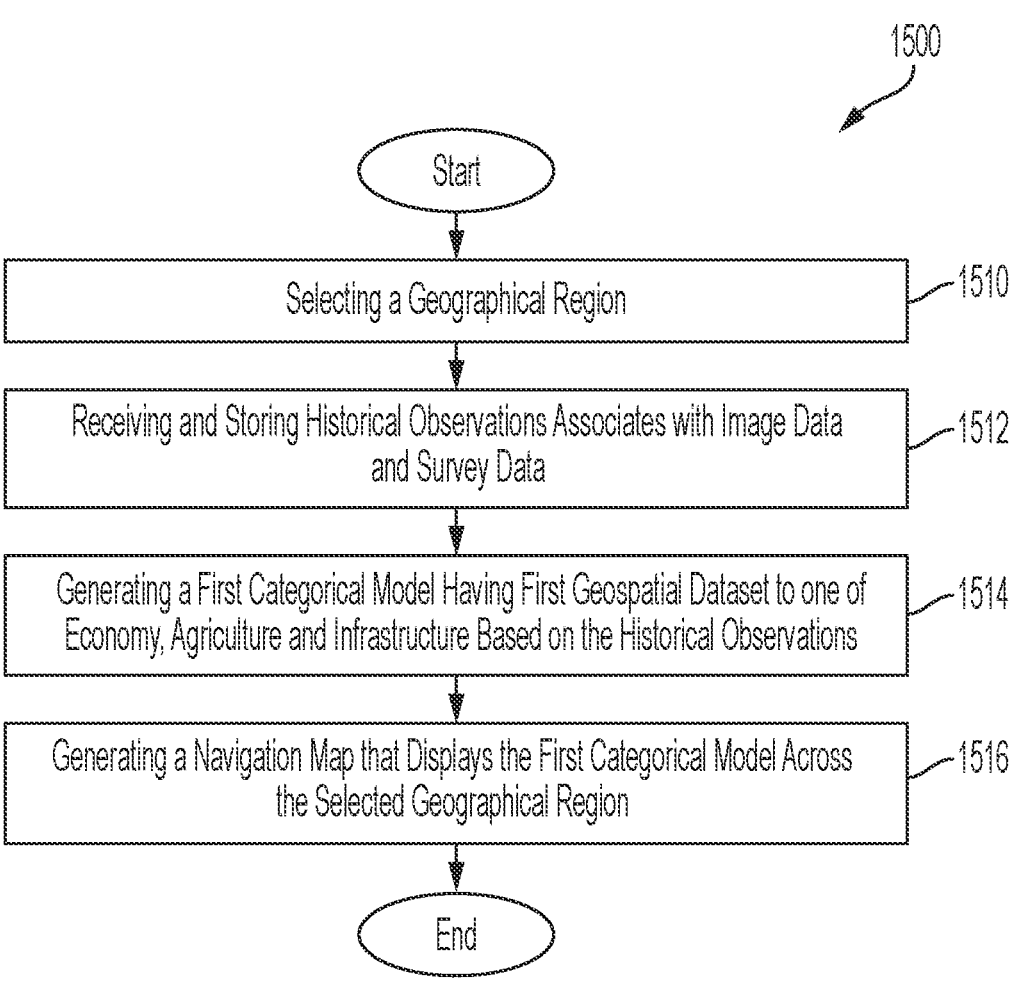

1500

Start

Selecting a Geographical Region ⟋1510

Receiving and Storing Historical Observations Associates with Image Data and Survey Data ⟋1512

Generating a First Categorical Model Having First Geospatial Dataset to one of Economy, Agriculture and Infrastructure Based on the Historical Observations ⟋1514

Generating a Navigation Map that Displays the First Categorical Model Across the Selected Geographical Region ⟋1516

End

FIG. 17

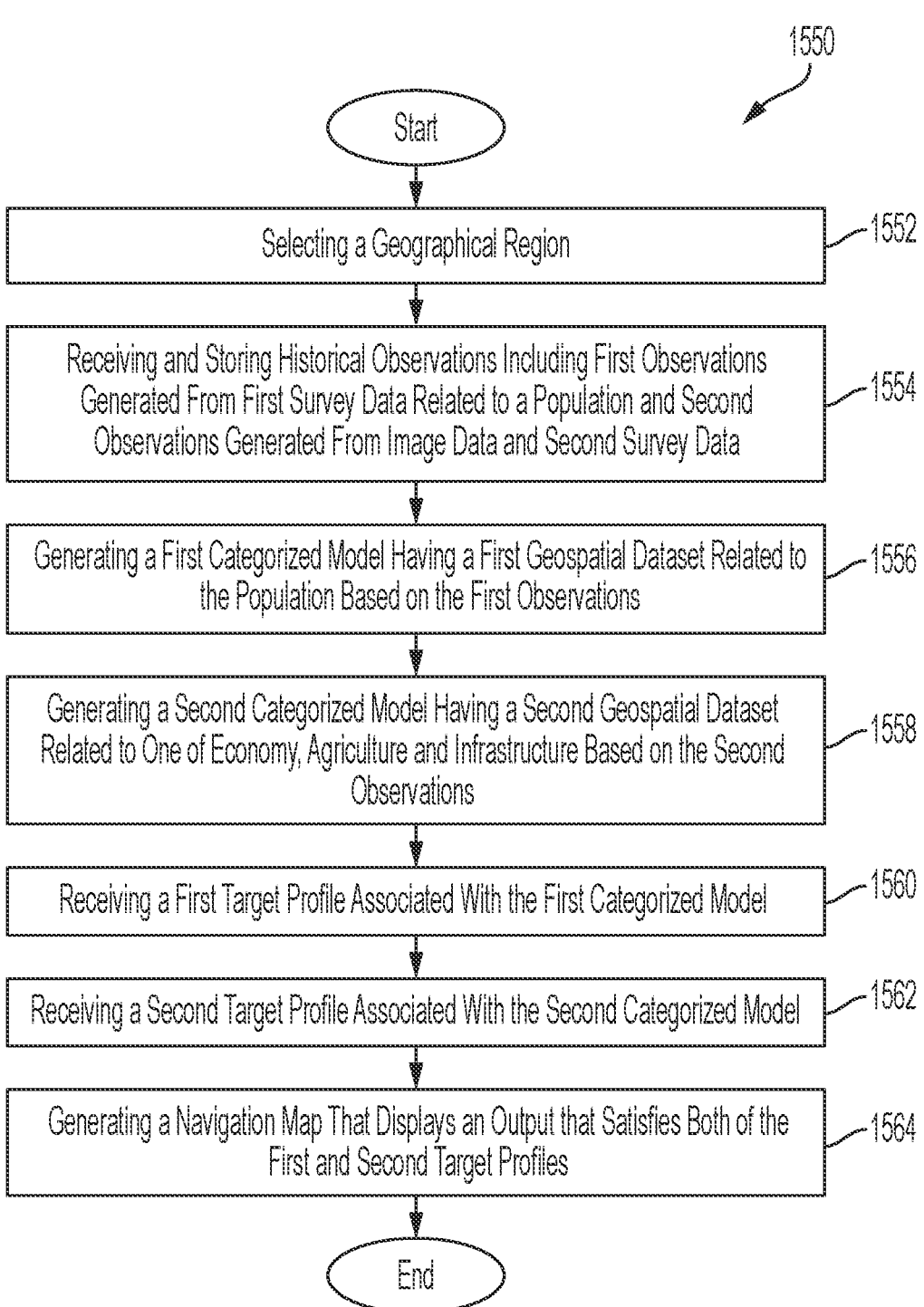

1550

Start

Selecting a Geographical Region ⌐1552

Receiving and Storing Historical Observations Including First Observations Generated From First Survey Data Related to a Population and Second Observations Generated From Image Data and Second Survey Data ⌐1554

Generating a First Categorized Model Having a First Geospatial Dataset Related to the Population Based on the First Observations ⌐1556

Generating a Second Categorized Model Having a Second Geospatial Dataset Related to One of Economy, Agriculture and Infrastructure Based on the Second Observations ⌐1558

Receiving a First Target Profile Associated With the First Categorized Model ⌐1560

Receiving a Second Target Profile Associated With the Second Categorized Model ⌐1562

Generating a Navigation Map That Displays an Output that Satisfies Both of the First and Second Target Profiles ⌐1564

End

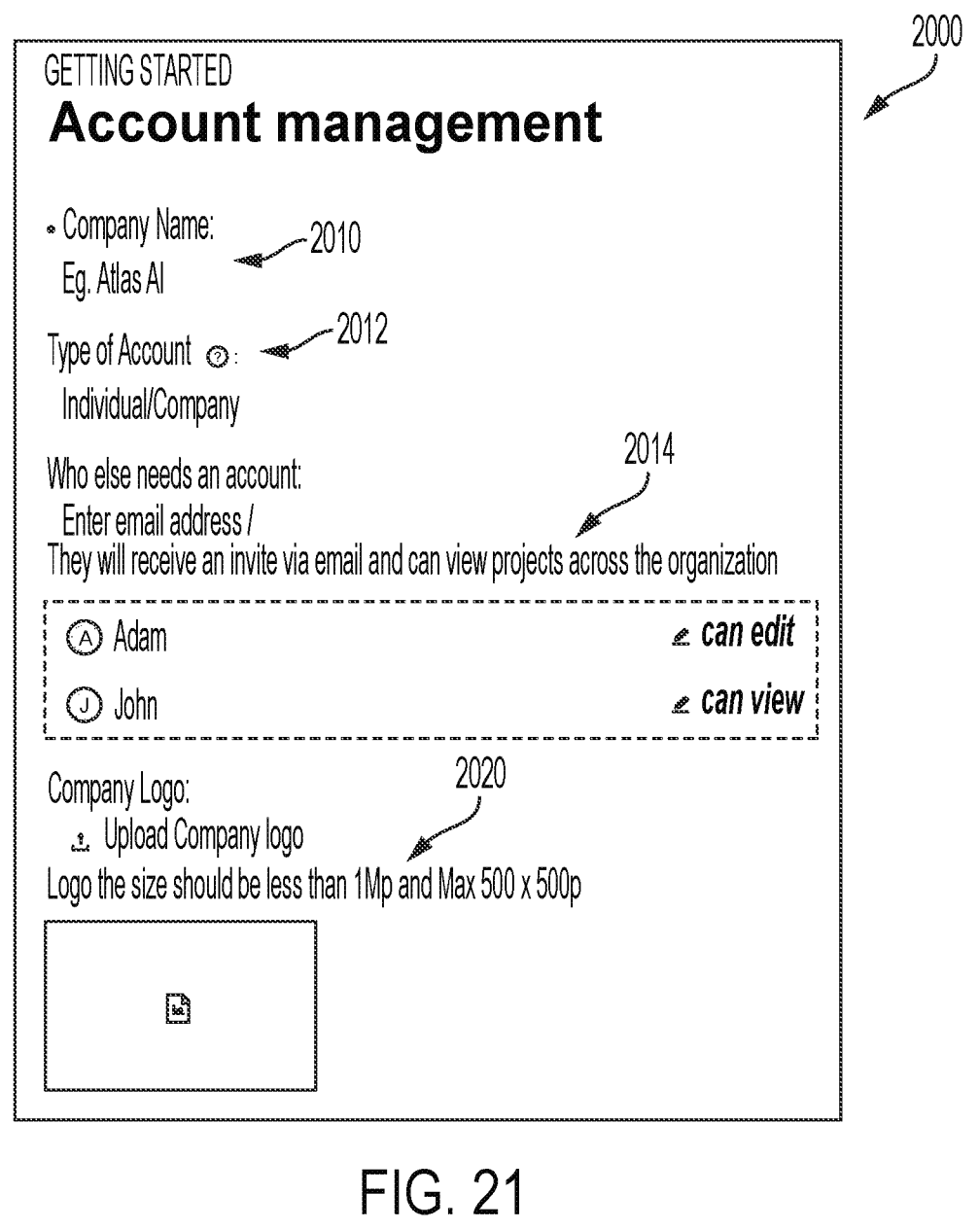

GETTING STARTED

Account management

○ Company Name:    ～2010

Eg. Atlas AI

Type of Account ⊙:    ～2012

Individual/Company

Who else needs an account:      2014

Enter email address /

They will receive an invite via email and can view projects across the organization Ⓐ Adam                         ✍ *can edit*

Ⓙ John                           ✍ *can view*

Company Logo:      2020

↥ Upload Company logo

Logo the size should be less than 1Mp and Max 500 x 500p

FIG. 21

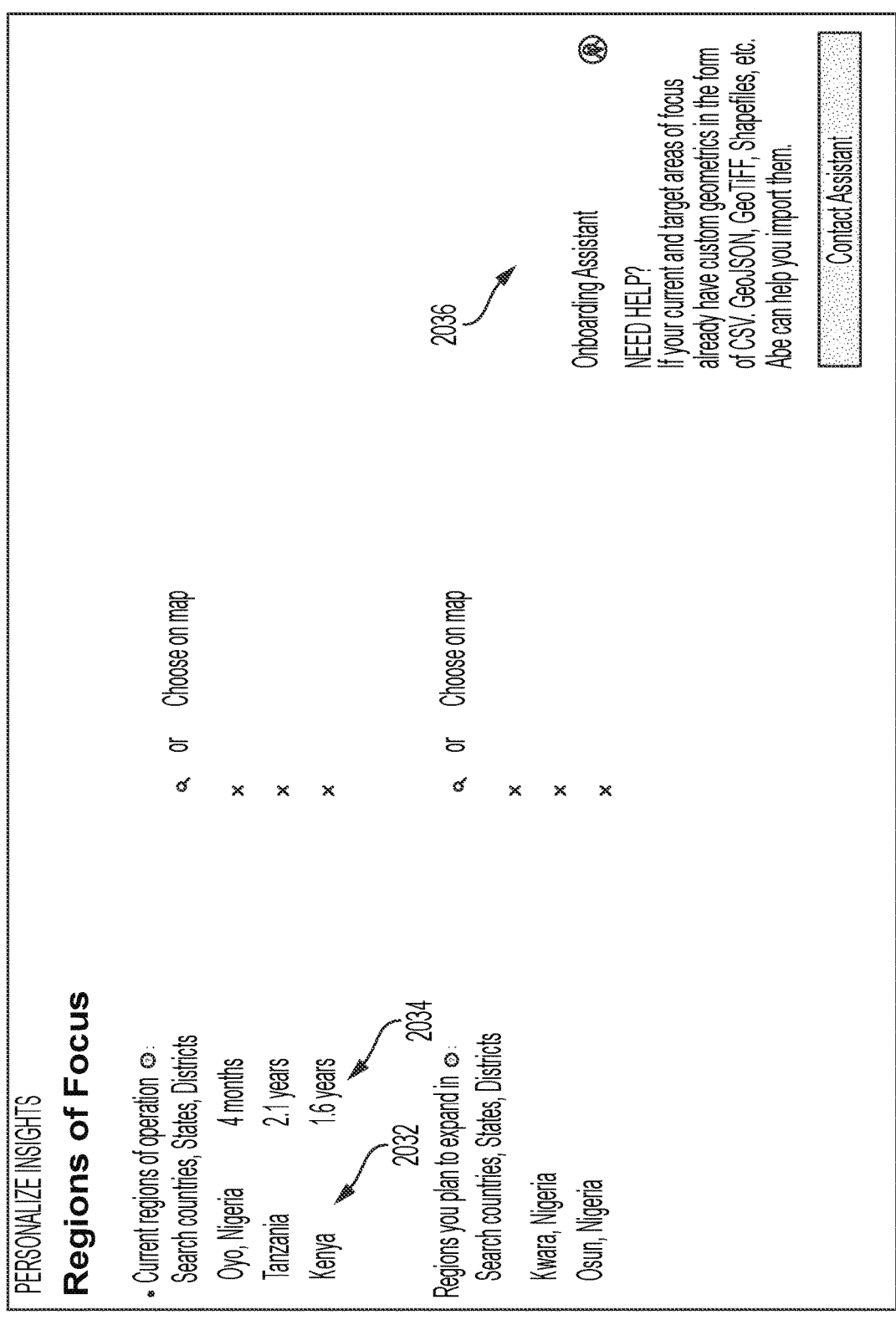

PERSONALIZE INSIGHTS

Regions of Focus

• Current regions of operation ⊙:

Search countries, States, Districts          or     Choose on map

Oyo, Nigeria      4 months

Tanzania          2.1 years

Kenya             1.6 years 2032        2034

Regions you plan to expand in ⊙:

Search countries, States, Districts          or     Choose on map

Kwara, Nigeria

Osun, Nigeria

2036

Onboarding Assistant

NEED HELP?
If your current and target areas of focus
already have custom geometrics in the form
of CSV, GeoJSON, GeoTIFF, Shapefiles, etc.
Abe can help you import them.

Contact Assistant

Figure 23B:
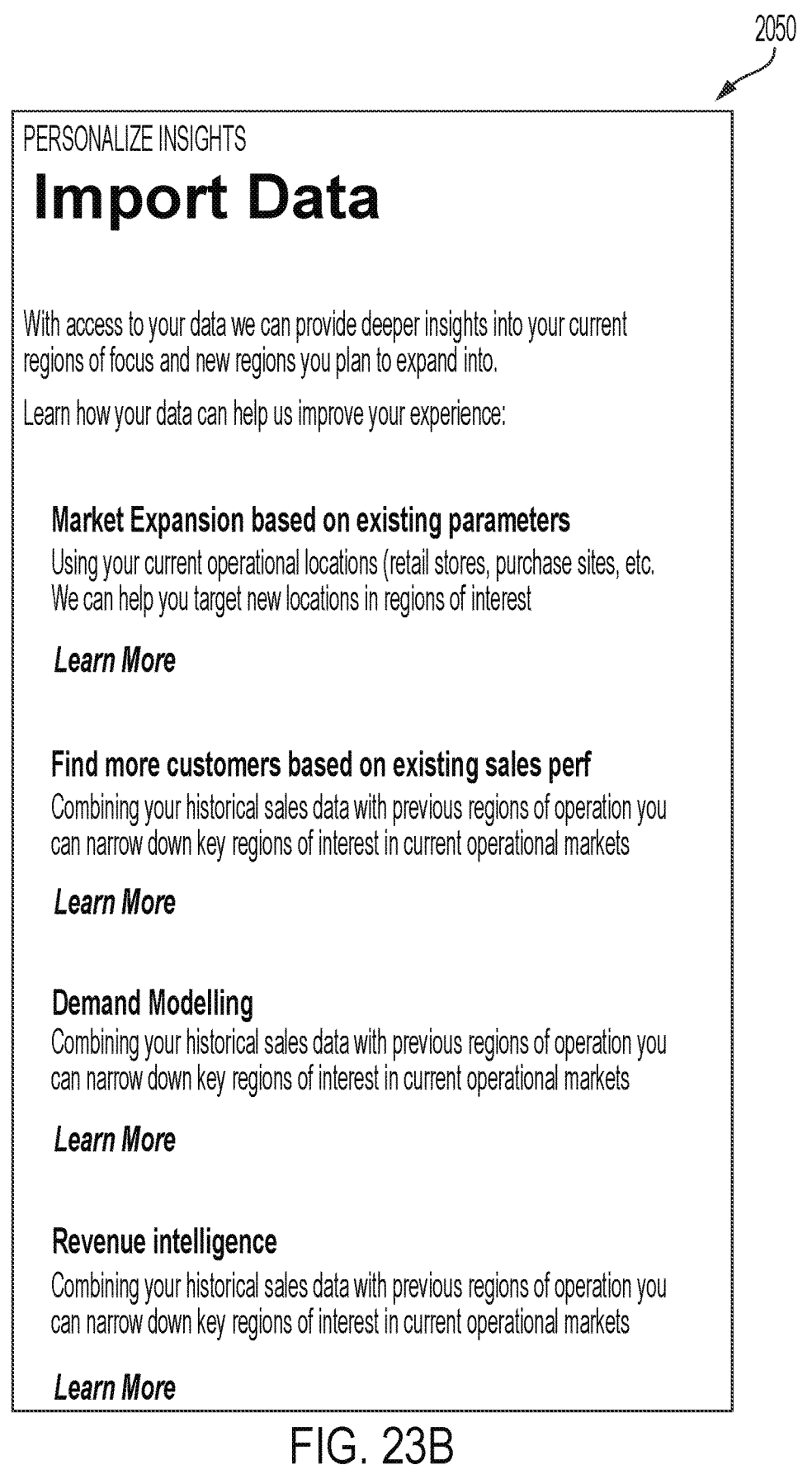

PERSONALIZE INSIGHTS

Import Data

With access to your data we can provide deeper insights into your current regions of focus and new regions you plan to expand into.

Learn how your data can help us improve your experience:

Market Expansion based on existing parameters

Using your current operational locations (retail stores, purchase sites, etc. We can help you target new locations in regions of interest

*Learn More*

Find more customers based on existing sales perf

Combining your historical sales data with previous regions of operation you can narrow down key regions of interest in current operational markets

*Learn More*

Demand Modelling

Combining your historical sales data with previous regions of operation you can narrow down key regions of interest in current operational markets

*Learn More*

Revenue intelligence

Combining your historical sales data with previous regions of operation you can narrow down key regions of interest in current operational markets

*Learn More*

Create a New Project

Regions        Metrics        Name

2082

Project Title

New Markets, Kenya Q4 2021

2084

Add details, notes (optional)

Eg: Expanding our markets with the same ferocity of the great Chinggis Khan

2086

Add Collaborators (optional)

Enter email, name                                    🔍

◯   John User johnuser@email.com

Back                                        Create Project

↩ Share    ⬇ Download Data

Cluster 9

| Highest spending power | Highest Population |

Highlights

| Total Area | 118,809 Km2 |
| Total Population | 114,200,000 |
| Spending power per capita | $ 6 |
| Asset Wealth | 76% |
| Population Density | 2081 |

Site List
8 locations in the cluster

| Export locations to CSV |

Township

| City 1 | View Details > |
| City 2 | View Details > |
| Town 1 | View Details > |
| Town 2 | View Details > |
| Town 3 | View Details > |
| City 3 | View Details > |
| Town 4 | View Details > |
| Town 5 | View Details > |

Field Notes

Scenario 4                                    ↧ Download Data | Begin in-field validation

2510

Highlights | 9 Clusters

| | |
|---|---|
| Total Area | 118,809 Km2 |
| Total Population | 114,200,000 |
| Spending power per capita | $ 5.5 |
| Asset Wealth | 56% |
| Population Density | 228 |

2500

Cluster Details          View data with map

| Township | Cluster | ▷🏴 | Total Population ◁▷ | Population Density ◁▷ | Asset Wealth ◁▷ | Spending power |
|---|---|---|---|---|---|---|
| ☐ City 1 | Cluster 1 | | 23,000 | 258 | 57th | $2.7 |
| ☐ Town 1 | Cluster 2 | | 17,000 | 302 | 30th | $3.1 |
| ☐ City 2 | Cluster 3 | | 11,000 | 740 | 27th | $4.5 |
| ☐ City 5 | Cluster 3 | | 16,0000 | 749 | 48th | $2.8 |
| ☐ Town 3 | Cluster 4 | | 26,500 | 934 | 51th | $3.1 |
| ☐ City 1 | Cluster 5 | | 18,000 | 1056 | 73th | $4.2 |
| ☐ City 7 | Cluster 5 | | 11,000 | 2003 | 63th | $4.7 |
| ☐ Town 1 | Cluster 6 | | 27,000 | 5000 | 57th | $2.9 |
| ☐ Town 8 | Cluster 8 | | 14,0000 | 8405 | 72th | $5.6 |
| ☐ Town 11 | Cluster 9 | | 32,000 | 10328 | 81th | $6.1 |
| ☐ Town 18 | Cluster 9 | | 23,000 | 8203 | 64th | $6.0 |
| ☐ Town 7 | Cluster 9 | | 58,000 | 32000 | 83th | $5.7 |

COMPUTER SYSTEM WITH ECONOMIC DEVELOPMENT DECISION SUPPORT PLATFORM AND METHOD OF USE THEREOF

CROSS-REFERENCE TO RELATED APPLICATIONS

This application is a continuation of International Application No. PCT/US2022/014941 filed Feb. 2, 2022, which claims the benefit of U.S. Provisional Patent Application Ser. No. 63/145,284 filed Feb. 3, 2021; U.S. Provisional Patent Application Ser. No. 63/234,417, filed Aug. 18, 2021; and U.S. Provisional Patent Application Ser. No. 63/292,092 filed Dec. 21, 2021. The above applications are hereby incorporated by reference as if fully set forth herein in their entirety.

TECHNICAL FIELD

The present disclosure relates generally to computer systems and computer-implemented methods for a decision support platform and, more particularly, to a computer system and related method that supports decisions related to investments in infrastructure and other assets intended to promote economic development.

BACKGROUND

Large amounts of resources are allocated each year to advance economic development in emerging markets without reliable understanding about whether investments will in fact achieve desired goals. To this end, significant amounts of money and time are often used to construct and develop certain infrastructure or other assets without sound reasoning as to what assets should be provided at what locations, and with what timing, in order to most effectively accomplish development goals. In particular, governments, NGOs, and other non-profit and for-profit organizations are frequently interested in operating and investing in certain countries or regions to advance business, sustainability, philanthropic and other outcomes. However, the organizations frequently lack analytical support to identify what combinations and sequences of assets and geographic locations are best suited to achieve these outcomes.

When focused on sustainable development, decisions are often made without data, with sparse or inaccurate data, or with data of highly variable quality or granularity. Data quality, type and availability may vary greatly from region-to-region, or within a region. For example, ground-level survey data about economic conditions or demographic attributes may be available only for particular points in time, making it very difficult to understand how conditions and attributes progress between collection times, while other data sets, such as satellite image data, may provide uncertain information, as images can be too difficult and/or too voluminous for humans to interpret. With the emergence of technology infrastructure, such as satellite networks, fixed and mobile communications networks, mobile and Internet of Things devices armed with sensors and cameras, and others, diverse new data streams have emerged that offer opportunities to fill gaps and enrich insight about the extent and progression of economic development at a much more granular level than previously possible; however, these heterogeneous and numerous data types present challenges as well, as human analysts cannot possibly absorb the volumes of data now available, inputs can be very difficult to interpret, and complex data integration challenges are presented by data of different type, time-scale, and other attributes. These data challenges can undermine the ability to target resources, develop policies and track accountability. Thus, a need still remains for a computer system and method that can process heterogeneous underlying data types in order to generate and display historical, current and/or projected information related to demographic, economic and infrastructure conditions across applicable regions by location and by time period. Further, a need exists for a computer system and method that can support discovering and forecasting what combinations and sequences of investments and geographical locations are most likely to present the highest likelihoods of success for future economic development, such as where particular types of infrastructure investment are most likely to have the greatest impact. In view of increasing competitive pressures and increasing demand for better resource management, it is increasingly critical that solutions be found to these challenges.

SUMMARY

The present disclosure provides computer-implemented systems, platforms and methods that support decisions related to investments in infrastructure and other assets intended to promote economic development. In embodiments, provided herein are computer systems and methods that can process heterogeneous underlying data types in order to generate and display historical, current and/or projected information related to demographic, economic and infrastructure conditions across applicable regions by location and by time period. Further provided herein are computer systems and methods that can support discovering and forecasting what combinations and sequences of investments and geographical locations are most likely to present the highest likelihoods of success for future economic development. In embodiments, such systems and methods provide insight as to where particular types of infrastructure investment are most likely to have the greatest impact. In additional features, such systems and methods generate existing market summaries that reflect first statistics related to existing markets based on user input data. A proposed market summary is generated that reflects second statistics related to proposed future markets in regions of interest. Comparisons are generated for illustrating the first statistics realized in existing markets with projected second statistics associated with proposed future regions of interest.

In embodiments, a geographical region is selected. Historical observations taken over a predefined timeframe associated with image data and survey data for the geographical region are received. The historical observations are stored. A first categorical model is generated. The first categorical model has a first geospatial dataset related to one or more of a set of economic activities, a set of infrastructure assets and a set of natural factors based on the historical observations. A navigation map is generated. The navigation map displays the first categorical model across the selected geographical region. The set of economic activities and data related thereto may include production activities, consumption activities, sales activities, purchasing activities, agricultural activities, food distribution activities, resource extraction and management activities, forestry activities, market activities, and many others as described throughout this disclosure and in the documents incorporated by reference herein, as well as ones that would be understood by those skilled in the art, including various measures of macroeconomic or microeconomic activities maintained by entities that report on economic activity of nations, businesses, individuals and others, such as gross domestic product, employment, consumption, inflation, price indices and the like. The set of infrastructure assets may include, among many others, water infrastructure assets (such as wells, water storage tanks, reservoirs, canals, and others), energy infrastructure (such as solar power assets, electrical grid assets, and many others), network infrastructure (such as wired or wireless networks), agricultural infrastructure (such as fields, silos, storage facilities, barns, farm equipment, and many others), housing infrastructure (such as huts, shelters, homes, multi-tenant dwellings and others), commercial infrastructure (such as commercial buildings, marketplaces, storage facilities, and others), transportation infrastructure (such as roadways, bridges, tunnels, parking lots, depots, stations, railways, waterways and many others), extraction resources (such as mines, wells, drilling facilities, fracking facilities, and many others) and many others as described throughout this disclosure and in the documents incorporated by reference herein, as well as ones that would be understood by those skilled in the art. The set of natural factors may include natural resources of various types, such as water resources (such as ponds, lakes, rivers, seas, oceans, and others, as well as indicators of rainfall and other water sources), land resources (including arable land, forested land, land suitable for habitation, and many others), extraction resources (such as mineral deposits, mines, rock formations, quarries, natural gas repositories, and many others) and many others as described throughout this disclosure and in the documents incorporated by reference herein, as well as ones that would be understood by those skilled in the art. The set of natural factors may also include geological, weather (e.g., wind, sunlight, snowfall, snow cover), natural disaster risk (flood, drought, heat wave, sandstorm, dust-storm, landslide, earthquake, tsunami, cyclone, hurricane, tornado and others), climate and other factors and many others as described throughout this disclosure and in the documents incorporated by reference herein, as well as ones that would be understood by those skilled in the art.

In one arrangement, the image data, such as satellite image data, and a set of survey data are compiled such that the image data and the survey data collectively produce a unique geospatial dataset related to the economy of an area represented by the survey data and the image data. In another arrangement, the image data and the survey data are compiled such that the image data and the survey data collectively produce a unique geospatial dataset related to agriculture. In another arrangement, the image data and the survey data are compiled such that the image data and the survey data collectively produce a unique geospatial dataset related to infrastructure. In one example, the image data and the survey data are compiled such that the image data and the survey data collectively produce unique geospatial datasets related to two of the three: the economy, the agriculture and the infrastructure of certain areas.

In one example, a second categorical model is generated having a second geospatial dataset. The second geospatial dataset relates to another combination of economic, agricultural and infrastructure information based on the historical observations. The navigation map can display the first and second categorical models across the selected geographical region.

According to additional features, a first threshold criteria related to the first categorical model is received. A second threshold criteria related to the second categorical model is received. The navigation map can include a filtered map that satisfies both the first and second threshold criteria across the selected geographical region.

According to other features, the image data and the survey data collectively produce datasets related to each of or combinations of economic and natural resources infrastructure information. A third categorical model having a third geospatial dataset is generated. The third categorical model relates to the remainder of economic, natural resource and infrastructure information based on the historical observations. The first, second and third categorical models are displayed across the selected geographical region. A third threshold criteria related to the third categorical model can be received. The filtered map further satisfies the third criteria across the selected geographical region.

According to additional features, the predetermined timeframe collectively includes a first range of time from a first date to a second date, a second range of time from the second date to a third date, and a third range of time from the third date to a fourth date. The first, second and third dates are sequential. The historical observations received include a first data input of historical observations associated with the first range of time and a second data input of historical observations associated with the third range of time. A third data input of historical observations associated with the second range of time is generated based on the first and second data inputs. The historical observations associated with image data can include satellite data taken over the predetermined timeframe. The satellite image data can include night light satellite image data. The night light satellite image data can include visible infrared imaging radiometer suite (VIIRS). The satellite image data can include Landsat-8 multispectral satellite image data. The satellite image data can include Sentinel-2 satellite image data. The satellite image data can include radar satellite image data. The satellite image data can include a combination of night light satellite image data, Landsat-8 satellite image data, Sentinel-2 satellite image data and radar image data.

The survey data can include open data taken over a predetermined timeframe, such as sourced from The World Bank or other sources. The survey data can include data sourced from Gallup, Inc. Multiple historical observations can be compiled and configured for correspondence with multiple pixels over the predefined timeframe. The categorical model related to economic information can include a geospatial dataset having an asset wealth index (AWI). The AWI can be based on the survey data. The survey data includes household surveys on economic well-being. Population datasets related to the geographical region can be collected. The categorical model related to economic information can include a geospatial dataset having economic consumption estimates. A categorical model related to agriculture, for example, can include a geospatial dataset having estimated crop area. The categorical model related to agriculture can include a geospatial dataset having estimated crop yield. The categorical model related to infrastructure can include a geospatial dataset having estimated electrification locations based on a time series of illuminance values generated from the night light satellite image data.

According to additional features, the historical observations can further include internet speed data take over the predetermined timeframe. The historical observations can further include advertising data taken over the predetermined timeframe. The historical observations can further include cellular phone data taken over the predetermined timeframe. The cellular phone data can include Econet Wireless Zimbabwe Ltd., data taken over the predetermined timeframe. The historical observations can further include social media data taken over the predetermined timeframe. The historical observations can further include property data taken over the predetermined timeframe. The historical observations can further include plant data taken over the predetermined timeframe. The plant data can include Plantix data taken over the predetermined timeframe.

According to additional features, a prediction model is generated that forecasts a geographical location of growth based on the categorical model. A map is generated that displays the forecast. Growth can include economic growth and/or socioeconomic growth.

In one example, the prediction model identifies multiple factors related to an outcome, such as economic factors, natural resource factors and infrastructure factors. In embodiments, at least one intervention is observed, comprising at least one factor capable of impacting an outcome. The impact of the intervention on the outcome is measured, such as by comparing outcomes before and after the intervention over a training data set of historical interventions, in order to predict the influence of the intervention in a given situation. The training data set and the model may use historical data sets of economic survey data, image data, and many others to construct an understanding of the progression of development for a selected area over time, as well as to understand what interventions have taken place in each area at what times. In embodiments, an intervention may be selected and implemented, and outcomes may be tracked, such as to validate and/or improve the prediction model. In embodiments, at least one factor is modified or recommended to influence an alternate outcome based on the output of the prediction model.

In another example, the prediction model identifies a first set of criteria for application to a first geographic situation having a known outcome. A second set of criteria is identified for application to a second geographic situation having an unknown outcome. The first set of criteria is applied for the second set of criteria to influence an outcome similar to the known outcome at the second geographic location.

In embodiments, user input data is received. The user input data can be related to existing markets a user currently operates a user business in is received. Business goals associated with the user business are received. An existing market summary page is generated. The existing market summary page displays first statistics related to existing markets based on the user input data. Metrics important to the user in the future economic development are received. A region of interest the user is interested in expanding future user business into is received. A total market summary page is generated that displays second statistics related to the region of interest.

In examples, the user input data includes at least one of a country, state, district and region the user currently operates the user business in. User input can further include a timeframe of operation of the user business associated with the known geographies. In examples, business goals can include a characterization of the user's business as represented by business-to-business (B2B) or business-to-consumer (B2C). Business goals can further include use statistics such as a frequency customers consume products or services of the user business. User input data can include an identification of collaborators authorized to view one of the existing market summary page and the total market summary page. In examples, metrics can include information related to at least one of population, demographics, economic indicators, consumer trends, electrification and agriculture.

In other examples, a region of interest can be filtered to correspond to desirable characteristics of the region of interest. The filters can correspond to at least one of a demographic filter including population and population density; an economic filter including monthly spending power; and an infrastructure filter including land use. The region of interest can include a geometry uploaded by the user. The geometry can be imported from a cloud-based geospatial mapping software, or selected from a list.

In additional examples, a geography scope identified by the user is received. A dataset identified by the user corresponding to a category deemed important to the user is received. Clusters that satisfy the geography scope and the dataset are identified. A cluster map that displays the identified clusters is displayed. A market snapshot that displays the second statistics is generated. A delta field that displays the difference between the first and second statistics is displayed. In examples, the dataset can correspond to at least one of population, economy, agriculture and infrastructure. A region comparison is displayed that illustrates, concurrently, the first and second statistics.

In other examples, a region of interest including identified clusters is selected by the user. A cluster display page is generated that displays the identified clusters. At least one scenario filter selected by the user is received. The cluster display page is based on the scenario filter(s). The scenario filter(s) can be associated with at least one of a demographic filter including population and population density; an economic filter including monthly spending power; and an infrastructure filter including land use. In one example, a progress tracking page is generated that displays a current status associated with identified clusters.

Certain embodiments of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The disclosure will be more fully understood by reference to the following drawings which are for illustrative purposes only:

FIG. 17 is a flow chart showing a computer-implemented method of determining economic well-being geographically according to examples of the present disclosure;

FIG. 18 is a flow chart showing a computer-implemented method of determining economic well-being geographically according to examples of the present disclosure;

FIG. 21 is an exemplary onboarding user interface showing an account management page generated by an onboarding module of the user interface and region recommendation platform according to various examples;

FIG. 22A is an exemplary onboarding user interface showing a regions of focus page generated by the onboarding module of the user interface and region recommendation platform according to various examples;

FIG. 23B is an exemplary onboarding user interface showing a data import page according to various examples;

FIG. 40 illustrates an infield validation page generated by the scenario module according to various examples;

FIG. 41 illustrates a second cluster display page generated by the scenario module according to various examples;

DETAILED DESCRIPTION

Figure 1A:
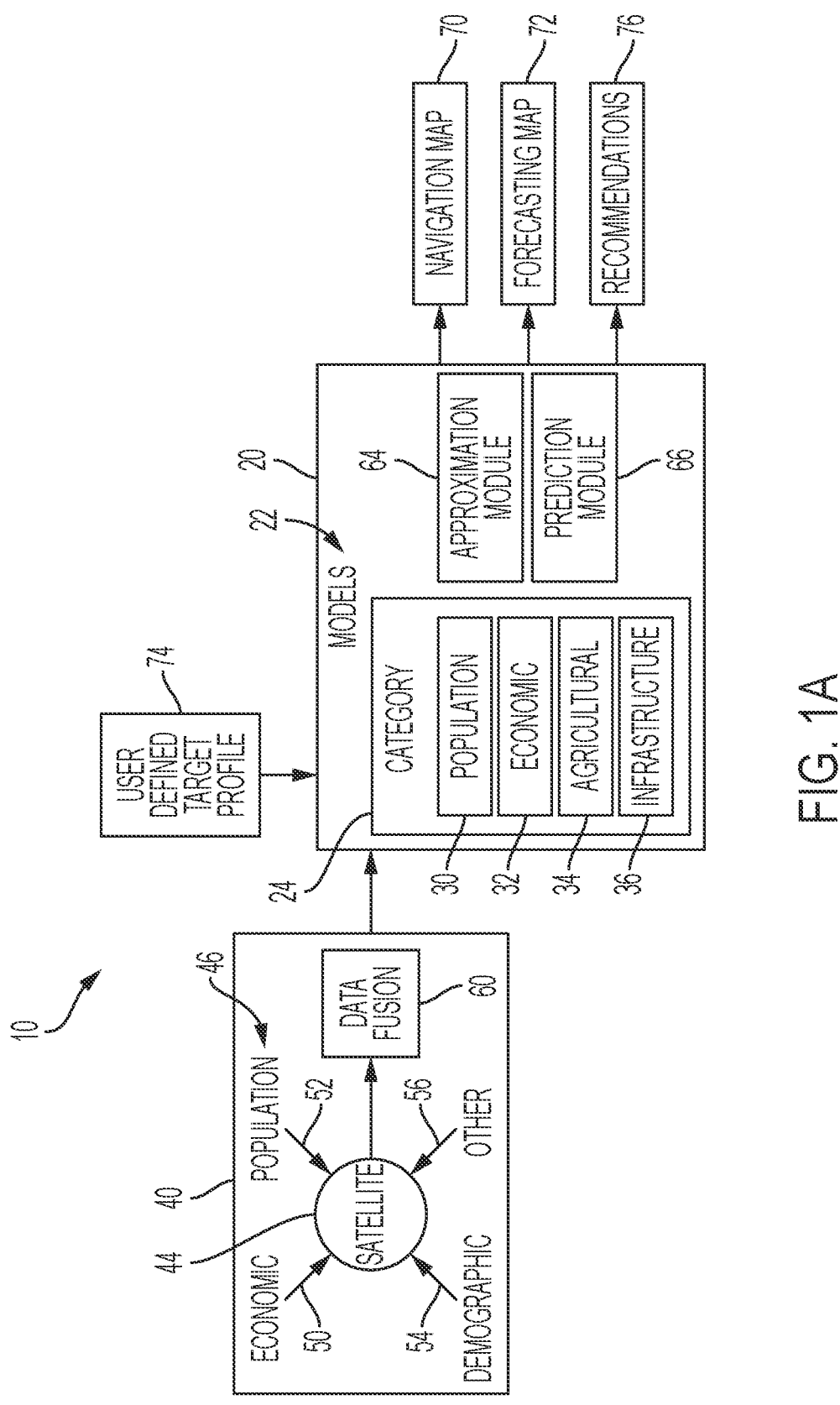
FIG. 1A is a schematic diagram of a decision support platform implemented by a computer system in accordance with the many examples of the present disclosure.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or similar terms with "embodiment" mean that a particular feature, structure, material, or characteristic being described is included in at least one embodiment of the present disclosure. The appearances of such phrases in this specification do not necessarily all refer to the same embodiment. On the other hand, such references are not necessarily mutually exclusive. Furthermore, the particular features, structures, materials, or characteristics can be combined in any suitable manner in one or more embodiments.

It is to be understood that the various embodiments shown in the figures are merely illustrative representations. Further, the drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the disclosure can be operated in any orientation.

Several details describing structures or processes that are well-known and often associated with computer systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller or electronic devices. Those skilled in the relevant art will appreciate that the disclosed techniques can be practiced on electronic or computer or controller systems other than those shown and described below. The techniques described herein can be embodied in a special-purpose electronic or computer or data processor that is specifically programmed, configured, or constructed to execute one or more of the computer-executable instructions described below. Accordingly, the terms "computer" and "controller" as generally used herein refer to any data processor and can include servers, distributed computing systems, cloud computing, Internet appliances, and handheld devices, including palmtop computers, wearable computers, cellular or mobile phones, multi-processor systems, processor-based or programmable consumer electronics, network computers, mini computers, and the like. Information handled by these computer systems and computers and controllers can be presented at any suitable display medium, including a liquid crystal display (LCD). Instructions for executing electronic- or computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable mediums.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

The following embodiments are described in sufficient detail to enable those skilled in the art to make and use the disclosure. It is to be understood that other embodiments would be evident based on the present disclosure, and that system, process, or mechanical changes may be made without departing from the scope of an embodiment of the present disclosure.

The term "module" or "unit" referred to herein can include software, hardware, mechanical mechanisms, or a combination thereof in embodiments of the present disclosure, in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), a passive device, or a combination thereof. Furthermore, the mechanical mechanism can include actuators, motors, arms, joints, handles, end effectors, guides, mirrors, anchoring bases, vacuum lines, vacuum generators, liquid source lines, or stoppers. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect without or with intervening items between coupled or attached modules or units. The coupling or attachment can be by physical contact or by communication between modules or units.

It will be appreciated in light of the disclosure that the computer-implemented systems, platforms and methods may be used to monitor the drivers of economic development across emerging markets. Various input data including Earth Observation (EO) or satellite data and survey data are collected. The input data is interpreted using analytics and algorithms to generate approximation models and predictive models. The models can be used to generate maps that can in turn be used to display various geospatial approximations of economic and societal well-being. The maps may be used to provide estimates of past and real-time information related to categories including population, economic conditions, agriculture and infrastructure. In addition, the models can be used to recommend optimal geographical locations to allocate future resources. In embodiments, certain patterns can be identified in the past and present day that highlight geographical locations that are emerging for a particular investor. For example, a particular geographical region may be identified to be close in time (e.g., a year away for example) from having electricity based on patterns of new electricity access observed in the broader region. In other examples, a particular region can be identified that is trending toward electrification (or other category thresholds) based on other inputs such as, for example, population increases, infrastructure (e.g., roads) having improved quality, and other industrialization metrics that are precursors to electrification.

The systems and methods discussed herein further provide continuous data input to enable monitoring progress and impact over time. In this regard, a maximum learning value can be realized from the resource allocation decisions.

Adjustments in resource allocations can therefore be made dynamically based on the most accurate real-time data collections.

The various computer-implemented systems, platforms and methods disclosed herein include a market and economic intelligence platform unlocking unparalleled insight into demographic, economic, and infrastructure conditions across the emerging markets. In embodiments, the platform may integrate proprietary data layers into a user-friendly web-based application to enable site selection, market prioritization, and network optimization for businesses and investors making high stakes location-based decisions in regions traditionally starved for reliable and timely data. With a global reach, the platform may advance frontier scientific methods in the field of artificial intelligence to develop estimates of population characteristics, economic conditions, agricultural productivity, and infrastructure access across the emerging markets. These data are incorporated into software products designed for organizations seeking to improve the commercial and societal outcomes of their resource allocation decisions.

Previously such data has only been accessible to large, highly technical organizations with the resources to analyze this form of geospatial data. In contrast, the various systems, platforms and methods disclosed herein can be shown to make this data available to anyone operating or investing in a particular country (such as Africa as used herein) and various regions where sparse data, developing infrastructure and the like can affect the data. In embodiments, the various systems and methods disclosed herein can support the range of resource allocation decisions that organizations may face in various markets, which can be shown to expand the frontier of viable projects and accelerate sustainable development.

The present disclosure is described in the context of a decision support platform that generates models from integrating various input data sourced from satellite data, survey data and other information. In embodiments, categorical models related to population, economic, agricultural and infrastructure information are created. The decision support platform allows a user to navigate the models and apply filters to identify a subset of regions across a geographical selection that meets a set of user-defined population, economic, infrastructure (or other) criteria. In other embodiments, a user can navigate individual data sets in the categorical models pertaining to estimates of population, economic conditions and infrastructure access. In each data layer, a user can view data by administrative region (for example, States or counties), or at a predetermined "point level". In embodiments, a point level can be set to a standardized resolution of 2 kilometer by 2 kilometer area. It is appreciated that other areas may be used. In examples, resolutions having 1 kilometer by 1 kilometer or 10 meter by 10 meter may be used. As will become appreciated herein, the resolution used in the models play an important role in the type of applications they enable. For example, agriculture data layers are generated at 10 meter by 10 meter because a vast majority of farmers in Africa are smallholders. A 2 kilometer by 2 kilometer area would not necessarily be able to resolve individual fields. Similarly, economic data layers providing indicators over urban areas are more useful at 1 kilometer by 1 kilometer resolution due to associated dense texture. A user can further view estimates pertaining to different time periods by selecting a timeframe dropdown menu.

The decision support platform uses the models in a first example as part of an approximation module to output a map that displays requested user criteria related to population, economic, agricultural and/or infrastructure information associated with a previous or current timeframe. The decision support platform also uses the models in a second example as part of a prediction module to output a map that displays requested user criteria related to population, economic, agricultural and/or infrastructure information associated with a future timeframe. As will be described herein, the decision support platform implements various artificial intelligence techniques including, machine learning, representation learning, similarity search and causal inference.

The approximation module and the prediction module can assist in determining a geographical location that presents a likelihood of current or future economic growth, respectively, so that financial capital can advance societal well-being and other desired outcomes. As can be appreciated, the computer-implemented systems, platforms and methods disclosed herein can be used to recommend geographic locations best suited for allocating future economic investment, which may include investment of specific types most likely to render near-term benefits, given the particular situation of a given area. As described herein, the present disclosure provides information useful for location-based decisions such as site selection, program targeting, market prioritization and network optimization. The information is packaged as data sets that can be utilized by enterprises, research organizations, and governments to understand patterns in economic well-being, community growth and settlement, and to enable effective targeting of social welfare programs.

The computer-implemented systems, platforms and methods disclosed herein may be used as a planning tool to identify geographically ideal locations for development of infrastructure (schools, utilities, offices, roads, restaurants, service stations, grocery stores, etc.). It will be understood however, that the present techniques can be used to determine a geographical location that forecasts other events that may not necessarily be related to economic growth. For example, the present techniques may be used to identify geographic locations in need of a particular resource or social welfare program. Further, the present techniques can be adapted to map populations susceptible to various hazards including, but not limited to, shocks from weather, conflict, disease, etc. In other examples, the present techniques can be used to model socio-environmental factors contributing to poverty, lending risk assessment and underwriting, regional agricultural monitoring and reporting, assessment of crop area and production losses from bad weather and pests, monitoring and enforcement of illegal land clearing for agriculture, assessing suitability of uncropped area for legal agricultural land expansion, mask non-crop areas in pixel-level crop yield estimation, and crop insurance risk assessment. Those skilled in the art will appreciate that the following techniques can be used to model and forecast other economic, socioeconomic, societal outcomes.

With initial reference to FIG. 1A, a decision support platform constructed in accordance with many examples of the present disclosure is shown and generally identified at reference numeral 10. The decision support platform 10 includes a model module 20 that generates and executes analytical models 22 related to various categorical data sets 24 including data sets related to population 30, economy 32, agriculture 34 and infrastructure 36. The categorical data sets 24 are generated from data received from a data handling platform 40. The data handling platform 40 receives geospatial satellite image data 44 and various third party or survey data generally identified at 46. As used herein, the geospatial satellite image data 44 and the survey data 46 are collectively referred to as "observations".

The survey data 46 can be any data collected or sensed by a third party. Survey data 46 can include socio-economic and demographic surveys and datasets, topical surveys and databases in energy, health, telecom, or other industries, governmental, administrative or other compliance reporting data, sensor-based data acquisition provisioned by aggregators or providers, media-based data, and infrastructure data related to assets across energy, water, telecom, supply chain, and logistics. Socio-economic and demographic surveys and datasets can include World Bank surveys such as Living Standards Measurement Study (LSMS) data, United States Agency for International Development's (USAID) demographic and Health surveys (DHS), and census datasets published by country statistical agencies (such as the US Census Bureau). Topical surveys and databases in energy, health, and telecom can include energy reliability surveys, telecom coverage maps, broadband connectivity maps and health facility master databases. Governmental, administrative or other compliance reporting data can include morbidity and mortality rates, vaccination reports for children, number of smart or mobile devices owned, traffic congestion and accident statistics, energy access, reliability, and power outage or disruptions in supply, tax and payment records for individuals and businesses, parcel or land ownership and history, jurisdictional geospatial boundaries, policies and regulations. Sensor-based data acquisition provisioned by aggregators or providers can include satellite imagery and remote sensed data, global positioning system (GPS) trances and records, mobile phone locational records based on telecom tower readings, cellular phone data records (CDR), telecom data usage statistics, drone or unmanned aerial vehicle-based images and data, and camera images. Media-based data can include sentiments and facts gathered from online digital footprints including, but not limited to, Facebook™, Instagram™, Twitter™, TikTok™, SnapChat™, Twitch™, YouTube™ or other social media platform. Infrastructure assets associated with energy, can include utility poles, wires, generators, transformers, distributors, and meters. Infrastructure assets associated with water can include water pipes, meters, pumps and treatment plants. Infrastructure assets associated with telecom can include telecom towers, transmitters, repeaters, relays, fiber cables (terrestrial and submarine). Other infrastructure assets include buildings of all types along with attributes such as area, shape, height, occupancy, purpose and land use code, roads, railway lines, bus stops, bus lines, ports, airports, junctions, toll plazas, bridges, points of interest including commercial stores, pharmacies, schools, groceries, hospitals, clinics, banks, kiosks and restaurants. In some examples, survey data can be provided by a customer or user of the decision support platform 10. It will be appreciated that such survey data provided by a customer, referred to herein as customer data, can be privileged data used under license. Moreover, some of the other survey data identified above may be acquired by license. The survey data 46, also referred to herein as "ground-truth data" can include economic data 50, population data 52, demographic data 54 and other data 56. The data handling platform 40 collects the various input data sets provided by the satellite image data 44 and the survey data 46 and delivers the data to a data fusion module 60. As will be described in greater detail, the data fusion module 60 fuses or aligns the various data input sets into useable sub-combinations for building the models 22. The models 22 provide categorized source data inputs to an approximation module 64 and a prediction module 66.

As will be appreciated herein, population, economic, agriculture and infrastructure information can be sparse in developing regions. Explained further, it is typical that the survey data 46 may only be available for select geographical locations (a specific town or village) across a broad geography (country where the specific town or village is located). The approximation module 64 leverages corresponding satellite image data 44 and machine learning techniques to estimate values related to population, economic, agricultural and infrastructure information for geographical locations where survey data 46 is incomplete or otherwise unsatisfactory. The approximation module 64 makes estimates for data missing from particular geographies and missing timeframes. The prediction module 66 implements various artificial intelligence techniques to forecast or predict various outcomes associated with population, economic, agricultural and infrastructure information for a future timeframe.

The model module 20 can output a navigation map 70 or a forecasting map 72 based on a user defined target profile 74. The model module 20 can further output recommendations 76 based on the user defined target profile 74. The navigation map 70 can include a visual geographical map containing requested user criteria related to population, economic, agricultural and/or infrastructure information associated with a previous or current timeframe and generated by the approximation module 64. The forecasting map 72 can include a visual geographical map containing requested user criteria related to population, economic, agricultural and/or infrastructure information associated with a future timeframe and generated by the prediction module 66.

Figure 1B:
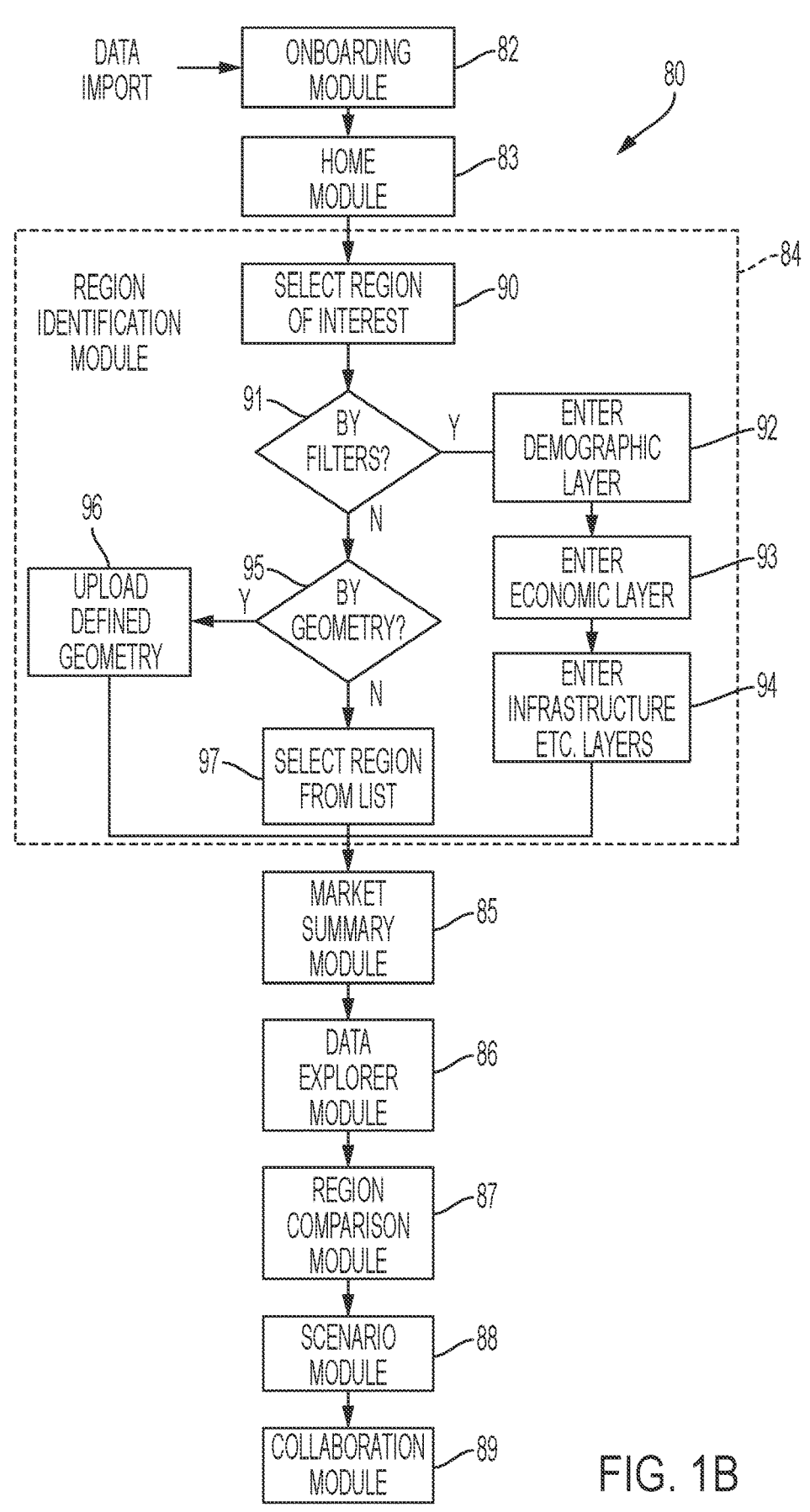
FIG. 1B is a schematic diagram of a user interface and region recommendation platform implemented by the computer system in accordance with the many examples of the present disclosure.

Turning now to FIG. 1B, a user interface and region recommendation platform constructed in accordance with many examples of the present disclosure is shown and generally identified at reference 80. As will become appreciated herein, the user interface and region recommendation platform 80 allows a user to enter known data related to their business as well as enter desired parameters important for future economic development (or other resource). The user interface and region recommendation platform 80 leverages the model module 20 and displays to the user recommendations 76 in the form of clusters that represent geographies that satisfy the selected criteria for future development. The user can navigate various drop-down menus to add and remove filters, as desired, to cater the output recommendations more specifically toward the end goal. The user can further compare various regions and clusters to understand trends of how one characteristic may impact other characteristics. The user interface and region recommendation platform 80 includes an onboarding module 82, a home module 83, a region identification module 84, a market summary module 85, a data explorer module 86, a region comparison module 87, a scenario module 88 and a collaboration module 89.

The various modules associated with the user interface and region recommendation platform 80 in FIG. 1B are shown and described sequentially. It is appreciated however that the user may interface with the modules in any order. Further, and as will become appreciated herein, the user may wish to update various known data (e.g., upload files related to known customer and sales information) by way of the onboarding module 82 as new data becomes available to more accurately reflect various data in real time. The onboarding module 82 invites the user to communicate various known data and desired future objectives to the user interface and region recommendation platform 80. In particular, the user can upload data (such as sales and customer information) through the onboarding module 82 related to current markets the user is currently operating in. In addition, the user can identify prospective markets the user is interested in expanding into. The user can enter metrics (population, asset wealth, spending power, etc.) that are important for consideration when identifying future markets. In examples, the user interface and region recommendation platform 80 can provide a personal onboarding assistant that can assist with the onboarding process either virtually and/or on-site. The onboarding module 82 will be further described herein at FIGS. 21-23B.

The home module 83 displays a welcome screen to the user where the user can view existing projects and a data snapshot related to existing markets. The home module 83 will be further described herein at FIGS. 24-27.

The region identification module 84 initiates selection of region of interest at 90. The region identification module determines if the user desires to select the region by filters at 91. If the user desires to select the region by filters at 91, the user enters a desired demographic range or layer at 92, a desired economic range or layer at 93 and an infrastructure or land use layer 94. If the user does not desire to select the region by filters, the user can select by geometry at 95. If the user desired to enter a desired geometry at 95, the user uploads a defined geometry at 96. If the user does not desire to enter a desired geometry at 95, the user selects the desired region from a list, such as from a drop-down menu as will be described in greater detail herein. Once the region identification module has received the data entry from the user, a market summary is provided by the market summary module 85. The market summary module 85 provides information related to spending per capita, monthly spending power, total population, population density, asset wealth index, population by gender, and a spending analysis. The data explorer module 86 provides similar information to the user as the market summary module 85 and highlights various areas of a map that correspond to the selected regions. The region comparison module 87 allows the user to select multiple regions to compare characteristics in a side-by-side visual. The user is able to swap various regions into the graphical display as needed. Further, the user can compare known parameters uploaded during the onboarding sequence from existing markets with potential new target regions. The scenario module 88 allows the user to view various clusters that satisfy desired layers. In various examples, the user may select regions of interest and apply filters corresponding to desired characteristics (total area, total population, spending power per capita, asset wealth, population density, etc.). The collaboration module 89 invites the user to enter contact information for desired future collaborators. Further description of the user interface and region recommendation platform is set forth later in this description.

Figure 2:
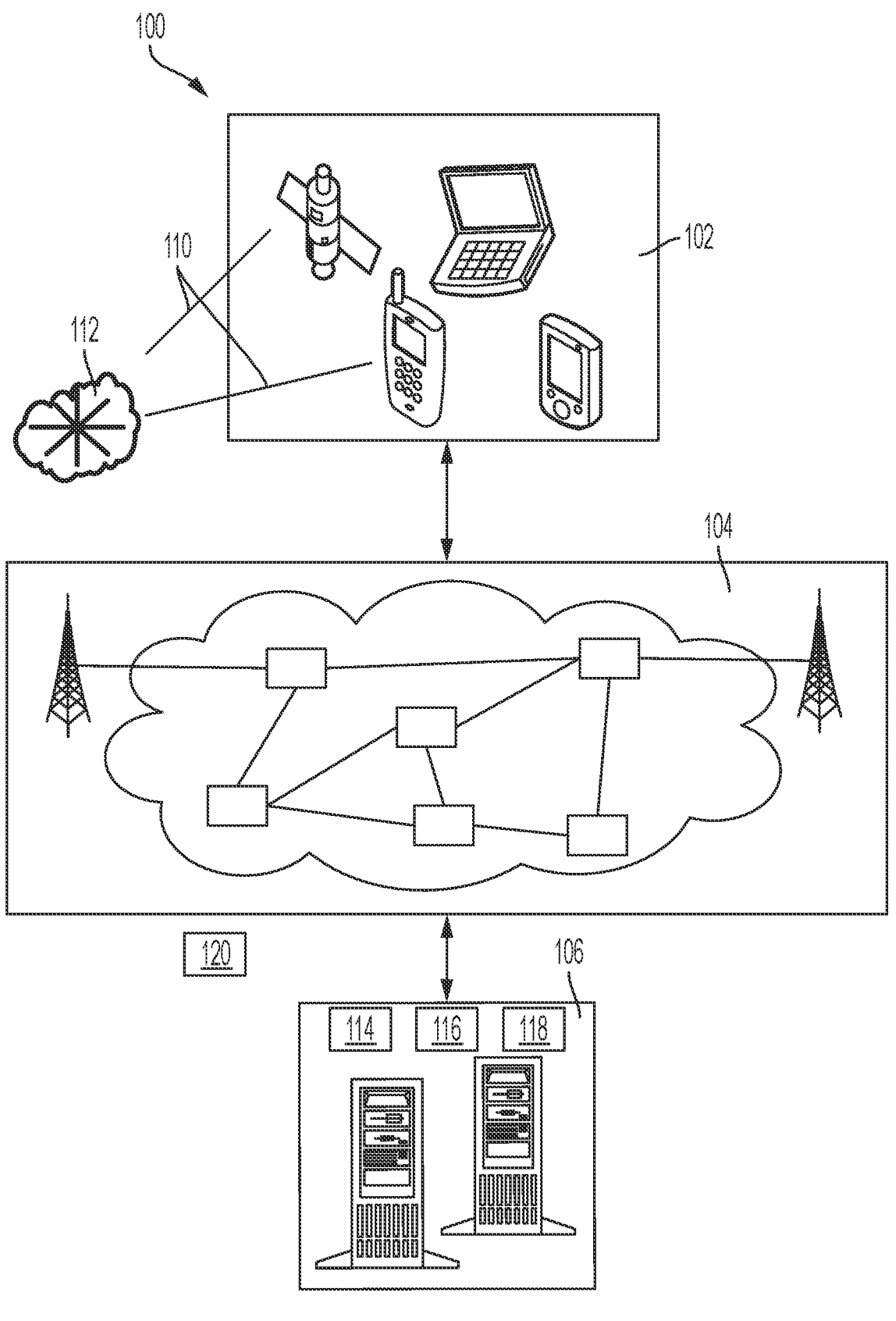
FIG. 2 is a diagram of an example computer system including example user computing devices and an example server computing device in accordance with the many examples of the present disclosure.

Referring now to FIG. 2, a computer system that executes the decision support platform according to examples of the present disclosure is shown and generally identified at reference numeral 100. The computer system 100 includes a first device 102, such as a satellite, a client, a server, or a device to take or compute measurements, connected to a second device 106, such as a client or server. The first device 102 can communicate with the second device 106 with a communication path 104, such as a wireless or wired network.

For example, the first device 102 can be of any of a variety of devices, such as a satellite, a measuring device, a vehicle, a computing device, a tablet computer, a smart phone, a notebook computer, or a combination thereof. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computer system 100 is described with the second device 106 as a computing device, although it is understood that the second device 106 can be different types of devices, such as a standalone sensor or measurement device. Also, for illustrative purposes, the computer system 100 is shown with the second device 106 and the first device 102 as end points of the communication path 104, although it is understood that the computer system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

As a specific example, the first device 102 can receive observations 110 for a geographic region 112. In one example, the first device 102 can function as a satellite, ground measurement device, a computing device, a tablet computer, a smart phone, a notebook computer or a combination thereof. The observations 110 provide information captured by, processed by, or a combination thereof by the first device 102.

As an example, the observations 110 are derived from the satellite image data 44 and the survey data 46 and can include information related to or associated with at least one of a population observation, an economic observation, a demographic observation, an agriculture observation, an infrastructure observation, or other observation at the geographic region 112. As will be described in greater detail herein, the population, economic, agriculture and infrastructure observations can be generated from various combinations of satellite imagery, survey data and other data.

Also for example, the observations 110 associated with the economic data 50 can represent household asset wealth, and household economic consumption. The observations 110 can include information used to model agriculture and generate a crop yield map and a crop area map. The observations 110 can further include information used to model electrification and generate an electrification map. Other data including demographic information, population density, and other datasets can be acquired from the observations 110 related to or associated with the geographic region 112.

The observations 110 can include an annotation 114. The annotation 114 represents information about each of the observations 110 related to or associated with the sensor captures, measurements, or a combination thereof. For example, the annotation 114 can include time, date, the geographic region 112, or a combination thereof to be associated with each of the observations 110. Also for example, the annotation 114 can reference the observations 110 to each other, such as the relationship of the observations 110 to each other including time series or date sequence. As a specific example, the annotation 114 can indicate, a historical observation 116, a current observation 118, or a combination of observations that accounts for both the historic and current observations 116 and 118.

As a further example, the annotation 114 can reference different types of the observations 110 with other types related to or associated with the geographic region 112. As a specific example, the annotation 114 can relate the population, economic, agricultural and infrastructure observations, or a combination thereof by time, date, the geographic region 112, or a combination thereof. In other examples, the annotation 114 can relate the observations 110 from different types of image data and survey data as appropriate based on a number of factors, including time, date, the geographic region 112, or a combination thereof.

The observations 110 can be stored as the historical observation 116, the current observation 118, or the combination 120. The historical observation 116 can be stored by the computer system 100 for later use or reference. The term "historical" can reference a number of temporal lags or delays, such as one or multiple years, months, weeks, days, hours, or a combination thereof. The term "historical" can be referenced by events or time periods, such as seasons of a calendar, crop seasons, lunar cycles, or a combination thereof. The term "current" can reference a number of contemporaneous time relative to the moment the observations 110 was captured and can also be reference based on time as well as events similar to the term "historical".

The geographic region 112 represents a physical geographic area. The size of the geographic region 112 is not necessarily fixed. For example, the geographic region 112 can represent a country, a province, a state, a county, a city, a neighborhood, a village, a farming region, a farm, a field, or a combination thereof.

Figure 3:
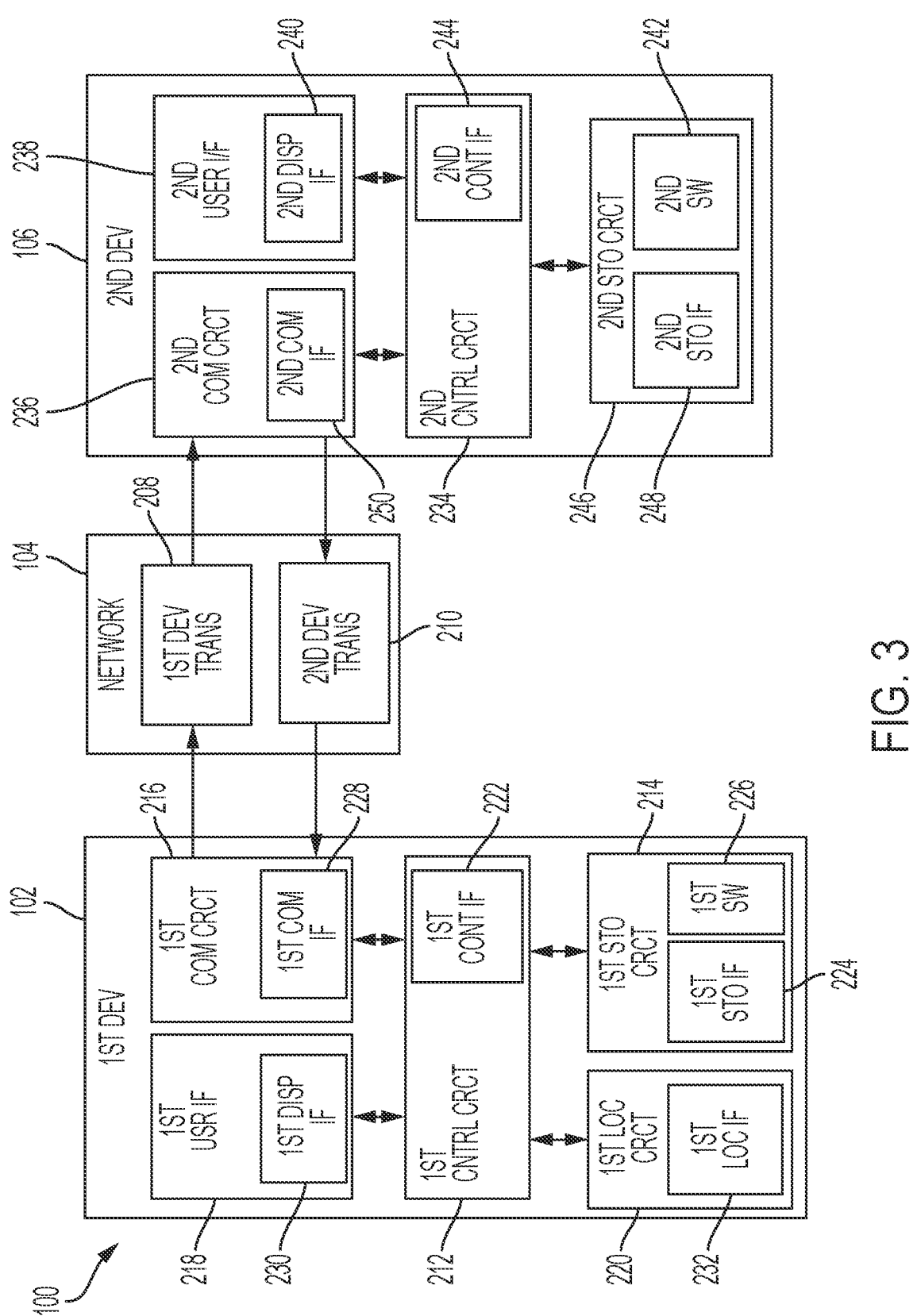
FIG. 3 is an exemplary block diagram of the computer system in accordance with the many examples of the present disclosure.

Referring now to FIG. 3, therein is shown an exemplary block diagram of the computer system 100. The computer system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the computer system 100 is shown with the first device 102 as a mobile device, a satellite, a measuring device, although it is understood that the computer system 100 can include the first device 102 as a different type of device. For example, the first device 102 can include a non-mobile device or a server.

Also for illustrative purposes, the computer system 100 is shown with the second device 106 as a non-mobile device, although it is understood that the computer system 100 can include the second device 106 as a different type of device. For example, the second device 106 can be a mobile device.

Further for illustrative purposes, the computer system 100 is shown with interaction between the first device 102 and the second device 106, although it is understood that the first device 102 can similarly interact with another instance of the first device 102. Moreover, the second device 106 can similarly interact with another instance of the second device 106.

For brevity of description in this embodiment of the present disclosure, the first device 102 will be described as a mobile device and the second device 106 will be described as a non-mobile device. The embodiments of the present disclosure are not limited to this selection for the type of devices.

The first device 102 can include a first control circuit 212, a first storage circuit 214, a first communication circuit 216, and a first user interface 218, and a first location circuit 220. The first control circuit 212 can include a first control interface 222. The first control circuit 212 can execute a first software 226 to provide the intelligence of the computer system 100.

The first control circuit 212 can be implemented in a number of different manners. For example, the first control circuit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control circuit 212 and other functional units or circuits in the first device 102. The first control interface 222 can also be used for communication that is external to the first device 102.

The first control interface 222 can receive information from the other functional units/circuits or from external sources, or can transmit information to the other functional units/circuits or to external destinations. The external sources and the external destinations refer to sources and destinations external to the first device 102.

The first control interface 222 can be implemented in different ways and can include different implementations depending on which functional units/circuits or external units/circuits are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage circuit 214 can store the first software 226. The first storage circuit 214 can also store the relevant information, such as the observations 110 of FIG. 2, data representing incoming images, data representing previously presented image, sound files, or a combination thereof.

The first storage circuit 214 can be a volatile memory, a nonvolatile memory, an internal memory, an external memory, or a combination thereof. For example, the first storage circuit 214 can be a nonvolatile storage such as non-volatile random access memory (NVRAM), Flash memory, disk storage, or a volatile storage such as static random access memory (SRAM).

The first storage circuit 214 can include a first storage interface 224. The first storage interface 224 can be used for communication between the first storage circuit 214 and other functional units or circuits in the first device 102. The first storage interface 224 can also be used for communication that is external to the first device 102.

The first storage interface 224 can receive information from the other functional units/circuits or from external sources, or can transmit information to the other functional units/circuits or to external destinations. The external sources and the external destinations refer to sources and destinations external to the first device 102.

The first storage interface 224 can include different implementations depending on which functional units/circuits or external units/circuits are being interfaced with the first storage circuit 214. The first storage interface 224 can be implemented with technologies and techniques similar to the implementation of the first control interface 222.

The first communication circuit 216 can enable external communication to and from the first device 102. For example, the first communication circuit 216 can permit the first device 102 to communicate with the second device 106 of FIG. 1A, an attachment, such as a peripheral device or a sensor, and the communication path 104.

The first communication circuit 216 can also function as a communication hub allowing the first device 102 to function as part of the communication path 104 and not limited to be an end point or terminal circuit to the communication path 104. The first communication circuit 216 can include active and passive components, such as microelectronics or an antenna, for interaction with the communication path 104.

The first communication circuit 216 can include sensors to capture the observations 110 of FIG. 2. Examples of these sensors can include image or multimedia recording devices, optical sensors, or a combination thereof. The first control circuit 212 can be embed or associate the annotation 114 of FIG. 2 with the observations 110.

The first communication circuit 216 can include a first communication interface 228. The first communication interface 228 can be used for communication between the first communication circuit 216 and other functional units or circuits in the first device 102. The first communication interface 228 can receive information from the other functional units/circuits or can transmit information to the other functional units or circuits.

The first communication interface 228 can include different implementations depending on which functional units or circuits are being interfaced with the first communication circuit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control circuit 212 can operate the first user interface 218 to display information generated by the computer system 100. The first control circuit 212 can also execute the first software 226 for the other functions of the computer system 100, including receiving location information from the first location circuit 220. The first control circuit 212 can further execute the first software 226 for interaction with the communication path 104 via the first communication circuit 216.

The first location circuit 220 can generate location information, current heading, current acceleration, and current speed of the first device 102, as examples. The first location circuit 220 can be implemented in many ways. For example, the first location circuit 220 can function as at least a part of the global positioning system, an inertial computer system, a cellular-tower location system, a pressure location system, or any combination thereof. Also, for example, the first location circuit 220 can utilize components such as a global positioning system (GPS) receiver or an accelerometer.

The first location circuit 220 can include a first location interface 232. The first location interface 232 can be used for communication between the first location circuit 220 and other functional units or circuits in the first device 102. The first location interface 232 can also be used for communication external to the first device 102.

The first location interface 232 can receive information from the other functional units/circuits or from external sources, or can transmit information to the other functional units/circuits or to external destinations. The external sources and the external destinations refer to sources and destinations external to the first device 102.

The first location interface 232 can include different implementations depending on which functional units/circuits or external units/circuits are being interfaced with the first location circuit 220. The first location interface 232 can be implemented with technologies and techniques similar to the implementation of the first control circuit 212.

The second device 106 can be optimized for implementing embodiments of the present disclosure in a multiple device embodiment with the first device 102. The second device 106 can provide the additional or higher performance processing power compared to the first device 102. The second device 106 can include a second control circuit 234, a second communication circuit 236, a second user interface 238, and a second storage circuit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control circuit 234 can execute a second software 242 of FIG. 2 to provide the intelligence of the second device 106 of the computer system 100. The second software 242 can operate in conjunction with the first software 226. The second control circuit 234 can provide additional performance compared to the first control circuit 212.

The second control circuit 234 can operate the second user interface 238 to display information. The second control circuit 234 can also execute the second software 242 for the other functions of the computer system 100, including operating the second communication circuit 236 to communicate with the first device 102 over the communication path 104.

The second control circuit 234 can be implemented in a number of different manners. For example, the second control circuit 234 can be a processor, an embedded processor, a microprocessor, hardware control logic, a hardware finite state machine (FSM), a digital signal processor (DSP), or a combination thereof.

The second control circuit 234 can include a second control interface 244 of FIG. 2. The second control interface 244 can be used for communication between the second control circuit 234 and other functional units or circuits in the second device 106. The second control interface 244 can also be used for communication that is external to the second device 106.

The second control interface 244 can receive information from the other functional units/circuits or from external sources, or can transmit information to the other functional units/circuits or to external destinations. The external sources and the external destinations refer to sources and destinations external to the second device 106.

The second control interface 244 can be implemented in different ways and can include different implementations depending on which functional units/circuits or external units/circuits are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

The second storage circuit 246 can store the second software 242. The second storage circuit 246 can also store the information such as data representing incoming images, data representing previously presented images, sound files, or a combination thereof. The second storage circuit 246 can be sized to provide the additional storage capacity to supplement the first storage circuit 214.

For illustrative purposes, the second storage circuit 246 is shown as a single element, although it is understood that the second storage circuit 246 can be a distribution of storage elements. Also for illustrative purposes, the computer system 100 is shown with the second storage circuit 246 as a single hierarchy storage system, although it is understood that the computer system 100 can include the second storage circuit 246 in a different configuration. For example, the second storage circuit 246 can be formed with different storage technologies forming a memory hierarchal system including different levels of caching, main memory, rotating media, or off-line storage.

The second storage circuit 246 can be a volatile memory, a nonvolatile memory, an internal memory, an external memory, or a combination thereof. For example, the second storage circuit 246 can be a nonvolatile storage such as non-volatile random access memory (NVRAM), Flash memory, disk storage, or a volatile storage such as static random access memory (SRAM).

The second storage circuit 246 can include a second storage interface 248. The second storage interface 248 can be used for communication between the second storage circuit 246 and other functional units or circuits in the second device 106. The second storage interface 248 can also be used for communication that is external to the second device 106.

The second storage interface 248 can receive information from the other functional units/circuits or from external sources, or can transmit information to the other functional units/circuits or to external destinations. The external sources and the external destinations refer to sources and destinations external to the second device 106.

The second storage interface 248 can include different implementations depending on which functional units/circuits or external units/circuits are being interfaced with the second storage circuit 246. The second storage interface 248 can be implemented with technologies and techniques similar to the implementation of the second control interface 244.

The second communication circuit 236 can enable external communication to and from the second device 106. For example, the second communication circuit 236 can permit the second device 106 to communicate with the first device 102 over the communication path 104.

The second communication circuit 236 can also function as a communication hub allowing the second device 106 to function as part of the communication path 104 and not limited to be an end point or terminal unit or circuit to the communication path 104. The second communication circuit 236 can include active and passive components, such as microelectronics or an antenna, for interaction with the communication path 104.

The second communication circuit 236 can include a second communication interface 250. The second communication interface 250 can be used for communication between the second communication circuit 236 and other functional units or circuits in the second device 106. The second communication interface 250 can receive information from the other functional units/circuits or can transmit information to the other functional units or circuits.

The second communication interface 250 can include different implementations depending on which functional units or circuits are being interfaced with the second communication circuit 236. The second communication interface 250 can be implemented with technologies and techniques similar to the implementation of the second control interface 244.

The first communication circuit 216 can couple with the communication path 104 to send information to the second device 106 in the first device transmission 208. The second device 106 can receive information in the second communication circuit 236 from the first device transmission 208 of the communication path 104.

The second communication circuit 236 can couple with the communication path 104 to send information to the first device 102 in the second device transmission 210. The first device 102 can receive information in the first communication circuit 216 from the second device transmission 210 of the communication path 104. The computer system 100 can be executed by the first control circuit 212, the second control circuit 234, or a combination thereof. For illustrative purposes, the second device 106 is shown with the partition containing the second user interface 238, the second storage circuit 246, the second control circuit 234, and the second communication circuit 236, although it is understood that the second device 106 can include a different partition. For example, the second software 242 can be partitioned differently such that some or all of its function can be in the second control circuit 234 and the second communication circuit 236. Also, the second device 106 can include other functional units or circuits not shown in FIG. 2 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the computer system 100 is described by operation of the first device 102 and the second device 106. It is understood that the first device 102 and the second device 106 can operate any of the modules and functions of the computer system 100.

Returning now to FIG. 1A, the decision support platform 10 will be further described. In this example, the data handling platform 40 collects various input data such as the satellite image data 44 and the survey data 46 and aligns the data by time and space at the data fusion module 60. The data fusion module 60 can send low level data to the model module 20 where the low level data is processed using convolution neural networks (CNN's) to generate the categorical models 22. The categorical models 22 include pixel level geospatial datasets related to the identified categories. The categorical models 22 can compile multiple current and historical observations from the data handling platform 40. In one example, the data is compiled as a set of pixels over a predetermined timeframe.

The model module 20 can further receive a user defined target profile 74 and output the navigation map 70 and/or the forecasting map 72. The navigation map 70 and forecasting map 72 can also be referred to as "rasters" that display data as pixels having contrasting colors to signify distinct values viewable by a user. As used herein, a user defined target profile 74 is a desired profile that satisfies one or more user defined criteria. In some examples, a user can apply filters to modify a particular input to establish the user defined target profile. In this regard, a user may be interested in a geographical location that meets a specific criteria of having at least a threshold population, satisfies an economic threshold and/or satisfies an infrastructure threshold. Additionally, a user can navigate the various datasets 30, 32, 34 and 36 individually, or in various combinations and view results on the navigation map 70 pertaining to different time periods.

The navigation map 70 allows a user to navigate around a selected geographic location to view the various datasets 30, 32, 34 and 36 and apply certain filters or threshold criteria to target a particular factor. By way of example, the user may limit the navigation map 70 to only display results that meet a first threshold criteria for population (such as for example, 100,000 people), and/or meet a second threshold criteria for asset wealth (such as measurable above the poverty line), and/or meet a third threshold criteria such as having received electricity. It will be appreciated that the user may modify such filters as needed to display a desired criteria within the scope of the present disclosure. By filtering various criteria, the user can tailor an output on the navigation map that relates most closely to the user's desired focus.

The forecasting map 72 is generated by the prediction module 66 and displays anticipated (future) outcomes related to populations, economic conditions, agricultural conditions and infrastructure conditions at future times. The prediction module 66 uses artificial intelligence techniques to develop estimates of population characteristics, economic conditions, agricultural productivity, and infrastructure access. The prediction module 66 can further apply additional artificial intelligence techniques including similarity search and causal inference to forecast various outcomes. In examples, the prediction module 66 can leverage similarity search techniques to recommend a new geographical location that satisfies a known result suitable for the user at a previous geographical location. The prediction module 66 can also leverage causal inference techniques to measure the impact of a certain intervention from a causal perspective to determine what factors have made an impact in a certain intervention.

Figure 4:
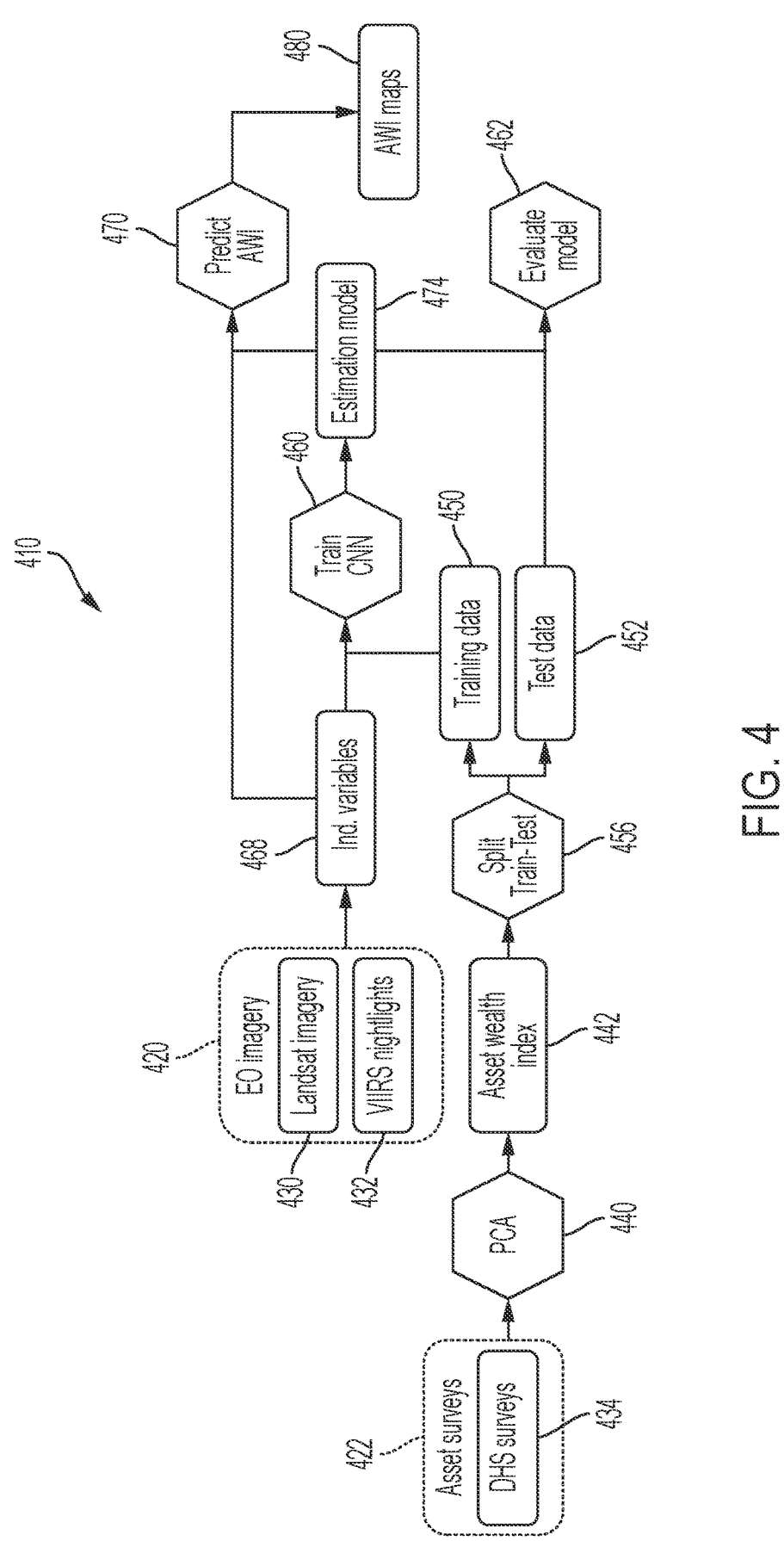
FIG. 4 is an asset wealth algorithm in accordance with the many examples of the present disclosure.
Figure 5:
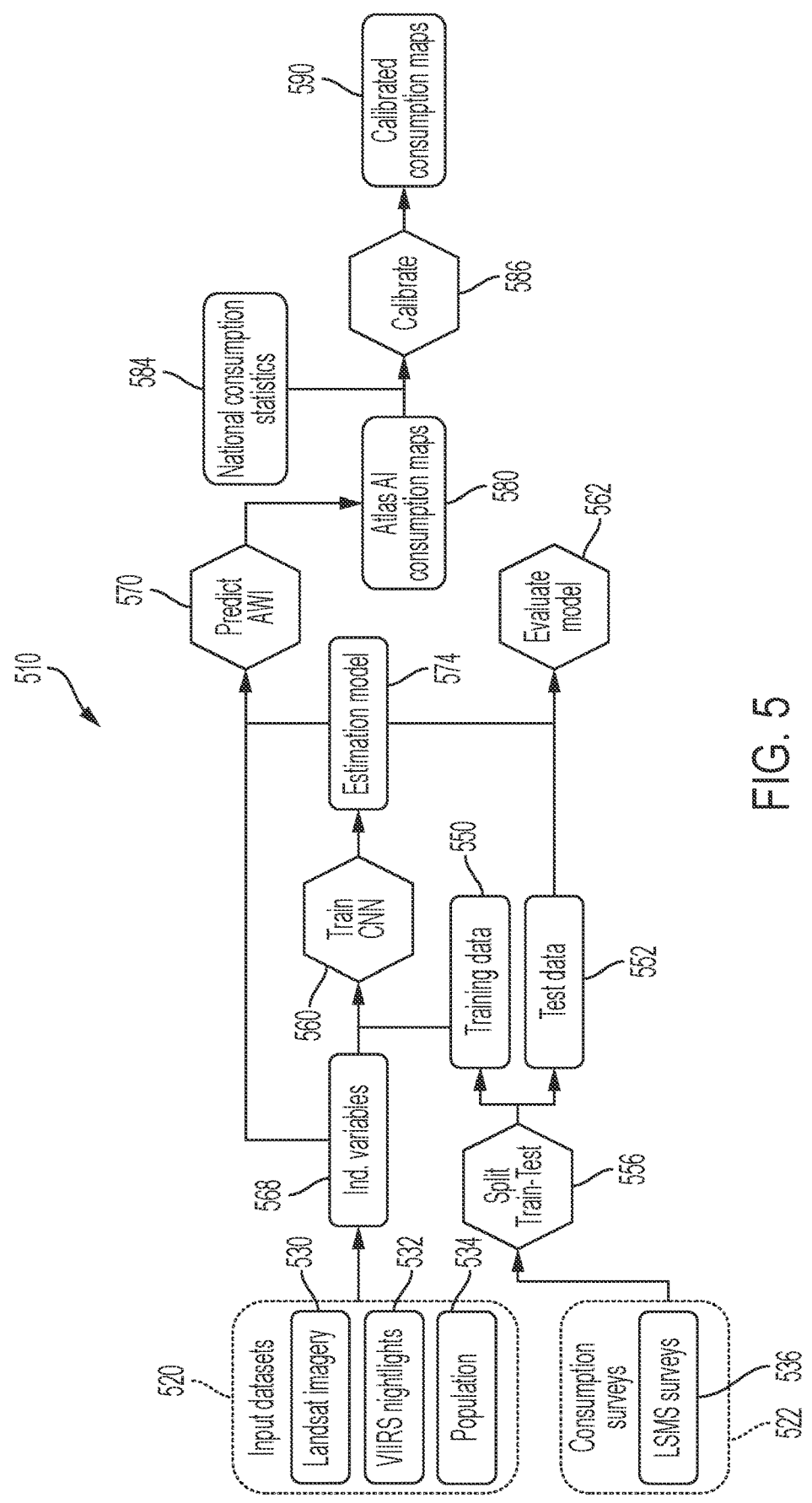
FIG. 5 is a consumption algorithm in accordance with the many examples of the present disclosure.
Figure 6:
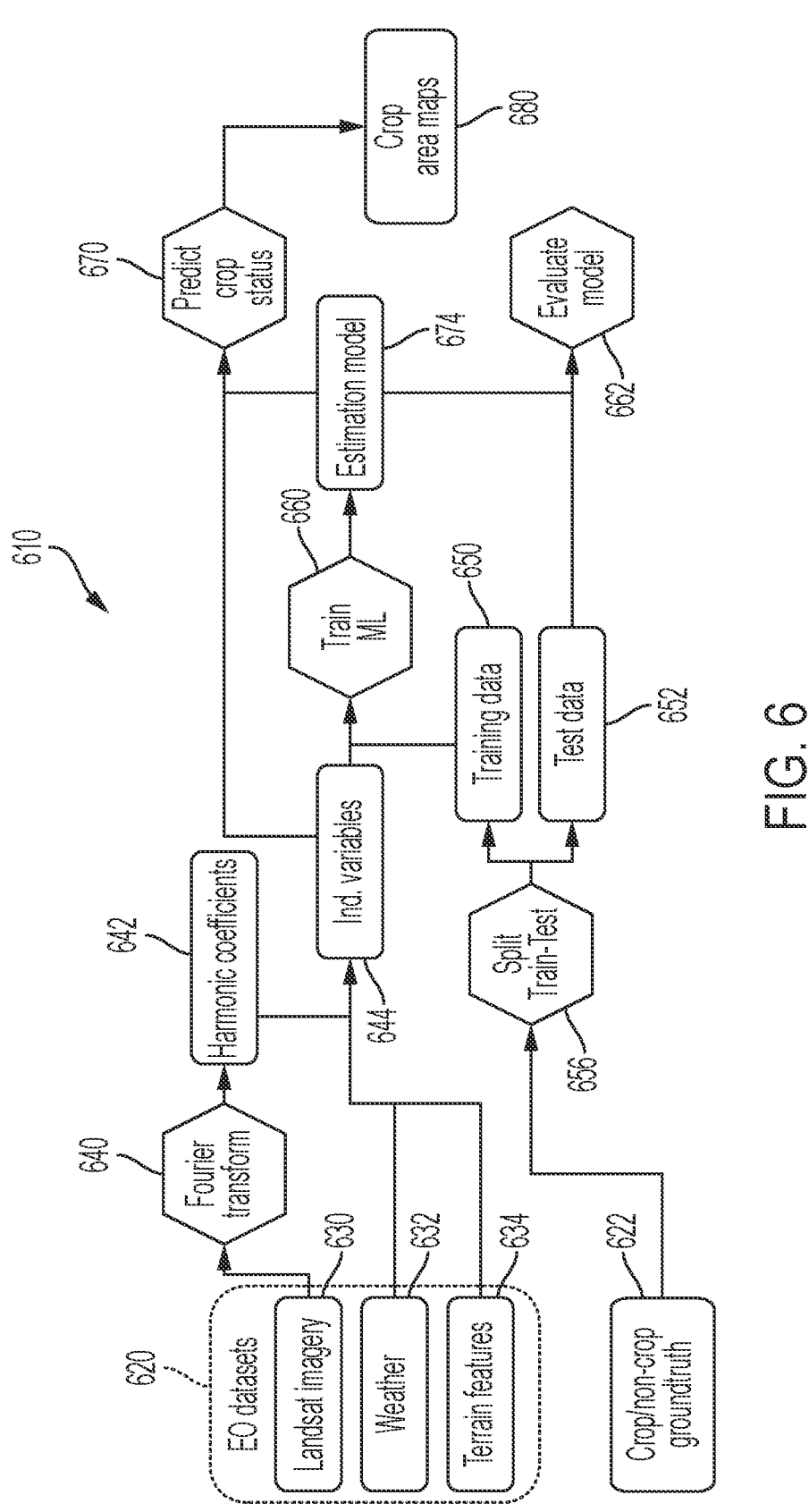
FIG. 6 is a crop area algorithm in accordance with the many examples of the present disclosure.
Figure 7:
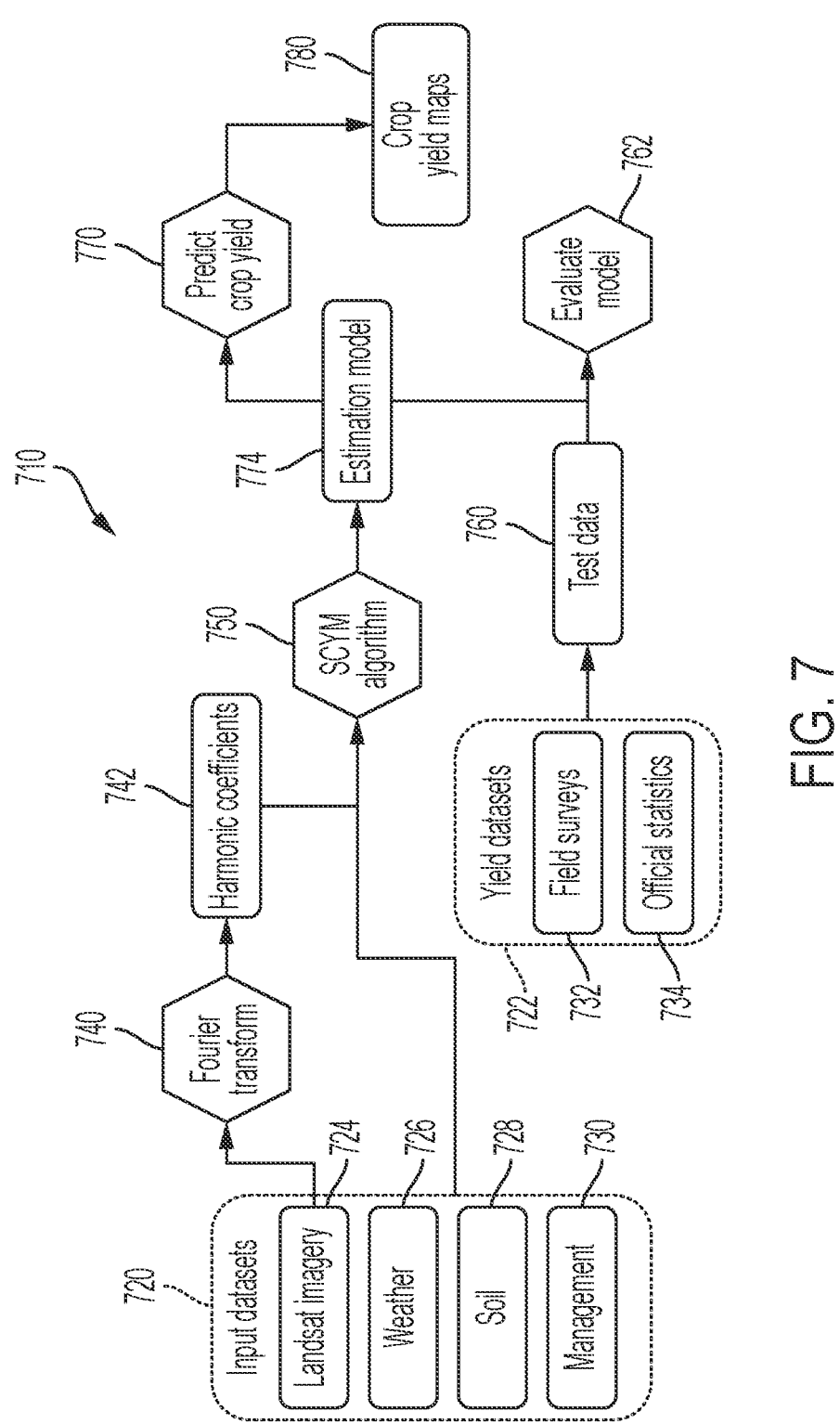
FIG. 7 is a crop yield algorithm in accordance with the many examples of the present disclosure.
Figure 8:
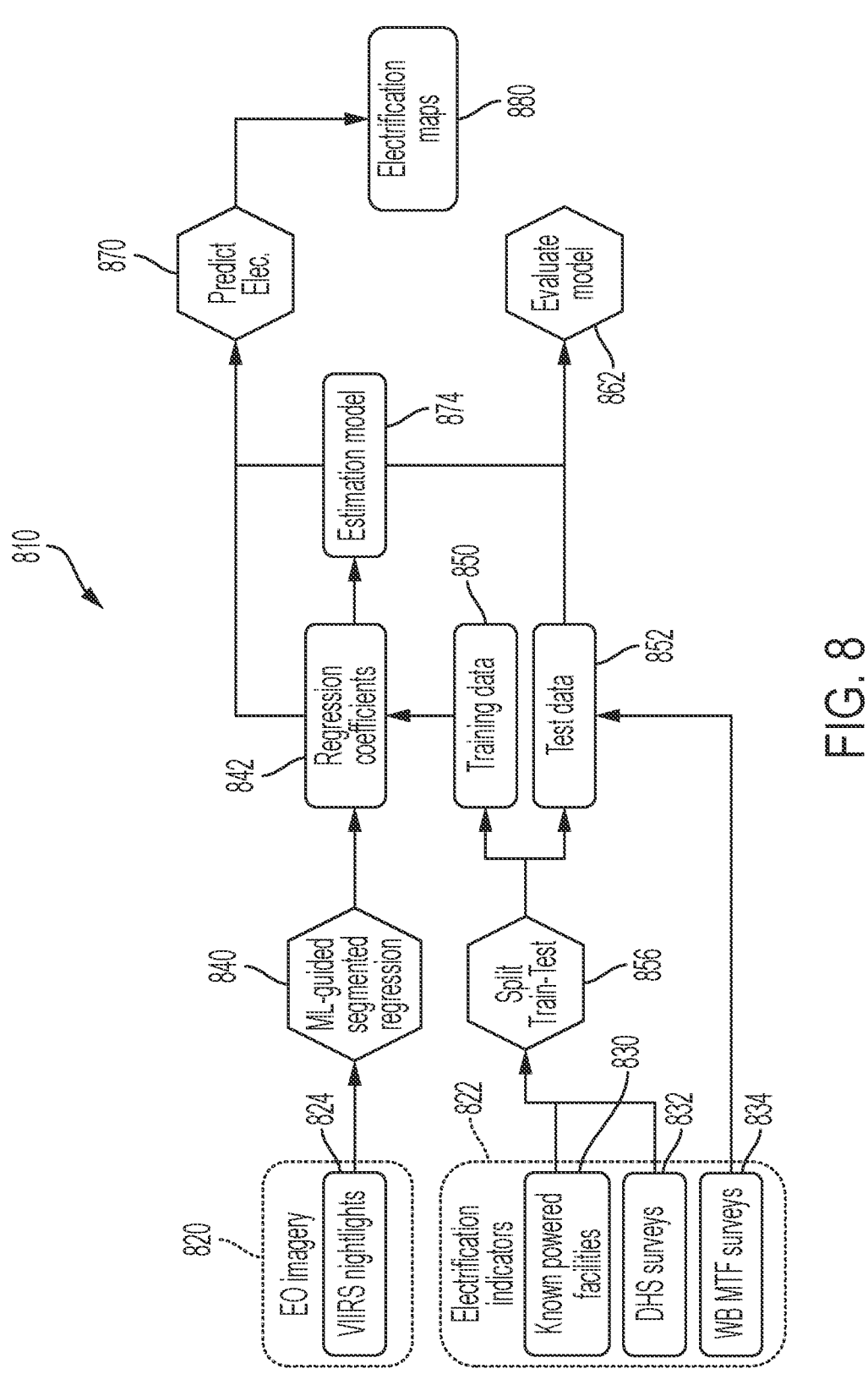
FIG. 8 is an electrification algorithm in accordance with the many examples of the present disclosure.

Turning now to FIGS. 4-8, various exemplary algorithms used in the model module 20 will be described. FIG. 4 illustrates an asset wealth algorithm 410. FIG. 5 illustrates a consumption algorithm 510. In general, the asset wealth algorithm 410 and the consumption algorithm both relate to economic well-being and can be executed by the model module 20 using the economic datasets 32. FIG. 6 illustrates a crop area algorithm 610. FIG. 7 illustrates a crop yield algorithm 710. In general, the crop area algorithm 610 and the crop yield algorithm 710 both relate to cropland footprint and can be executed by the model module 20 using the agriculture datasets 34. FIG. 8 illustrates an electrification algorithm 810. The electrification algorithm relates to infrastructure development and can be executed by the model module 20 using the infrastructure datasets 36.

With specific reference to FIG. 4, the asset wealth algorithm 410 will be described in greater detail. In general, the asset wealth algorithm 410 is used to estimate wealth for a particular geography. The asset wealth algorithm 410 uses inputs including asset surveys 422 and electro-optical (EO) imagery 420. The asset surveys 422 can include demographic and health (DHS) surveys 434. The EO imagery 420 includes satellite imagery and can include Landsat imagery 430 and Visible and Infrared Imaging Suite (VIIRS) nightlight imagery 432. The asset wealth algorithm 410 collates extensive survey data on assets owned by households across a selected geographical region. The asset wealth algorithm 410 generates high-resolution time series data on asset wealth at a 2 kilometer per pixel resolution. Other areas and resolutions are contemplated. To generate these data, the asset wealth algorithm 410 creates an asset wealth index (AWI) for extensive geographies (such as the continent of Africa) for display as AWI maps 480.

The asset surveys 422, can be otherwise be referred to as ground-truth data. The asset surveys 422 provide asset information at geo-referenced survey points. The data can be collected at a broader cluster level. As used herein, a cluster corresponds to a geography generally larger than a single household such as a village or enumeration area defined by known boundaries. In some examples when the DHS surveys 434 are collected at the household level, the asset wealth algorithm 410 can perform processing on the household level data to aggregate the data up into georeferenced cluster level data. The DHS surveys 434 can include specific asset ownership information for each household. For example, the DHS surveys can quantify an amount of cars, motorcycles, etc. a household may own for each household.

The asset wealth algorithm 410 performs a principal component analysis (PCA) 440 where all assets for a given cluster are collected. Geospatial coordinates are matched (latitude, longitude) for each cluster and a corresponding measure of asset wealth is computed at the asset wealth index module 442 based on the asset ownership information. By way of example, the model module 20 may receive information from the DHS survey 434 that indicates a particular household owns a car and a motorcycle. A measure of wealth can be calculated based on this asset ownership information for a particular household. The model module 20 aggregates this calculated measure of wealth from a household level up to the cluster level and an asset wealth index (AWI) estimation is made at the asset wealth index module 442 for a given cluster. An AWI is the first principal component of a principal component analysis (PCA) calculated on those assets over the selected households. AWI is a unit-less scalar with a mean of zero where the values range from negative one (−1) to positive one (+1), estimating relative economic well-being. Higher values indicate higher asset wealth. In one exemplary implementation, an annualized dataset is compiled which represents a four-year average. Values are duplicated for each year in a four-year window. A sample output pixel will represent the same value for each year in a four-year span.

In embodiments, the asset wealth algorithm 410 uses the EO imagery 420 to train models in the model module 20. As explained above, the asset wealth index module 442 includes survey points that are geo-referenced (latitude and longitude are known). The EO imagery 420 (such as sourced from Google Earth) is exported and centered around the known survey points. By way of example, an image size of 255 by 255 pixels may be used based on the resolution of the satellite imagery. By way of example, such an image size can correspond to 7.5 kilometers on the ground. Again, the EO imagery 420 can include a combination of the Landsat imagery 430 and VIIRS nightlight imagery 432.

As will become appreciated, the asset wealth algorithm 410 generates models that are used to predict an AWI for a given geography. In particular, the asset wealth algorithm 410 can be used to estimate asset wealth in all locations in Africa. While asset survey data 422 is sparse and may be limited to a particular geography and/or timeframe, the EO imagery 420 is more readily available for geographical locations in Africa. In this regard, known ground-truth data sourced from the asset surveys 422 can be aligned with the EO imagery 420 at the same geospatial location. The models can associate information from the pixels of the aligned EO imagery 420 with known wealth values obtained from the asset survey data 422. The models generated by the asset wealth algorithm 410 can then be trained to predict an AWI for the EO imagery 420 obtained in a geographical location that does not have corresponding survey data. In sum, the asset wealth algorithm 410 can generate a reliable asset wealth map for the entire continent of Africa despite having limited ground-truth data from only some locations in Africa that had available asset survey date 422.

The asset wealth algorithm 410 aligns a timeframe associated with the asset surveys 422 with a timeframe associated with the EO imagery 420. In examples, a three to four year timeframe is used for the EO imagery 420 and the imagery is averaged. Explained further, EO imagery is collected and associated with the selected asset surveys 422 at identified geospatial locations. As can be appreciated, a wider timeframe can be desirable as it minimizes the impact of weather conditions such as cloud cover that may negatively impact the quality of the data. It is appreciated that other timeframes may be used within the scope of this disclosure such as annually for example.

Once images are obtained for each survey point associated with the asset surveys 422, datasets are compiled at the data fusion module 60. In one example, each image that is aligned with the corresponding geospatial asset survey data is referred to as a training chip. At 456, the datasets are split into training data and testing data. In general, the asset wealth algorithm 410 can split the datasets based on countries into the training data 450 and test data 452. By way of example, certain countries in Africa can be assigned as training countries while a different collection of countries in Africa are assigned as test countries. For example, Ethiopia, South Africa and Tanzania can be used as training data 450 to train the models and Nigeria can be assigned as a test data country. The trained models are evaluated at the evaluate model 462 where an evaluation is made to estimate accuracy of the model when the model is applied to a test data country.

The training data 450 and test data 452 are sent to the train CNN module 460. At the train CNN module 460, village-aggregated values are aligned with satellite imagery, validating on data the model was not trained on. The EO imagery 420 is received at independent variables 468 and routed to the train CNN module 460 and to the predict AWI 470. In the asset wealth algorithm 410, independent variables 468 are assigned to features in the EO imagery 420 associated with asset wealth. The train CNN module 460 communicates an output to an estimation model 474. As identified above, the term "estimation" is used to denote a status approximation (in this example, an AWI estimate) for a geography where the model has not made an estimate before or does not have corresponding asset survey data to verify the status. In this regard, the estimation model 474 models a particular selected geography and an AWI is estimated at the predict AWI module 470. The AWI maps 480 are output from the predict AWI module 470. In one arrangement, images are converted into vector features. The vector features can be conveyed to a third party hosting service or other display partners. In embodiments, the asset wealth algorithm 410 can be used to target social support programs, monitor and evaluate poverty alleviation initiatives, map populations susceptible to shocks from weather, conflict and disease, model socio-environmental factors contributing to poverty, lending risk assessment and underwriting, and market sizing. It will be appreciated that the AWI maps 480 can include either the navigation map 70 to display current or past information or a forecasting map 72 to display forecasted information.

Turning now to FIG. 5, the consumption algorithm 510 will be described. Unless otherwise described herein, the consumption algorithm 510 has similar steps to the asset wealth algorithm 410 described above. The value of each pixel represents economic consumption per capita per day and is averaged over the population within the pixel. As used herein, consumption refers to the use of goods and services (as opposed to consumption expenditure which is the purchase of goods and services). The value of using durable goods is included in a household's consumption amount.

The consumption algorithm 510 uses inputs including input datasets 520 and consumption surveys 522. The input datasets 520 include Landsat imagery 530, VIIRS nightlights 532 and population data 534. The consumption surveys 522 include living standards measurement study (LSMS) surveys 536. Training data 550 and test data 552 are split at split train-test 556. The training data 550 and test data 552 are sent to the train CNN module 560 and evaluate model 562. The input datasets 520 are received at independent variables 568 and routed to the train CNN module 460 and to the predict AWI module 570. The train CNN module 560 outputs to an estimation model 574. Consumption maps 580 are output from the predict AWI module 570. The consumption algorithm 510 includes a post processing sequence after generation of the consumption maps at 580. At 584, national consumption statistics 584 are used in a calibration module 586. In one example, national consumption statistics can be sourced from PovcalNet generated by The World Bank. The PovcalNet data is based on a survey of randomly sampled households within a selected geography. From the survey data 522, an assessment is made of how aggregate consumption or income is distributed across a population in a selected economic information for the date of the survey. The various rasters generated by the model module 20 are calibrated to match or be consistent with the distributions provided from the PovcalNet data sets. In this regard, the consumption algorithm 510 compensates the consumption maps 580 with known information from the national consumption statistics 584. Explained further, baseline consumption estimates are calibrated to national level datasets on the distribution of consumption. By calibrating the data at 586 using National consumption statistics 584, differences in consumption are emphasized at borders between countries. The calibrated consumption maps 590 are then generated. It will be appreciated that the consumption maps 580 can include either the navigation map 70 to display current or past information or a forecasting map 72 to display forecasted information. In embodiments, the consumption algorithm 510 can be used to target social support programs, monitor and evaluate poverty alleviation initiatives, map populations susceptible to shocks from weather, conflict and disease, model socio-environmental factors contributing to poverty, lending risk assessment and underwriting, and market sizing.

With reference now to FIG. 6, the crop area algorithm 610 will be described. Unless otherwise described herein, the crop area algorithm 610 has similar steps to the asset wealth algorithm 410 described above. The crop area algorithm 610 generates an output image comprised of pixels that are geospatially located. The value of each pixel represents an area (hectare) of cropland managed with annual crops. The crop area does not distinguish between different crop types (e.g., corn versus wheat). The crop area algorithm 610 applies a machine learning model to estimate the probability that a pixel is cropland versus non-cropland. The probability is then translated into a discrete classification (cropland/non-cropland) by setting a minimum probability threshold. The current dataset uses best available information to determine the threshold value. Cross-validation techniques are used to guide model training. The model performance is then evaluated against a pixel-level evaluation dataset (withheld from model training). Prediction quality is investigated by comparing aggregate estimates with those available from National Statistical Offices (NSO's) where available.

The crop area algorithm 610 uses inputs including EO datasets 620 and crop/non-crop ground-truth data 622. The EO datasets 620 can include Landsat imagery 630, weather data 632 and terrain features 634. The Landsat imagery 630 includes multiple bands of red, green and blue wavelengths. The Landsat imagery 630 further includes infrared and near infrared light. The infrared and near infrared light imagery correlate well with crop health. In this regard, when a crop does not have enough nutrients to thrive it reflects light differently than a crop that is healthy. Such a characteristic is exploited by the crop area algorithm 610 to make estimates regarding crop existence, crop type and/or crop health at a particular geographical location. Weather data 632 can include measurements related to temperature and precipitation. In this regard, weather data 632 can include average temperature, growing degree days, total precipitation, and maximum temperature for example. As can be appreciated, temperature and precipitation values can suggest crop viability. The terrain features 634 can include information related to land elevation, slope and aspect. Such terrain features can coincide with areas crops tend to be planted.

All of the EO datasets 620 including the Landsat imagery 630, weather data 632 and terrain features 634 are aligned in space through a spatial resampling process to a common grid. In this regard, for each point or pixel in space on the grid, the values of each image or characteristics of each pixel can be extracted.

The Landsat imagery 630 data is input to a Fourier transform 640, otherwise known as a harmonic regression. Within the collection of Landsat imagery 630, multiple satellite images exist through the course of the growing season. By observing changes over time in the imagery, conclusions can be made as to what type of crop it is and how healthy that crop was during the course of the growing season. However, as can be appreciated, a time series of image collection can be complicated in the fact that some days are not ideal for data collection (cloudy days that obscure the ground in satellite image). Such unfavorable days introduce noise into the models. The Fourier transform 640 allows the noise to be mitigated from the model by smoothing out the image data. That data is then input to harmonic coefficients 642 where patterns that are representative of the whole growing season can be interpreted. In other words, the time series of data collection is reduced to harmonic coefficients 642. It will be appreciated that harmonic coefficients 642 are generated for each pixel across space (and for each season) of the selected geographical location. Depending on the EO datasets 620 being sourced, each pixel can represent 10 meters to 30 meters of ground space. In a non-limiting example, the harmonic coefficients 642 can be four numbers for each pixel. The agriculture models 34 generated using the harmonic coefficients 642 can be particularly effective in interpreting which pixels in the images are crops and which pixels are not crops.

The weather data 632 and terrain features 634 merge with the Landsat imagery data 630 at the independent variables 644. Again, each of the weather data 632, terrain features 634 and the Landsat imagery data 630 are all reliable predictors whether or not a pixel is cropland. Training data 650 and test data 652 are split at split train-test 656. The training data 650 and test data 652 are sent to the train machine learning (ML) module 660 and evaluate model 662, respectively. The train ML module 660 uses all the collected data including the weather data 632, terrain features 634 and harmonic coefficients 642 and uses the data to determine whether some of the collected data is more reliable at predicting cropland versus other collected data.

The crop/non-crop ground-truth data 622 can include high resolution images such as sourced from Google Maps that include known statuses of crop existence throughout a selected geography. This known crop existence information is used as the training data 650 after a data sorting step at a split train-test module 656. The train ML module 660 collects information for a particular geographic location that is confirmed cropland from the known training data 650. The ML module 660 determines what factors from the collected data best correlate that the selection is cropland and generates a prediction model 674. For example, the ML module 660 may determine that a selected geographic location where known cropland exists has a particular slope (less than 5% for example), has weather that is conducive to crop growth, and may show a seasonal progression pattern of bare soil leading to vegetation and returning to bare soil (crop signature profile). The train ML module 660 can synthesize these independent variables 644 and discern patterns that characterize what a cropped pixel looks like versus a non-cropped pixel to create a prediction model 674.

Crop status is predicted at 670 based on the estimation model 674. As can be appreciated, the estimation model 674 can then be used to estimate crop existence at geographies where corresponding ground-truth data is missing, limited or otherwise unreliable. By way of example, the training data 650 (aligned with known ground-truth data) may include a set of pixels (1000, for example) labeled as cropland or non-cropland in a known country (Kenya, for example). As used herein "labeled" refers to a ground-truth observation point. The prediction model 674, can be used to predict what the remaining pixels (aligned with unknown ground-truth data) represent. It is appreciated that the known pixels are merely a small fraction of the unknown pixels which can include hundreds of millions of pixels.

While the above discussion directed toward the crop area algorithm 610 has been described in the context of using the estimation model 674 and crop status predictor 670 to estimate crop existence, the same crop area algorithm 610 can be used to estimate crop type. In this regard, the crop area algorithm 610 can additionally be used to determine whether a pixel represents maze (corn), or other crops (soybean, etc.). When using the crop area algorithm 610 to determine crop type, different ground-truth data is used for the crop/non-crop ground-truth 622.

The crop area maps 680 are output from the crop status predictor 670. It will be appreciated that the crop area maps 680 can include either the navigation map 70 to display current or past information or a forecasting map 72 to display forecasted information. In embodiments, the crop area algorithm 610 can be used for regional agricultural monitoring and reporting, assessment of crop area and production losses from bad weather and pests, monitoring and enforcement of illegal land clearing for agriculture, assessing suitability of uncropped area for legal agricultural land expansion, mask non-crop areas in pixel-level crop yield estimates, and crop insurance risk assessment.

With reference now to FIG. 7, the crop yield algorithm 710 will be described. Unless otherwise described herein, the crop yield algorithm 710 can have similar steps to the crop area algorithm 610 described above. The crop yield algorithm 710 uses input datasets 720 and yield datasets 722. The input datasets 720 include Landsat imagery 724, weather data 726, soil data 728 and management data 730. The yield datasets 722 can represent known ground-truth data in the form of field surveys 732 and official statistics 734.

The Landsat and Sentinel imagery 724 includes multiple bands of red, green and blue wavelengths. The Landsat imagery 724 further includes infrared and near infrared light. The infrared and near infrared light imagery correlate well with crop health. In this regard, when a crop does not have enough nutrients to thrive it reflects light differently than a crop that is healthy. Such a characteristic is exploited by the crop yield algorithm 710 to make estimates regarding crop existence, crop type and/or crop health at a particular geographical location. Weather data 726 can include temperature and precipitation values. As can be appreciated, temperature and precipitation values can suggest crop viability. The data 728 can include characteristics associated with the ground soil. The management data 730 can include information about how the land is managed.

The data from the Landsat imagery 724 is input to a Fourier transform 740. Within the collection of Landsat imagery 630, multiple satellite images exist through the course of the growing season. By observing changes over time in the imagery, conclusions can be made as to what type of crop it is and how healthy that crop was during the course of the growing season. However, as can be appreciated, a time series of image collection can be complicated in the fact that some days are not ideal for data collection (cloudy days that obscure the ground in satellite image). Such unfavorable days introduce noise into the models. The Fourier transform 740 allows the noise to be mitigated from the model by smoothing out the image data. That data is then input to harmonic coefficients 742 where patterns that are representative of the whole growing season can be interpreted. In other words, the time series of data collection is reduced to harmonic coefficients 742. Harmonic coefficients 742 are generated for each pixel across space (and for each season) of the selected geographical location.

The scalable crop yield mapper (SCYM) algorithm generates a relative estimate of crop yield using satellite data. Additional description of the SCYM algorithm may be found in U.S. Pat. No. 9,953,241 by David Lobell which is incorporated herein by reference. The estimation model 774 can use test data 760 from the known yield datasets 722 that has been evaluated at the evaluate model module 762. The estimation model 774 can be used to estimate crop type at geographies where corresponding yield datasets are missing, limited or otherwise unreliable. According to the present disclosure, the output of the SCYM algorithm 750 can be modified or adjusted in a direction that more accurately supports the known yield datasets 722. The crop yield estimate is predicted at 770 and a crop yield map 780 is generated at 780. It will be appreciated that the crop yield map 780 can include either the navigation map 70 to display current or past information or a forecasting map 72 to display forecasted information. In embodiments, the crop yield algorithm 710 can be used for regional agricultural monitoring and reporting, yield gap analysis, targeting agronomic interventions to close yield gaps, assessment of production losses from bad weather and pests, targeting of support programs following agronomic shocks, assessing suitability of the uncropped area for legal agricultural land expansion, and crop insurance risk assessment.

Turning now to FIG. 8, the electrification algorithm 810 will be described in greater detail. In general, the electrification algorithm 810 is used to estimate electricity availability for a particular geography. The electrification algorithm 810 uses inputs including EO imagery 820 and electrification indicators 822. The EO imagery 820 can include VIIRS nightlight imagery 824. The electrification indicators 822 can include data sourced from known powered facilities 830, DHS surveys 832 and web-based, multi-tier framework WB MTF surveys 834. The electrification algorithm 810 generates high-resolution time series data on asset wealth at a 2 kilometer per pixel resolution. Other areas and resolutions are contemplated.

The electrification indicators 822, can be otherwise be referred to as ground-truth data. The electrification indicators 822 provide asset information at geo-referenced survey points. The data can be collected at a broader cluster level. In some examples when the DHS surveys 832 are collected at the household level, the electrification indicators 822 can perform processing on the household level data to aggregate the data up into georeferenced cluster level data. The DHS surveys 832 can include specific electrification information for each household. For example, the DHS surveys 832 can indicate whether electricity is available at a given household.

The electrification algorithm 810 generates models that are used to predict whether electricity exists at a given geography. In particular, the electrification algorithm 810 can be used to estimate electricity availability in all locations in Africa. While the data supplied from the electrification indicators 822 may be limited to a particular geography and/or timeframe, the EO imagery 820 is more readily available for geographical locations in Africa. In this regard, known ground-truth data sourced from the electrification indicators 822 can be aligned with the EO imagery 820 at the same geospatial location. The models can associate information from the pixels of the aligned EO imagery 820 with known wealth values obtained from the electrification indicators 822. The models generated by the electrification algorithm 810 can then be trained to predict electrification for the EO imagery 820 obtained in a geographical location that does not have, or has less reliable corresponding electrification indicators 822. In sum, the electrification algorithm 810 can generate a reliable electrification map for the entire continent of Africa despite having limited ground-truth data from only some locations in Africa that had electrification indicators 822.

The electrification algorithm 810 aligns a timeframe associated with the electrification indicators 822 with a timeframe associated with the EO imagery 820. In examples, a three to four year timeframe is used for the EO imagery 820 and the imagery is averaged. Explained further, EO imagery is collected and associated with the selected electrification indicators 822 at identified geospatial locations. As can be appreciated, a wider timeframe can be desirable as it minimizes the impact of weather conditions such as cloud cover that may negatively impact the quality of the data. It is appreciated that other timeframes may be used within the scope of this disclosure such as annually for example.

Once images are obtained for the electrification indicators 822, datasets are compiled at the data fusion module 60. In one example, each image that is aligned with the corresponding geospatial asset survey data is referred to as a training chip. At 856, the datasets are split into training data and testing data. In general, the electrification algorithm 810 can split the datasets based on countries into the training data 850 and test data 852. By way of example, certain countries in Africa can be assigned as training countries while a different collection of countries in Africa are assigned as test countries. For example, Ethiopia, South Africa and Tanzania can be used as training data 850 to train the models and Nigeria can be assigned as a test data country. The trained models are evaluated at the evaluate model 862 where an evaluation is made to estimate accuracy of the model when the model is applied to a test data country.

The EO imagery 820 is received by a machine learning guided segmented regression module 840 that outputs image data to a regression coefficients module 842. An estimation model 874 receives an output from the regression coefficients module 842. The estimation model 874 models a particular selected geography and an electricity availability estimate is made at the predicted electricity module 870. The electrification maps 880 are output from the predicted electricity module 870. It will be appreciated that the estimation maps 880 can include either the navigation map 70 to display current or past information or a forecasting map 72 to display forecasted information.

Returning now to FIGS. 2 and 3, exemplary hardware for executing the various algorithms will be further described. As identified above, the computer system 100 can include the first device 102 of FIG. 2, the communication path 104 of FIG. 2, and the second device 106 of FIG. 2. The first device 102 can send information over the communication path 104 to the second device 106. The second device 106 can send information over the communication path 104 to the first device 102. However, the first device 102 and the second device 106 can be discussed interchangeably.

The control flow can be implemented by the first software 226 of FIG. 3, the second software 242 of FIG. 3, or a combination thereof. The first software 226 and the second software 242 separately, jointly, or individually can be executed by the first control circuit 212 of FIG. 3, the second control circuit 234 of FIG. 3, or a combination thereof.

The first software 226 can be stored in the first storage circuit 214 of FIG. 3 or the second storage circuit 246 of FIG. 3 or distributed between the two. The second software 242 can be stored in the first storage circuit 214 or the second storage circuit 246 or distributed between the two. The control flow can command actions utilizing the first communication circuit 216 of FIG. 3, the first communication interface 228 of FIG. 3, the first control interface 222 of FIG. 3, the first storage interface 224 of FIG. 3, or a combination thereof as needed. The control flow can command actions utilizing the second communication circuit 236 of FIG. 3, the second communication interface 250 of FIG. 3, the second control interface 244 of FIG. 3, the second storage interface 248 of FIG. 3, or a combination thereof as needed.

The modules described in this application can be stored in the non-transitory computer readable medium. The first storage circuit 214 of FIG. 3, the second storage circuit 246 of FIG. 3, or a combination thereof can represent the non-transitory computer readable medium. The first storage circuit 214, the second storage circuit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

In some examples, the data handling platform 40 gathers data from the satellite image data 44, the survey data 46 and the other data 56. As an example, the satellite image data 44 can be sourced from a single satellite or multiple satellites. The satellite image data 44 can also be sourced from a third party such as Google Earth or other resources. Also for example, the data handling platform 40 can obtain satellite observations based on different sensor technologies, such as optical sensors, thermal sensors, microwave sensors, or a combination thereof.

The satellite image data 44 can include image data from multiple satellites taken at different times. The satellite image data 44, the survey data 46 and the other data 56 are fused at the data fusion module 60. The term "fuse" refers to multi-sensor data fusion, which is a process to combine disparate information from multiple sources, for example, that slightly differ in spatial, temporal and spectral characteristics, to achieve inferences that are not feasible from a single sensor or source. As a specific example, the data handling platform 40 can combine information from Sentinel-2 and Landsat-8 imagery to help generate the satellite image data 44. The satellite image data 44 can also include night light satellite image data. In examples, the night light satellite image data includes visible infrared imaging radiometer suite (VIIRS). In other examples, the satellite image data can include radar satellite image data.

The survey data 46 can include survey data such as open data taken over a predetermined timeframe. The survey data 46 can be survey data sourced from The World Bank. In other examples, the survey data 46 can be survey data sourced from Gallup, Inc. The survey data 46 can additionally include household survey data on economic well-being. The data handling platform 40 can receive many other forms of information collectively referred to as the other observations 56. In examples, the other observations 56 can include one or more of Open Street Map data, internet speed data, advertising data, cellular phone data (such as sourced from Econet Wireless Zimbabwe Ltd. or other cellular providers at the geographical location of interest), social media data (such as sourced from Facebook™, Instagram™, Twitter™, TikTok™, SnapChat™, Twitch™, YouTube™ or other social media platform), property data, plant data (such as Plantix™ data) taken over a predetermined timeframe.

Figure 9:
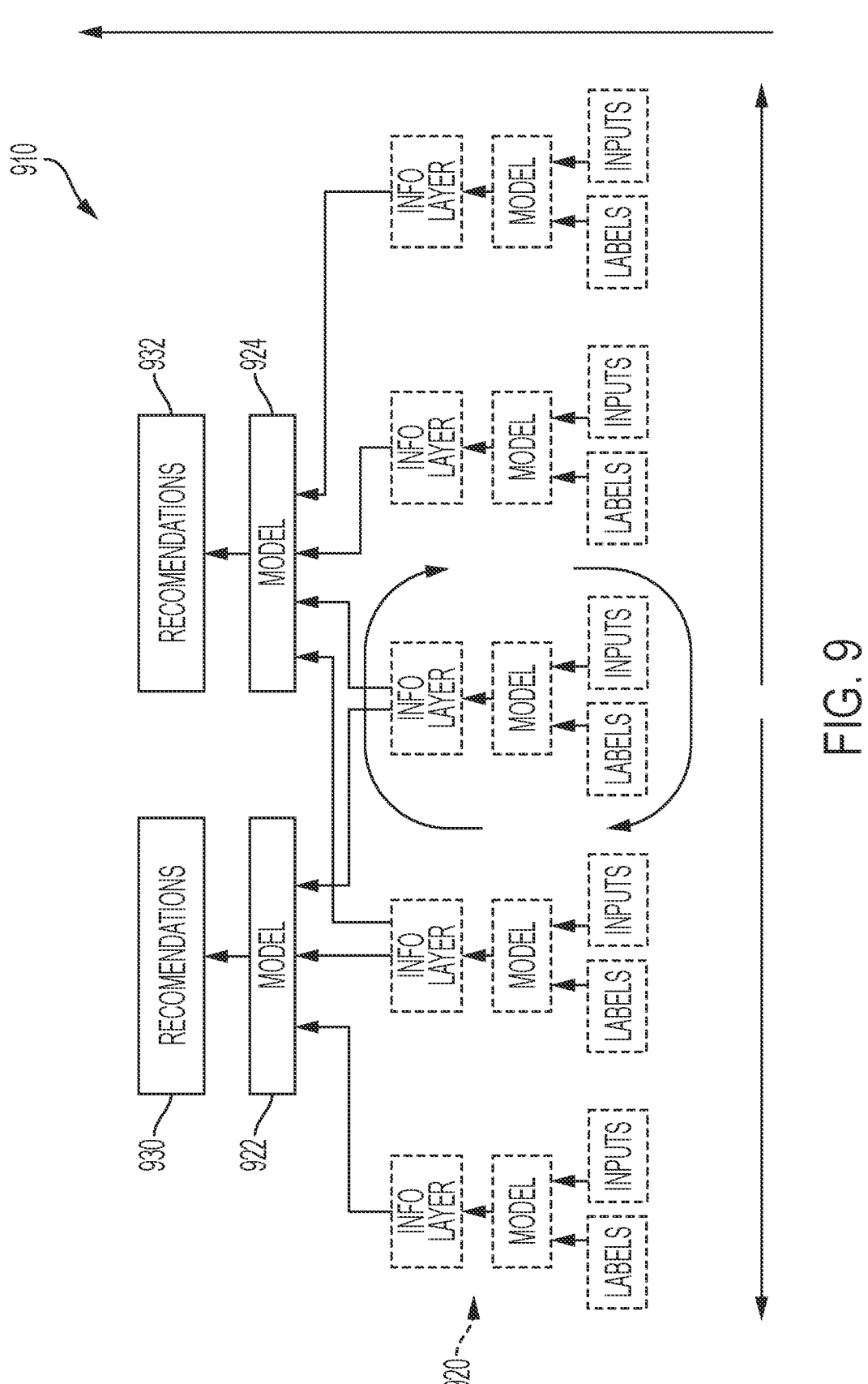
FIG. 9 is a first functional block diagram of the model module of FIG. 1A.

With continued reference to FIG. 1A and additional reference to FIG. 9, is a first functional block diagram 910 representing various techniques performed by the model module 20 of FIG. 1A will be described. The model module 20 conducts multi-task learning 920 where several learning tasks are performed simultaneously. Continuous monitoring and identification of changes in the input features that are expected to generate significant changes in the output of interest are carried out. By way of example, the estimation and prediction modules 64 and 66 can be updated as changes occur as opposed to fixed intervals.

The multi-task learning 920 can offer horizontal agility through unsupervised embeddings. In this regard, translation of high-dimensional vectors into a relatively low-dimensional space that captures some of the semantics of the input offers efficiencies as similar inputs are placed close together in the embedding space. The various inputs are delivered to the models 922 and 924 where recommendations 930 and 932 are generated.

Figure 10:
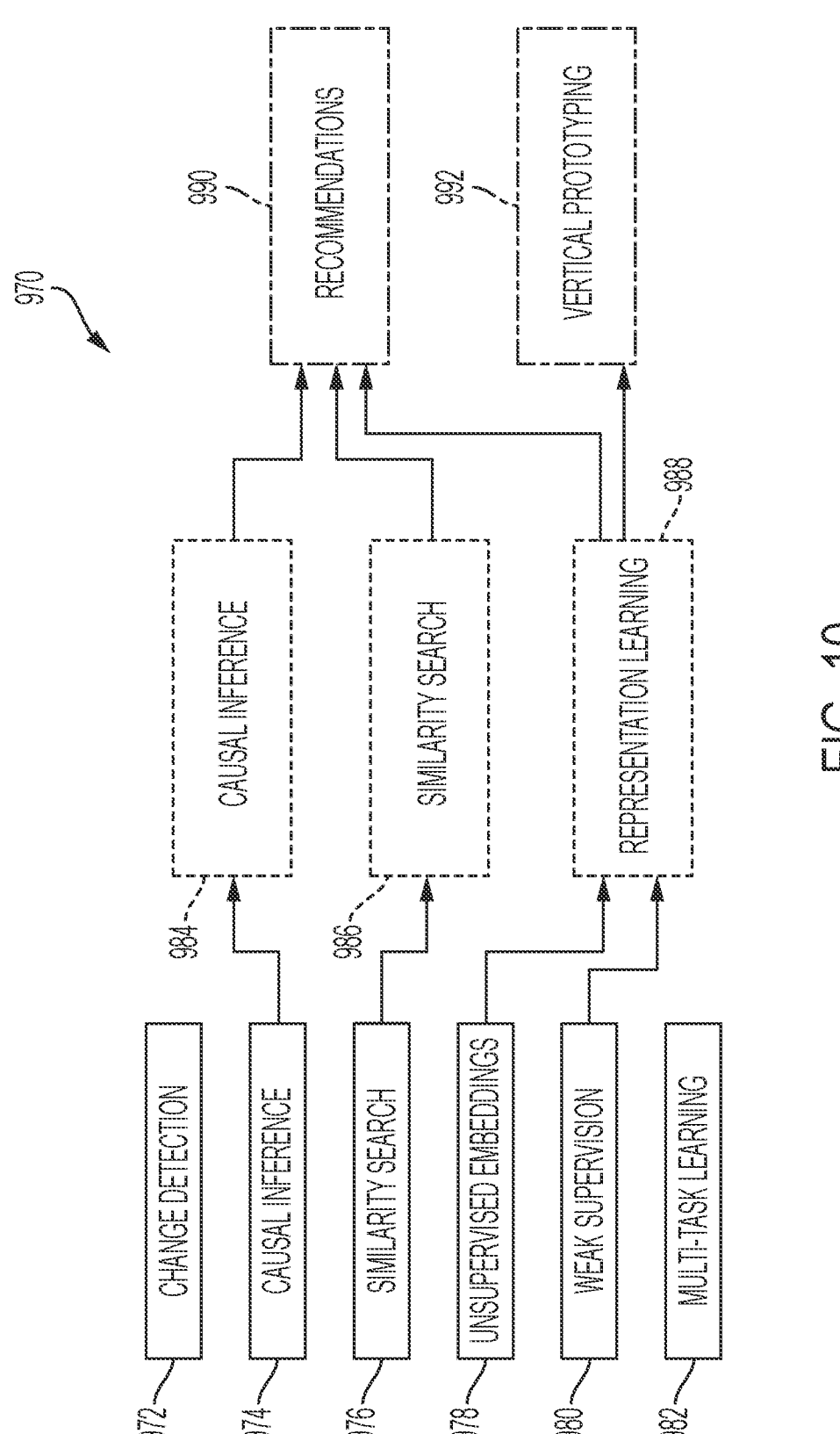
FIG. 10 is a second functional block diagram of the model module of FIG. 1A.

Turning now to FIG. 10 a series of techniques employed by the decision support platform (FIG. 1A) is generally identified at reference 970. It will be appreciated that the decision support platform 10 can leverage some or all of the various techniques with any of the asset wealth, consumption, crop area, crop yield and electrification algorithms 410, 510, 610, 710, and 810 described herein to support or complement any outputs generated by the approximation module 64 or prediction module 66. In general, change detection techniques 972 can include causal inference 974 and similarity search 976. Multi-task learning techniques 982 can include weak supervision 980 and unsupervised embeddings 978. A causal inference module 984 can conduct causal inference analysis. By way of example, the causal inference module 984 can analyze impacts of infrastructure on poverty, impact of interventions (such as by The World Bank), impact of agricultural management practices. A similarity search module 986 can conduct similarity search analysis. By way of example, the similarity search module 986 can be used to identify pest-prone areas, analyze successful locations of infrastructure development (cellphone tower installation, etc.)

The unsupervised embeddings and weak supervision techniques can feed into a representation learning module 988. The representation learning module 988 can conduct representation learning analysis. The causal inference module 984, similarity search module 986 and representation learning module 988 can output results to a recommendations module 990. The recommendations module 990 can supplement the approximation and prediction modules 64 and 66 (FIG. 1A) based on the analysis. A vertical prototyping 992 module can also receive an output from the representation learning module 988.

Figure 11:
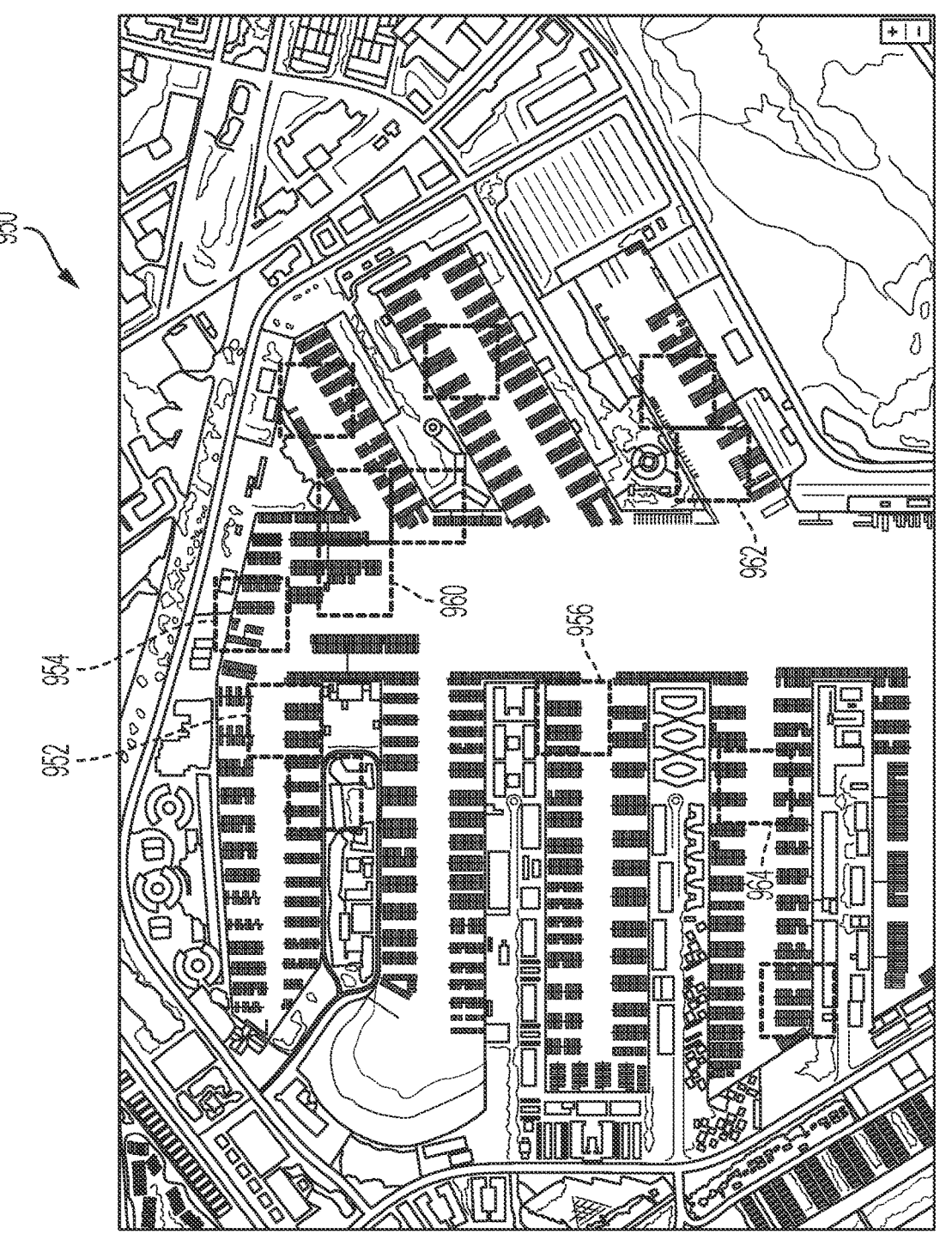
FIG. 11 is an exemplary depiction of a map generated by the model module and incorporating similarity search techniques in accordance with the many examples of the present disclosure.

FIG. 11 is an exemplary depiction of a similarity search map 950 generated by the model module 20 and implementing techniques supported by the similarity search module

986 (FIG. 10) according to the present disclosure. In examples, the similarity search module 986 can select various segments of geography 952, 954, 956, 960, 962 and 964. For example, geography 952 has been shown to support a favorable result. A favorable result can be satisfied in a number of ways depending upon what aspect the user is interested in. For example, the user may desire to focus on asset wealth. Geography 952 may show that an asset wealth index has increased over a timeframe from a first date to a second date. The similarity search module 986 can identify similar geographies, such as geography 956 that have similar characteristics identified in the pixels to the geography 952 at the first date. The similarity search module 986 can analyze what inputs have influenced the favorable change in asset wealth index at the first geography 952 and recommend similar changes to implement at the geography 956.

Figure 12:
FIG. 12 is an exemplary depiction of a map illustrating settlements generated by the model module in accordance with the many examples of the present disclosure.

FIG. 12 illustrates is an exemplary settlement map illustrating settlements identified by the model module 20 from satellite image data 44. The model module 20 can be configured to identify distinct settlement groups. In examples, buildings and their surrounding areas are demarcated by a polygon boundary which can be tagged with one of three settlement types. In the examples shown, settlements 1020, 1022 and 1026 are identified corresponding to built-up areas (BUA), small settlement areas (SSA) and hamlets.

Figure 13:
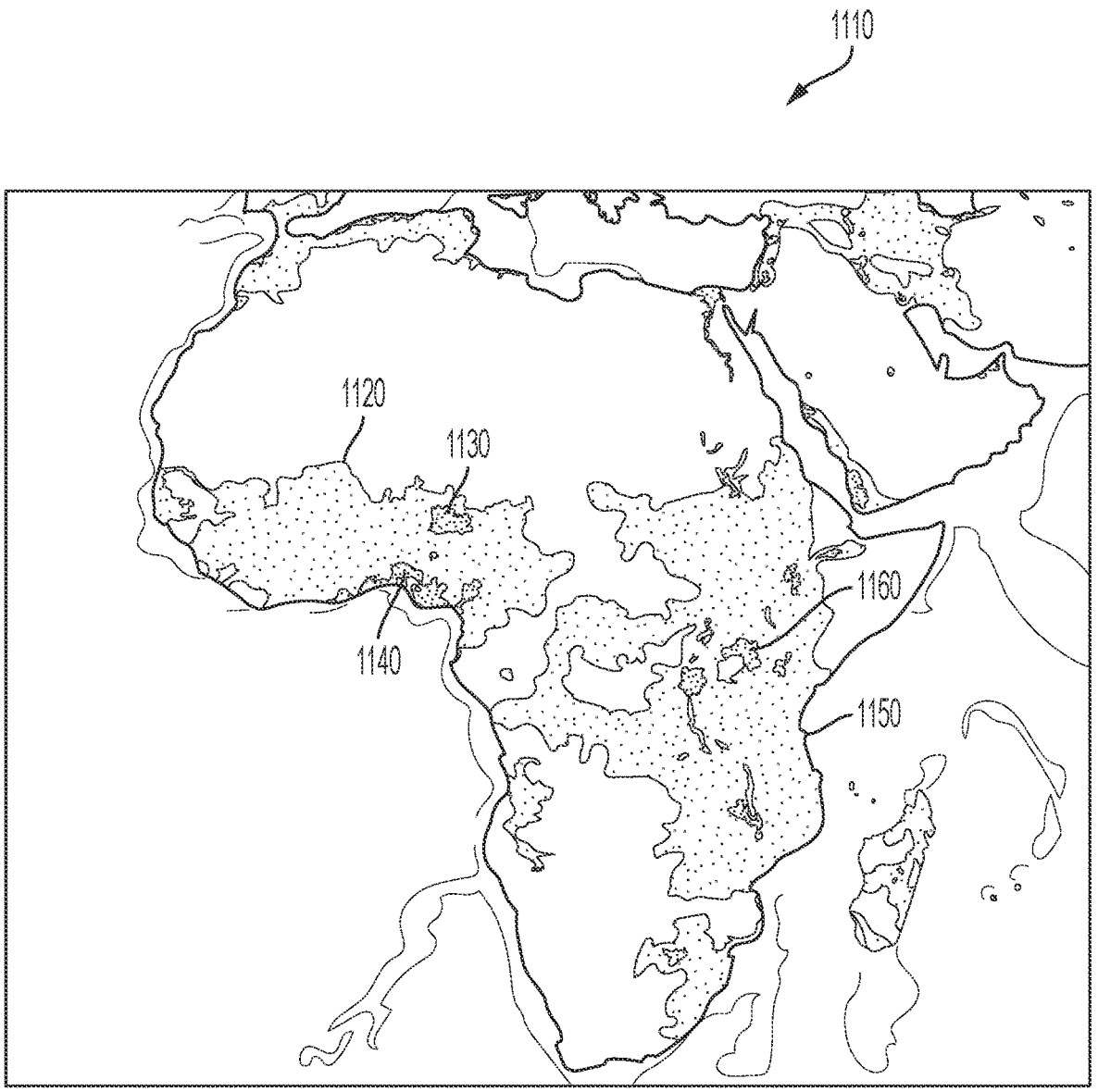
FIG. 13 is an exemplary navigation map generated by the computer system of FIG. 1A.

With reference now to FIG. 13, an exemplary navigation map 1110 generated by the model module 20 is shown. In the exemplary navigation map 1110, a population density generated by the population module 30 is shown. The navigation map 1110 can identify selected geographical locations by color. In this regard, areas 1120 and 1150 can be displayed with a first common color. Additional areas having further distinct colors are contemplated. Areas 1130 and 1160 can be identified by a second common color, distinct from the first color. Area 1140 can be identified by a third color, distinct from the first and second colors. While not specifically shown, a key is provided to correlate actual population values with the identified color. It is appreciated that other navigation maps 70 and forecasting maps 72 can be displayed that when a user is interested in other categories and/or results.

Figures 14, 15:
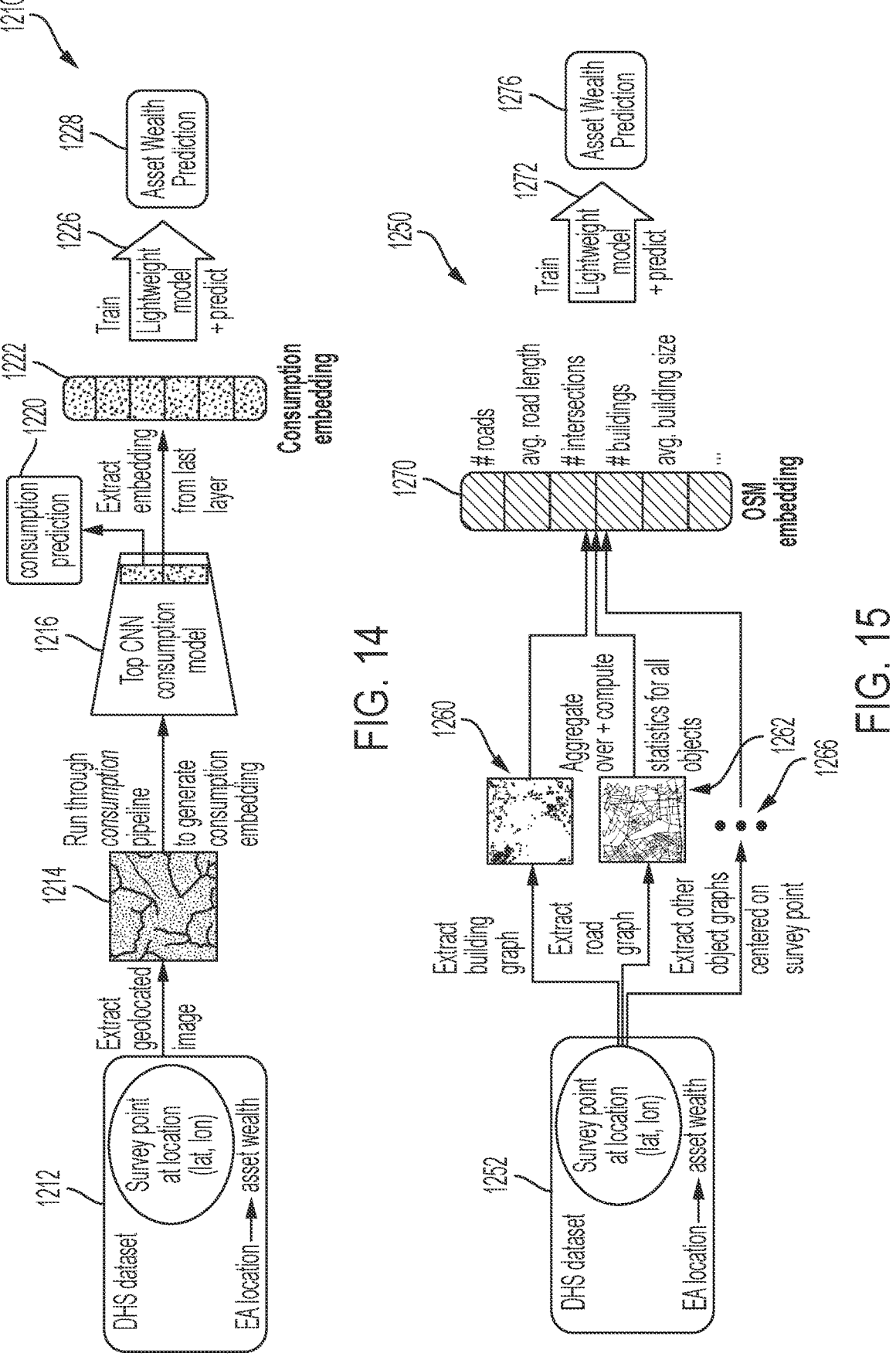
FIG. 14 is an exemplary technique using representation learning for asset wealth prediction according to a first example and executed by the model module of FIG. 1A.
FIG. 15 is an exemplary technique using representation learning for asset wealth prediction according to a second example and executed by the model module of FIG. 1A.

Turning now to FIG. 14, an exemplary technique using representation learning for asset wealth prediction according to a first example is shown and generally identified at reference 1210. The exemplary representation learning technique 1210 uses an existing embedding approach. DHS datasets 1212 are sourced. As noted above, the DHS datasets 1212 can be collected as part of the asset surveys 422 (FIG. 4). Geospatial locations including latitude and longitude values are associated with the DHS datasets 1212. A geolocated image 1214 is extracted from the satellite data 44 (FIG. 1A). The satellite data 44 can include EO imagery having a location corresponding to the DHS dataset 1212. The geolocated image 1214 is run through a consumption pipeline to generate consumption embedding such as set forth by the consumption algorithm 510 discussed above. The consumption embedding is received by the CNN consumption model 1216. The CNN consumption model 1216 can already be trained whereby no additional training is required. A consumption prediction or estimate 1220 is output from the CNN consumption model 1216. Embedding 1222 can be extracted from the last layer of the consumption model 1216. A prediction model 1226 outputs an asset wealth prediction or estimate 1228.

Turning now to FIG. 15, an exemplary technique using representation learning for asset wealth prediction according to a second example is shown and generally identified at reference 1250. The exemplary representation learning technique 1250 uses an OpenStreetMap (OSM) object approach. DHS datasets 1252 are sourced. As noted above, the DHS datasets 1252 can be collected as part of the asset surveys 422 (FIG. 4). Geospatial locations including latitude and longitude values are associated with the DHS datasets 1252. A building graph 1260 is extracted from the EO imagery 420 (such as sourced from the satellite data 44) having a locating corresponding to the DHS dataset 1252. A road graph 1262 is extracted from the EO imagery 420 (such as sourced from the satellite data 44) having a location corresponding to the DHS dataset 1252. Other objects 1266 are extracted from the EO imagery 420 (such as sourced from the satellite data 44) having a location corresponding to the DHS dataset 1252. OSM embeddings 1270 are extracted. The OSM embeddings can include various features such as, but not limited to, the number of roads, average road length, number of intersections, number of buildings, average building size. A prediction model 1272 outputs an asset wealth prediction or estimate 1276.

Figure 16:
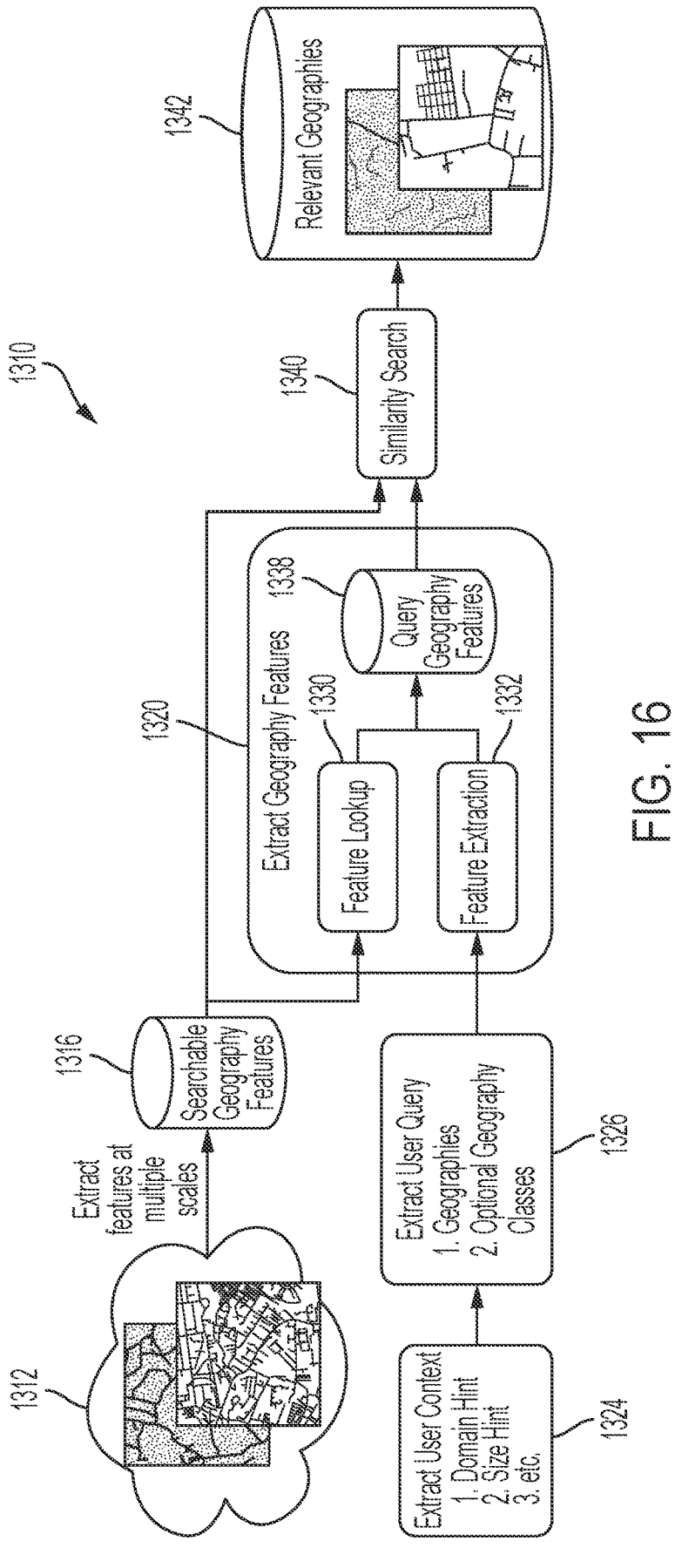
FIG. 16 is an exemplary technique using similarity search according to the present disclosure and executed by the model module of FIG. 1A.

With reference now to FIG. 16, an exemplary technique using similarity search and executed by the similarity search module 986 according to the present disclosure is shown and generally identified at reference 1310. Features are extracted from the extracted from the satellite data 44. Searchable geography features 1316 are identified and received by an extraction module 1320. User context is extracted at 1324. User context can be user identified inputs such as domain, size and other criteria tagged as relevant for the similarity search. User query is extracted at 1326. User query 1326 can be user identified geographies. The user context 1324 and user query 1326 can be received by the extraction module 1320. Feature lookup 1330 and feature extraction 1332 are sent to a query geography features module 1338. Similarity search 1340 is performed and relevant geographies 1342 satisfying the similarity search are identified.

With reference to FIG. 17, a computer-implemented method of determining economic well-being geographically according to examples of the present disclosure is shown and generally identified at reference numeral 1500. A geographical region is selected at 1510. Historical observations are received and stored at 1512. The historical observations are taken over a predefined timeframe associated with image data and survey data for the geographical region. A first categorical model is generated at 1514. The first categorical model has a first geospatial dataset related to one or combinations of economic, agricultural and infrastructure information based on the historical observations. A navigation map is generated at 1516. The navigation map displays the first categorical model across the selected geographical region.

With reference to FIG. 18, a computer-implemented method of determining economic well-being geographically according to further examples of the present disclosure is shown and generally identified at reference numeral 1550. A geographical region is selected at 1552. Historical observations are received and stored at 1554. The historical observations include a first historical observation generated from first survey data related to a population of the geographical region. The historical observations further include a second historical observation generated from image data and second survey data for the geographical region. A first categorical model is generated at 1556. The first categorical model has a first geospatial dataset related to the population of the geographical region based on the first historical observations. A second categorical model is generated at 1558. The second categorical model has a second geospatial dataset related to at least one or combinations of economic, agricultural and infrastructure information based on the second historical observations. A first target profile is received at 1560. The first target profile is associated with the first categorical model. A second target profile is received at 1562. The second target profile is associated with the second categorical model. A navigation map is generated at 1564. The navigation map displays an output that satisfies both of the first and second target profiles.

Figure 19:
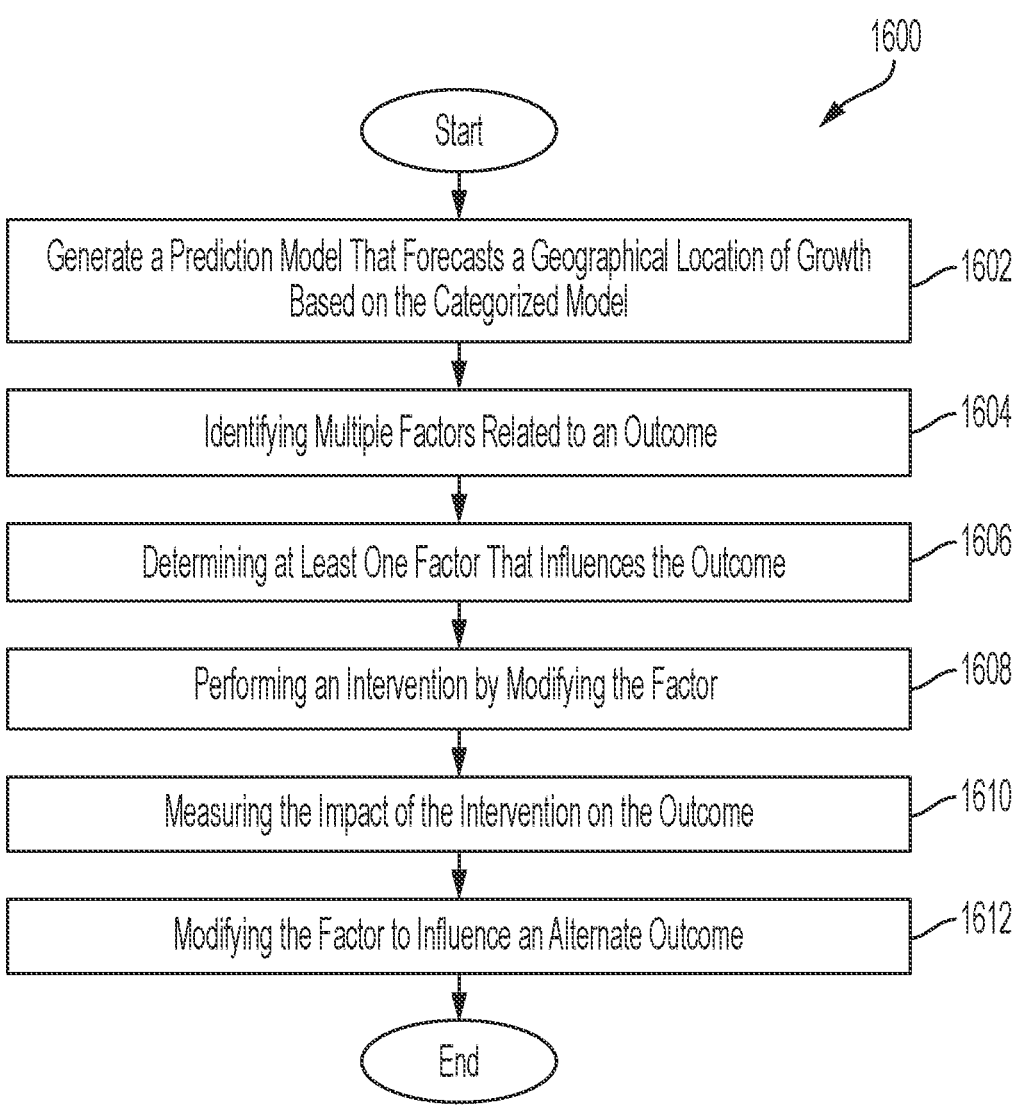
FIG. 19 is a flow chart showing a method of generating a prediction model according to examples of the present disclosure.

With reference to FIG. 19, a method of generating a prediction model according to examples of the present teachings is shown and generally identified at reference 1600. A prediction model is generated at 1602. The prediction model forecasts a geographical location of growth based on the categorical model. Multiple factors are identified related to an outcome at 1604. At least one factor that influences the outcome is determined at 1606. An intervention is performed by modifying the factor at 1608. The impact of the intervention on the outcome is measured at 1610. The factor is modified at 1612 to influence an alternate outcome.

Figure 20:
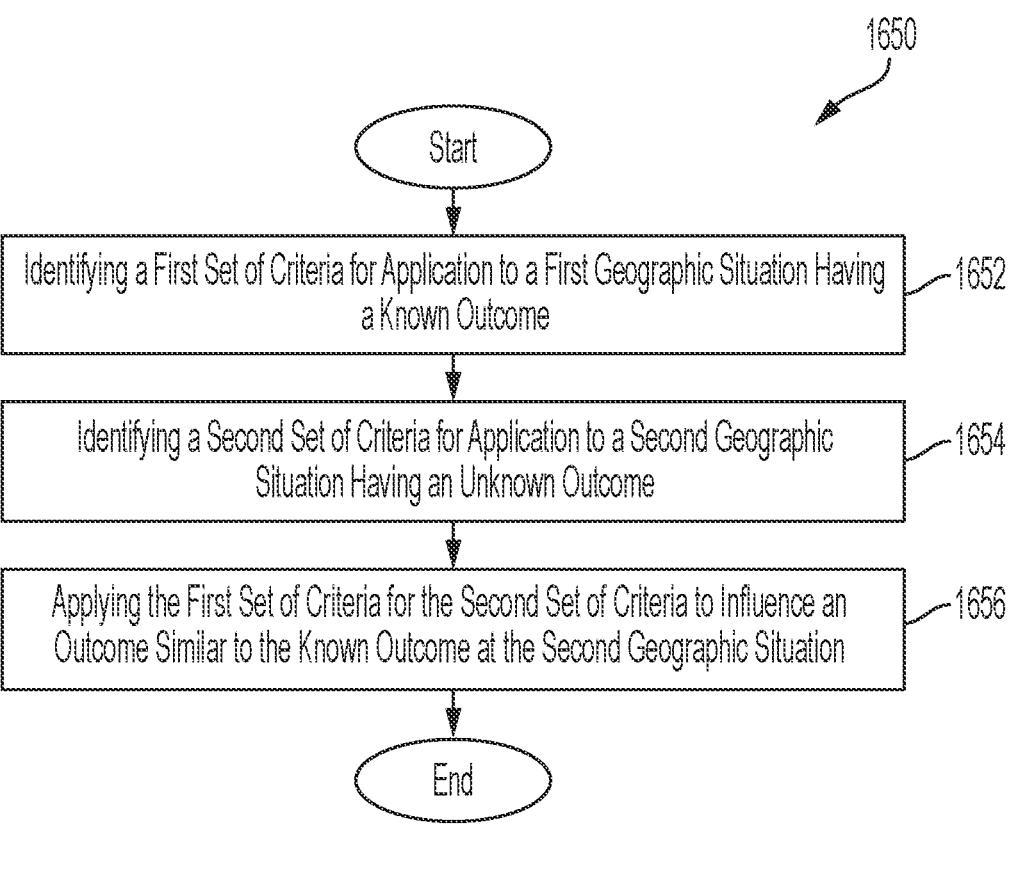
FIG. 20 is a flow chart showing a method of generating a prediction model according to examples of the present disclosure.

With reference to FIG. 20, a method of generating a prediction model according to further examples of the present teachings is shown and generally identified at reference 1650. A first set of criteria is identified at 1652. The first set of criteria is identified for application to a first geographic situation having a known outcome. A second set of criteria is identified at 1654. The second set of criteria is identified for application to a second geographic situation having an unknown outcome. The first set of criteria is applied for the second set of criteria at 1656. The first set of criteria is applied to the second set of criteria to influence an outcome similar to the known outcome of the second geographic situation.

Turning now to FIGS. 21-23B, a user interface generated by the onboarding module 82 (FIG. 1B) will be further described. As explained above, the user can enter various known data and objectives into the decision support platform 10 using the onboarding module 82. Exemplary user interface pages provided by the onboarding module 82 are shown in FIGS. 21-23B. FIG. 21 shows an exemplary account management page 2000 where a user enters a company name at field 2010, a type of account (individual, company, etc.) at field 2012 and individuals who are to be granted access to the account at field 2014. As can be appreciated, some individuals can be granted viewing and/or editing privileges. In the account management page 2000, a user can import company specific badging such as a company logo at field 2020.

Figure 22B:
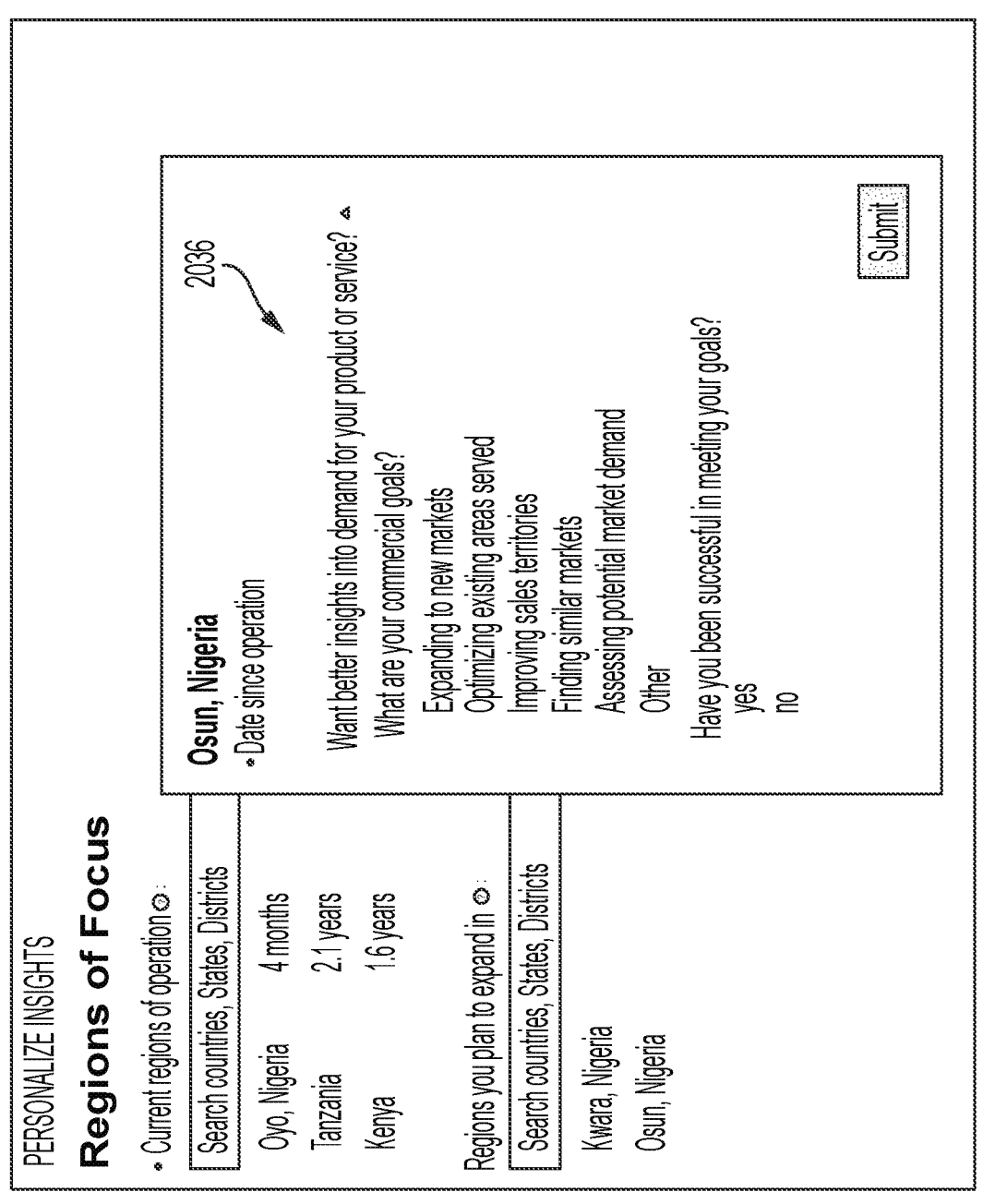
FIG. 22B is an exemplary onboarding user interface showing various questions posed to the user generated by the onboarding module of the user interface and region recommendation platform according to various examples.
Figure 23A:
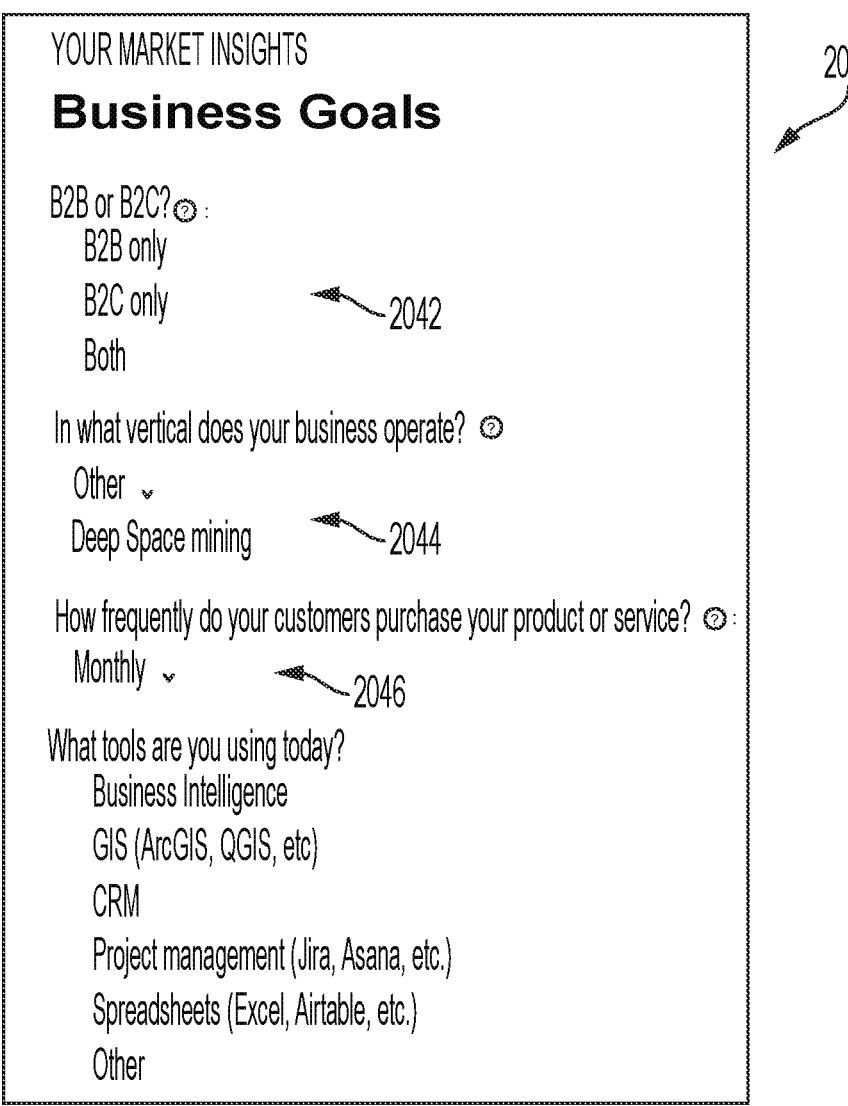
FIG. 23A is an exemplary onboarding user interface showing a business goals page according to various examples.
Figure 24:
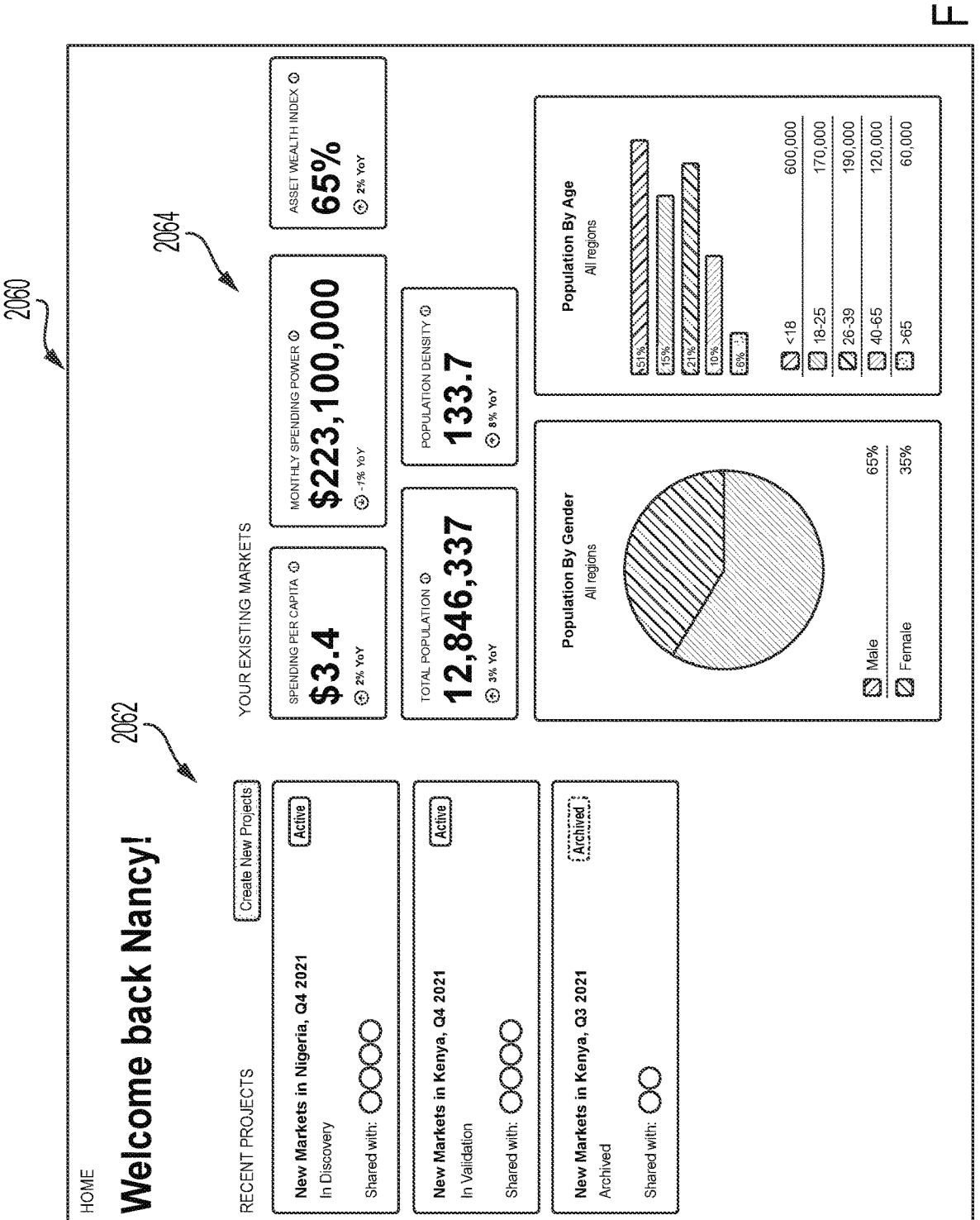
FIG. 24 illustrates an exemplary home page displaying a recent projects field and an existing markets field generated by a home module of the user interface and region recommendation platform according to various examples.

FIGS. 22A and 22B illustrate an exemplary regions of focus page 2030 generated by the onboarding module 82 (FIG. 1B) where the user can upload various customer data. The customer data can include various data identified above. In examples, the customer data can include information related to business performance, customer profile, and business assets. Business performance can include data related to revenues, costs, operating procedures, inventory and supply chain policies and labor structure. Customer profiles can include data related to psychographics, spending patterns, financial capacity, such as savings, credit history and loans, orders and other transactions. Business assets can include data related to factories, distribution facilities, inventories, offices or operating sites, infrastructure such as plants towers or other equipment. In examples, current regions of operation are entered at field 2032 along with associated timeframes of operation at the current regions at field 2034. The current regions of operation may be selected from a drop-down menu, entered manually and/or selected from a map. While the exemplary field 2032 shows countries it is contemplated that the identified regions will be more localized such as a district, city, township, or village. As noted above, the onboarding module 82 of the user interface and region recommendation platform 80 can generate a personal onboarding assistant 2036 that can assist with the onboarding process. The onboarding assistant 2036 can offer direct communication between the user and a trained professional of the user interface and region recommendation platform 80 such as through live chat, live voice and/or live video to ensure that the data is uploaded successfully. The user is further invited to opt-in to receive additional insights into demand for their product or service at FIG. 22B. When a user elects to opt-in to additional insights, various questions can be posed to the user related to commercial goals as shown at 2036. FIG. 23A illustrates an exemplary business goal page 2040 generated by the onboarding module 82. In examples, a user can identify whether their company is interested in business to business (B2B) or business to consumer (B2C) products or services at field 2042. As can be appreciated purchasing power can vary dependent upon B2B or B2C business models. In addition, a user can identify what vertical their company operates on at field 2044. By way of example, a telecom company may be interested in terrestrial fiber line data or line of site data. A user can also identify the frequency at which their customers purchase their product or service at field 2046. For example, a purchase frequency can be monthly, daily, weekly, quarterly, annually, etc. It is contemplated that the user can further enter a percentage of a customers' total frequency spending that is allocated to this product or service.

FIG. 23B illustrates an exemplary import data page 2050 related to the onboarding module 82. At the import data page 2050, the user provides the user interface and region recommendation platform 80 with user data to provide deeper insights into the user's current region of focus and new regions the user plans to expand into. User data can include retail store and/or purchase sites. In examples, the import data page 2050 can additionally or alternatively request survey data to supplement any collected user data. In various examples, the user interface and region recommendation platform 80 can recommend market expansion locations based on existing parameters at current operational locations (retail stores, purchase sites, etc.). User data can further include existing sales data. In various examples, the user interface platform can locate more customers based on existing sales performance. Historical sales data can be combined with previous regions of operation to narrow down key regions of interest in current operational markets. Demand modelling and revenue intelligence can be provided where a user can place a proposed new location at a geographical location to see expected consumer demand and revenue. It is contemplated that a user can compare results from various proposed geographical locations to gain insight into how one location may provide demand and/or revenue advantages over another location. In examples, the data import page 2050 can be configured to import user data specific to the user's industry or business focus. For example, for a business focused on telecom, the data imported can include data related to telecom, such as, but not limited to, call data records, sales, service reliability data and statistics, and tower locations. In other examples, for a business focused on energy, the data import can include data related to energy, such as, but not limited to, consumption usage, generators, service reliability, networks, and meters.

Figure 25:
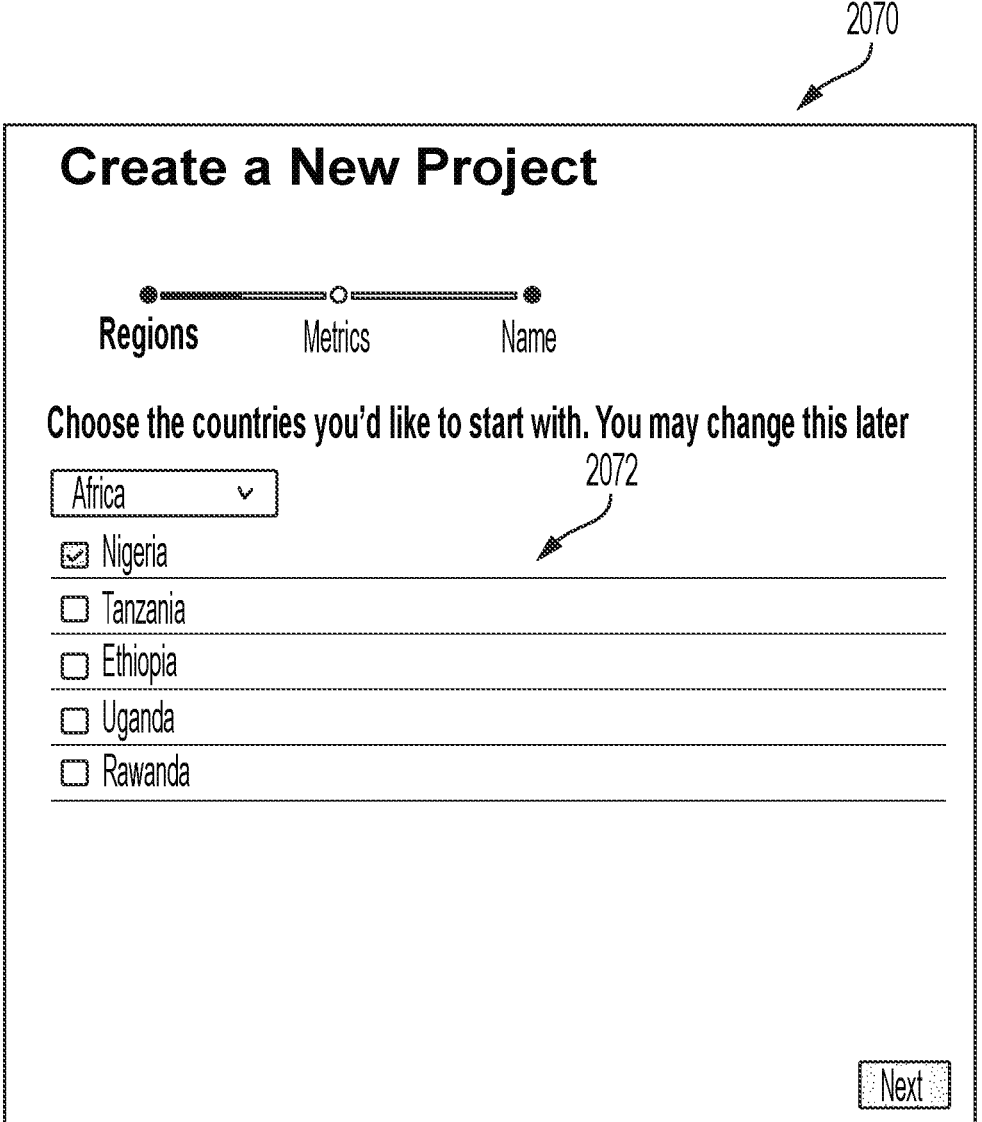
FIG. 25 illustrates an exemplary regions selection page generated by a region identification module of the user interface and region recommendation platform according to various examples.
Figure 26:
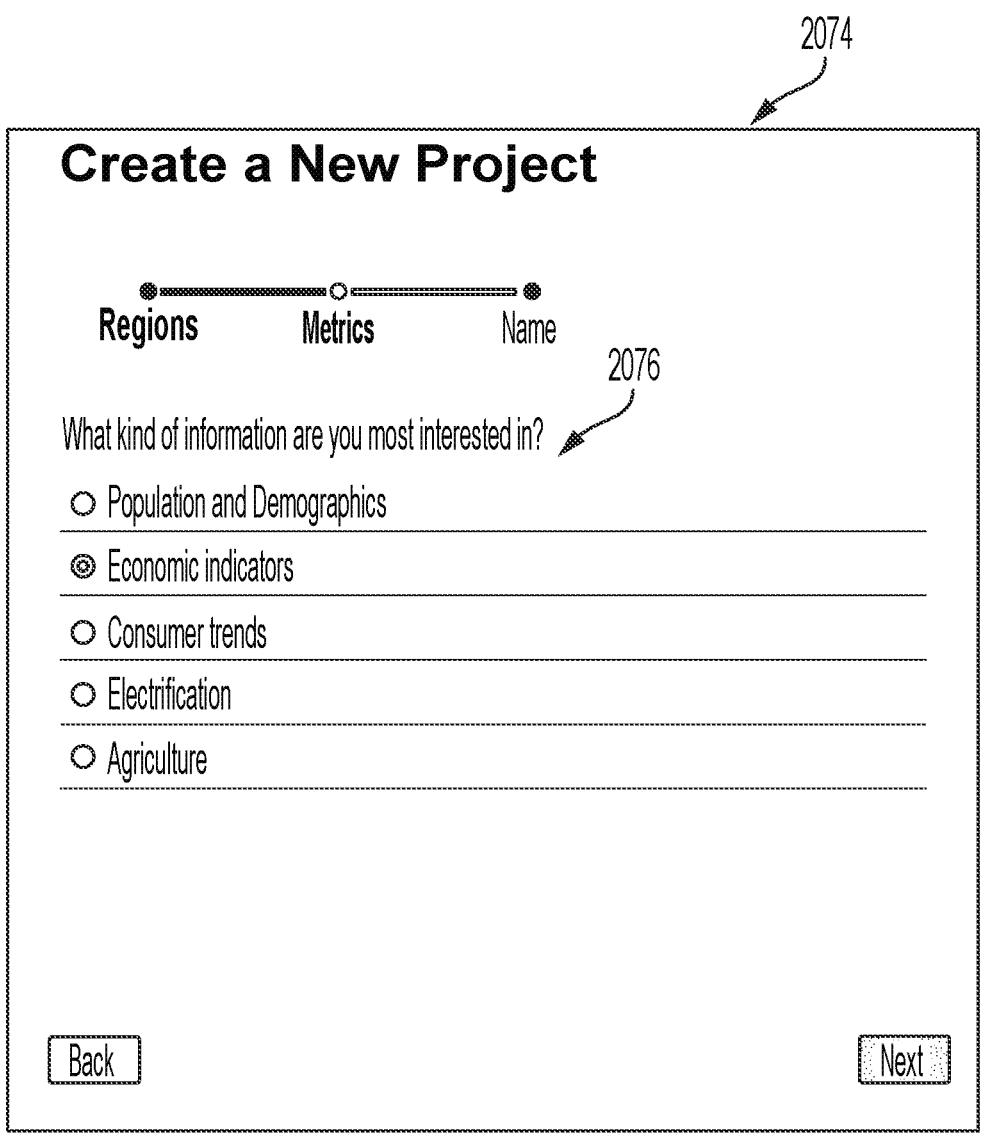
FIG. 26 illustrates an exemplary metrics selection page generated by the region identification module according to various examples.
Figure 27:
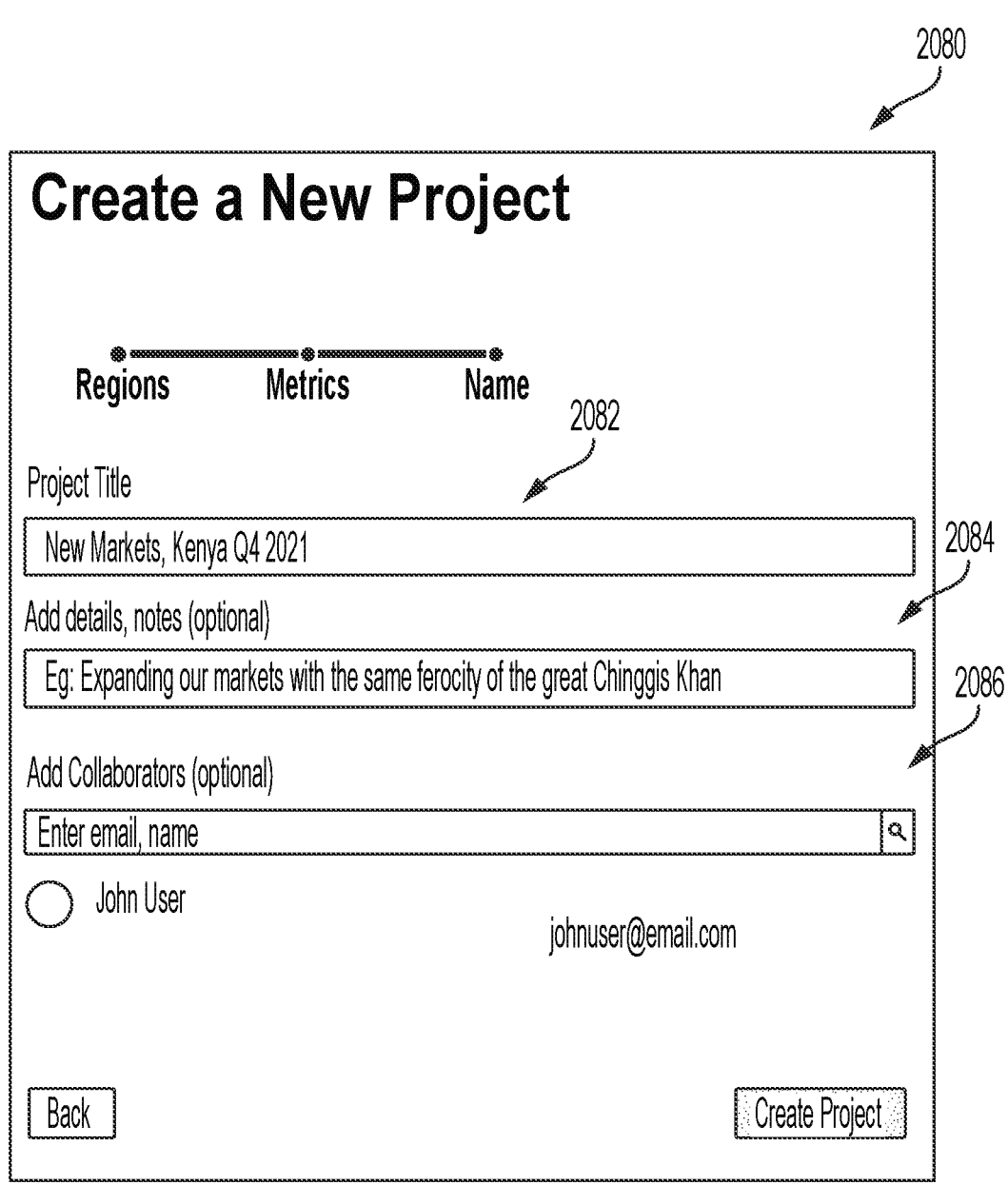
FIG. 27 illustrates an exemplary name entry page generated by the region identification module according to various examples.

Turning now to FIGS. 24-27, the home module 83 will be further described. The home module 84 generates a welcome or home page 2060. The home page 2060, can also be referred to as a "dashboard" and includes a recent projects field 2062 where the user can view the current status of a particular project and the current approved collaborators (see FIG. 21, field 2014 of the onboarding process). The home page 2060 can also display a summary collection 2064. The summary collection provides a summary of the users' existing markets. It will be appreciated that the summary collection 2064 is based on the data uploaded during the onboarding process. By way of example, the summary collection 2064 can include a data snapshot including a statistical view related to spending per capita, monthly spending power, asset wealth index, total population, population density, population by gender and population by age. The summary collection 2064 can be arranged to display additional data that may be important to the user. FIGS. 25-27 illustrate new project pages generated by the regions identification module 84 where the user identifies regions, metrics and names related to a new project. FIG. 25 illustrates a regions selection page 2070. In the regions selection page 2070, the user selects the countries they are interested in expanding at in field 2072. FIG. 26 illustrates a metrics selection page 2074. In the metrics selection page 2074, the user selects the metrics they are most interested in at field 2076. By way of example, the metrics can include population and demographics, economic indicators, consumer trends, electrification, and agriculture. FIG. 27 illustrates a name entry page 2080. In the page entry page 2080, the user names the project at field 2082. Additional notes may be entered in field 2084. Collaborators may be entered in field 2086. In examples, the home page 2062 can also provide information related to customer locations relative to tower service areas (telecom user) or power supply service areas (energy user).

Once the user has completed the steps associated with the onboarding module 82 and the home page 83, the user proceeds to the region identification module 84. As noted above, the region identification module 84 generates instructs to the user to select the region of interest. In general, the region identification module 84 provides three ways for a user to select a region of interest, by filters (FIGS. 28 and 29), by geometry (FIG. 30) and by selecting from a list (FIG. 31). The region identification module 84 can identify regions specific to supplier operator and/or service areas.

Figure 28:
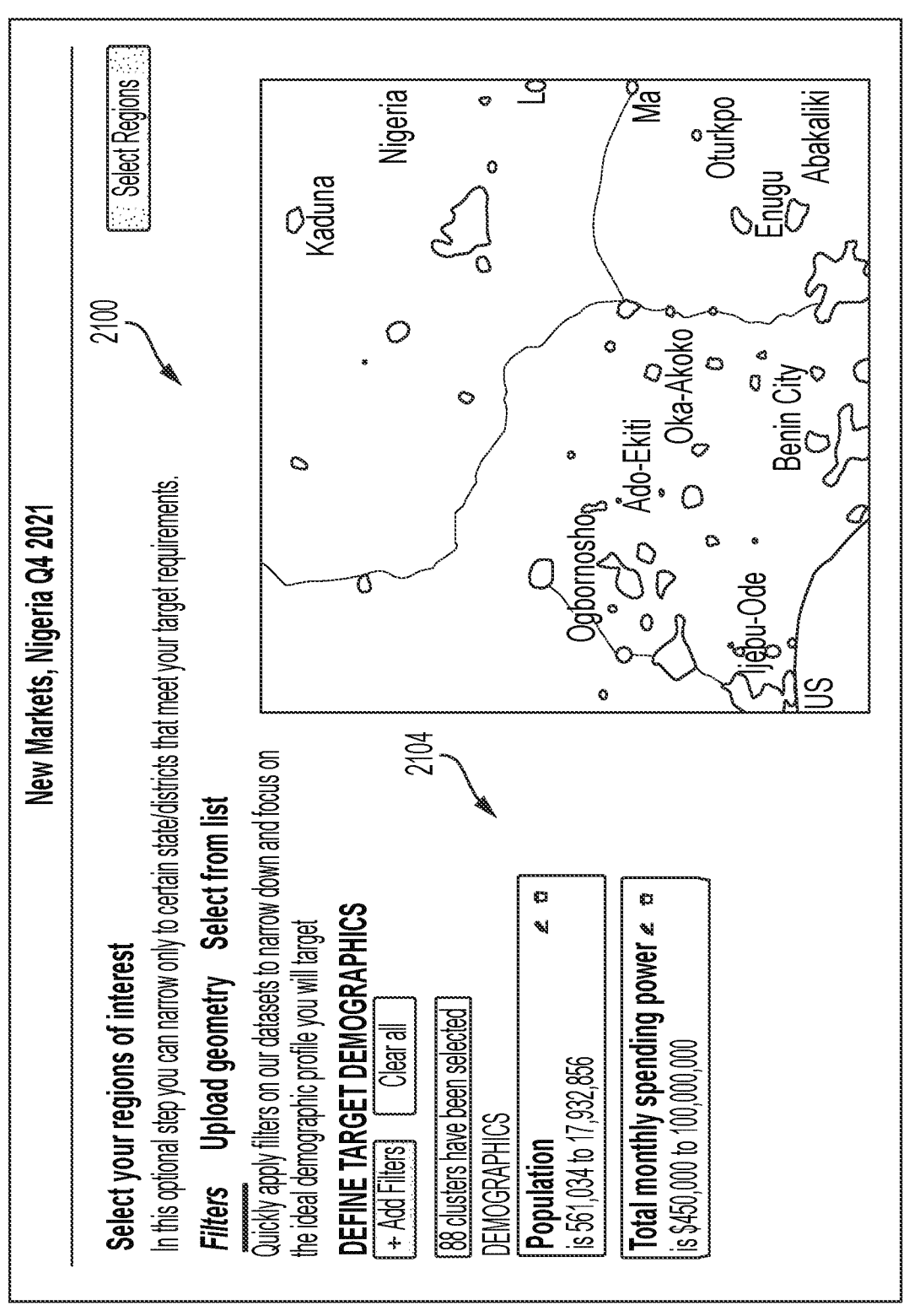
FIG. 28 illustrates a first filter entry page generated by the region identification module according to various examples.
Figure 29:
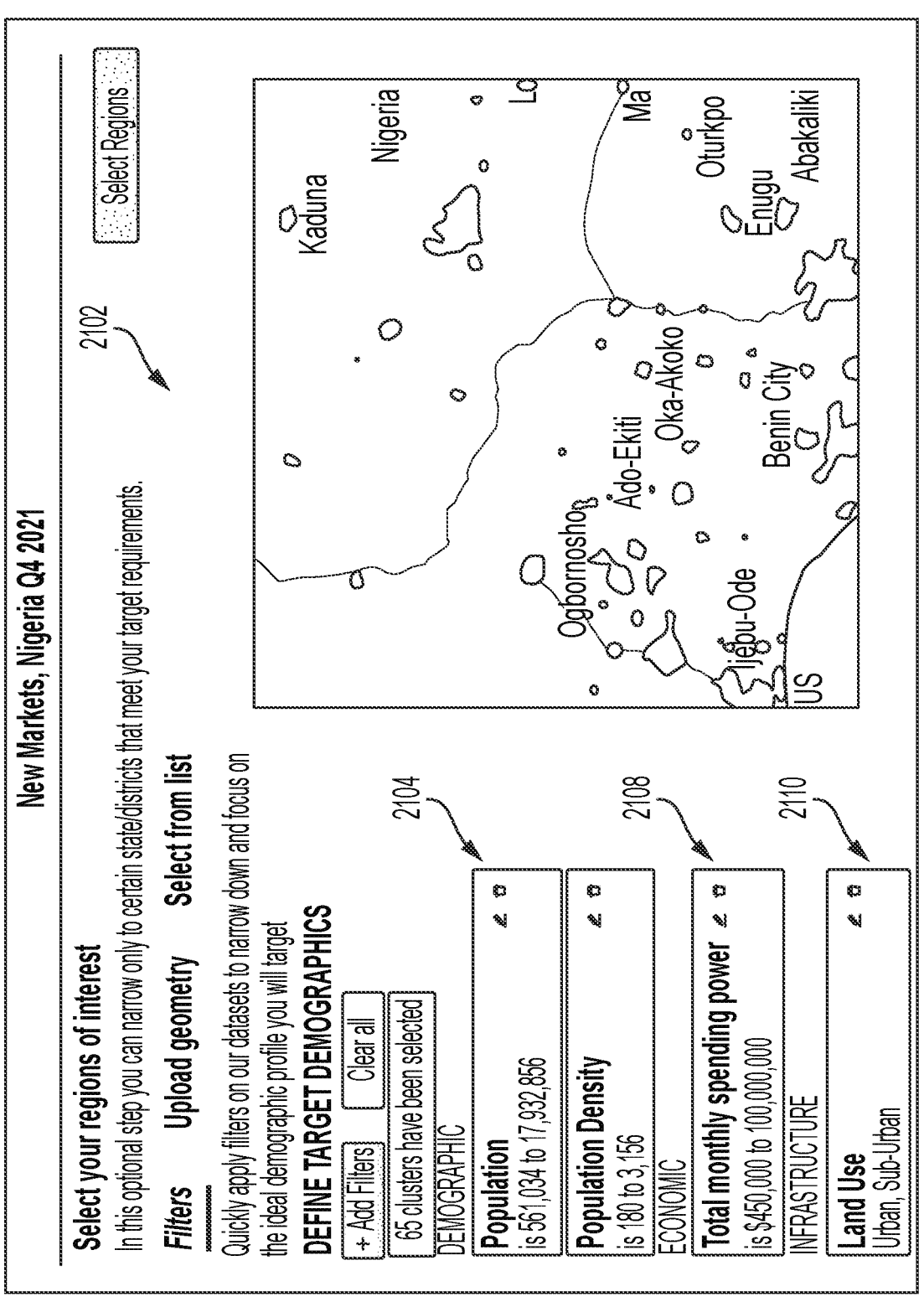
FIG. 29 illustrates a second filter entry page generated by the region identification module according to various examples.

A first and second filter entry page 2100 and 2102 generated by the region identification module 2080 are shown at FIGS. 28 and 29, respectively. In some examples, a user may be familiar with certain characteristics of a current customer in a first country (such as Tanzania). In this regard, a population range and a total monthly spending power of a current customer in Tanzania is known and the same demographic characteristics are desired in a new country (such as Nigeria). In examples, the user can select desired filters having these same characteristics at a demographic field 2104. It is appreciated that the range options offered at the demographic field 2104 tracks the information generated at the categorical models 22 (FIG. 1A). In other examples, the user may want to further narrow the criteria by adding additional filters. As shown in FIG. 29, additional filters related to economy and infrastructure have been selected at an economy field 2108 and an infrastructure field 2110. Additional fields and/or filters can be used relating to population, age, gender, education levels, device ownership, fiber alignment, tower locations, appliance ownership and asset locations.

Figure 30:
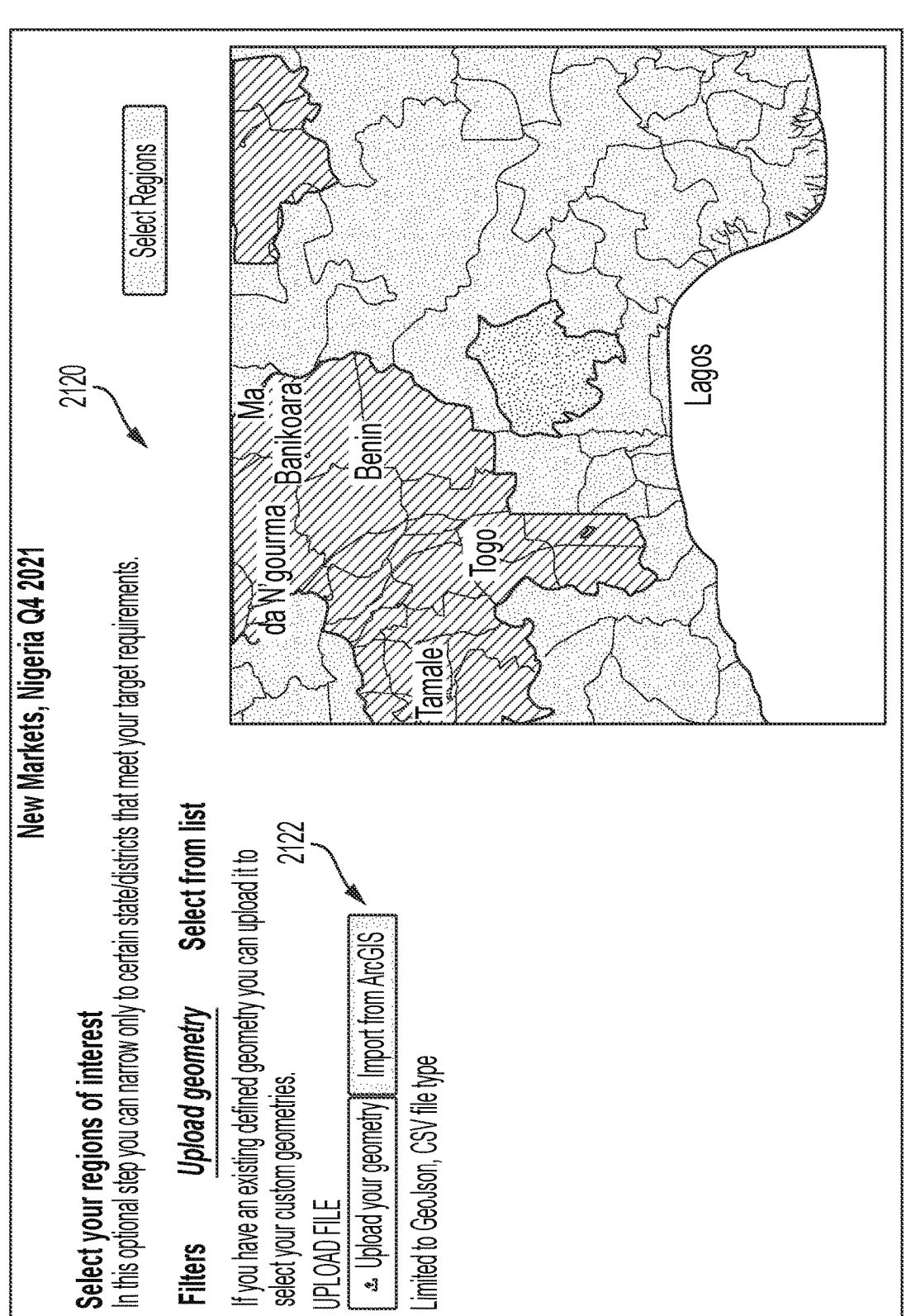
FIG. 30 illustrates a geometry upload page generated by the region identification module according to various examples.
Figure 31:
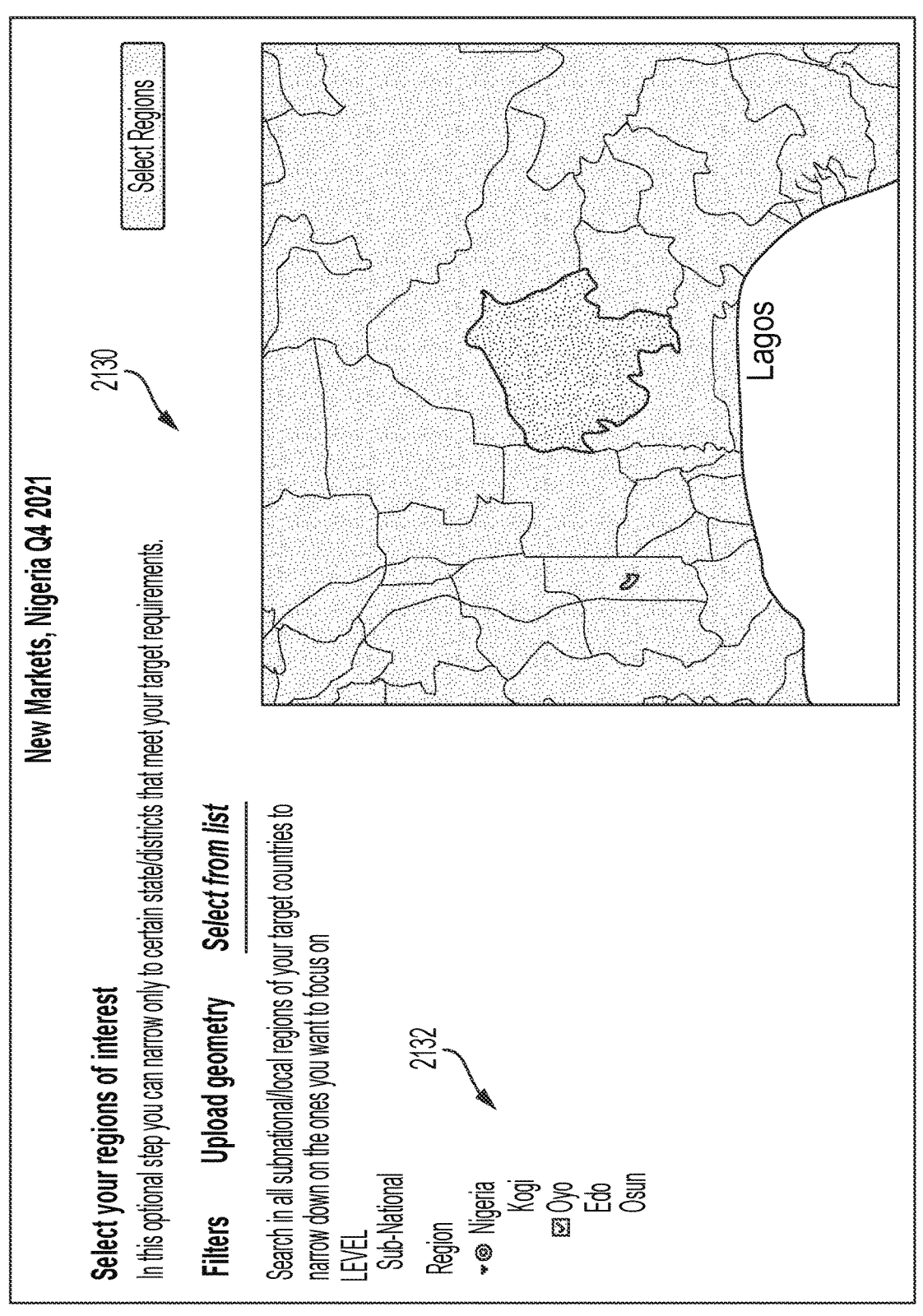
FIG. 31 illustrates a list page generated by the region identification module according to various examples.

With particular reference to FIG. 30, the second method of selecting a region of interest by uploading a geometry will be further described. An upload geometry page 2120 generated by the user interface and region recommendation platform 80 allows a user to upload a geometry at field 2122. In the example shown, the user can import from a cloud-based mapping software such as ArcGIS. With reference to FIG. 31, the third method of selecting a region of interest by selecting from a list will be further described. A list page 2130 generated by the region identification module allows a user to select a region from a list. In the example shown, the Oyo region has been selected in field 2132 from Nigeria. In examples, the region identification module 84 can identify administrative units such as census blocks, districts, wards or counties.

Figure 32:
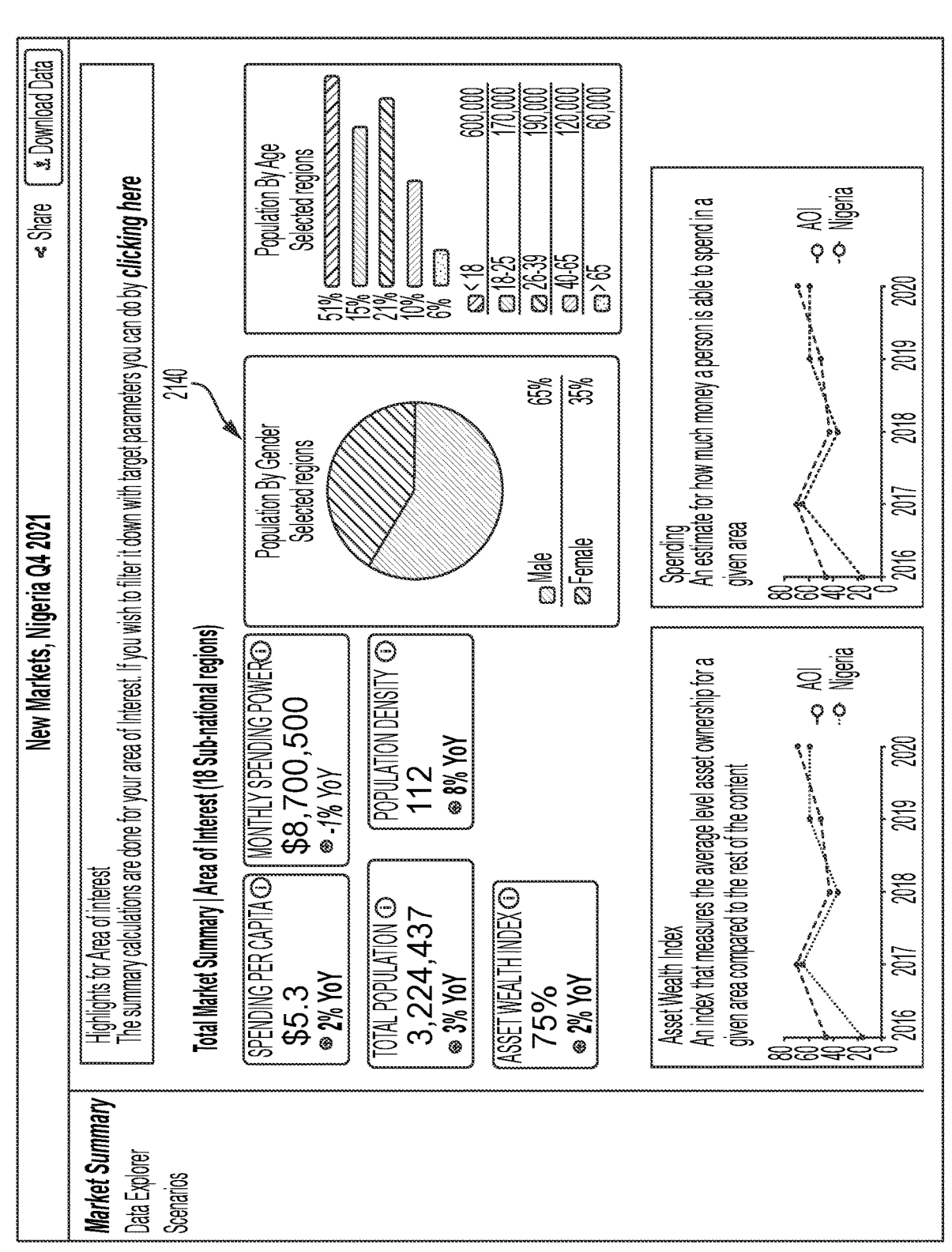
FIG. 32 illustrates a first total market summary page generated by a market summary module of the user interface and region recommendation platform according to various examples.
Figure 33:
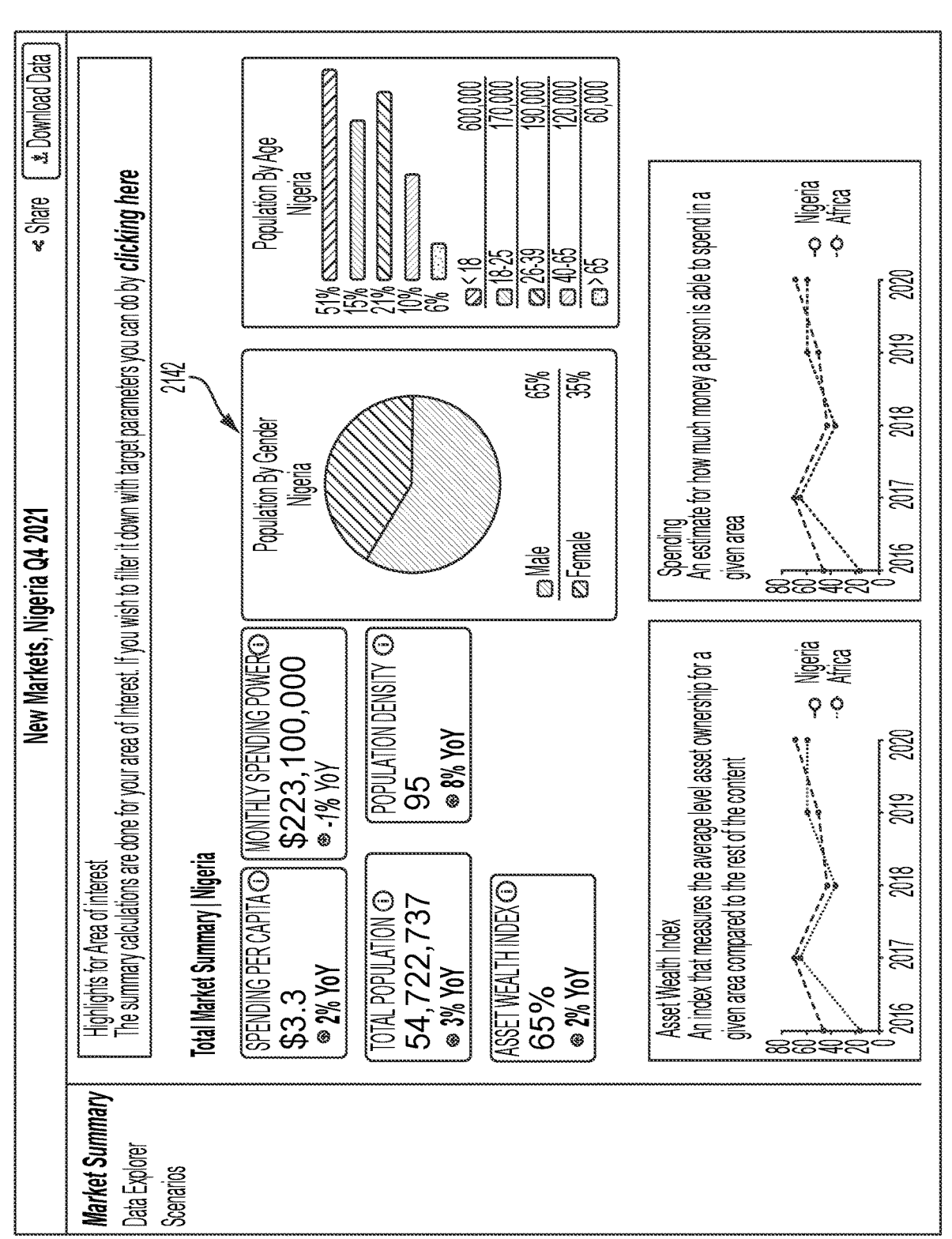
FIG. 33 illustrates a second total market summary page generated by the market summary module according to various examples.

Once the user has completed the steps associated with the region identification module 84, the user proceeds to the market summary module 85. The market summary module 85 generates a first proposed market summary page 2140, FIG. 32. The first proposed market summary page 2140 provides summary calculations for an area of interest (proposed future markets) including 18 sub-national regions. A second proposed market summary page 2142 generated by the market summary module 85, shown in FIG. 33, provides summary calculations for a single area of interest (future market). In the example shown the area of interest has been selected as Nigeria.

Figure 34:
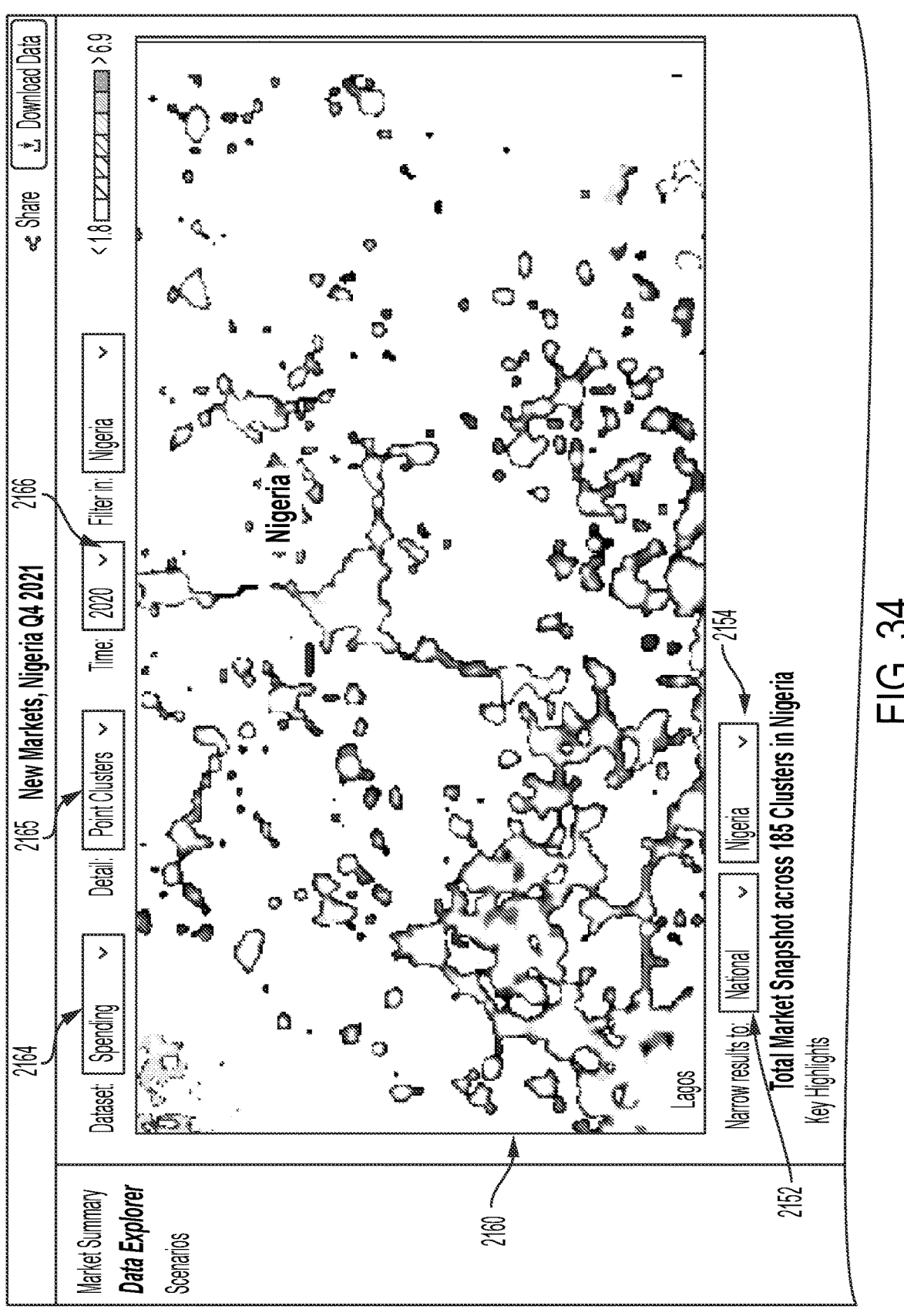
FIG. 34 illustrates a first snapshot page generated by the data explorer module according to various examples.
Figure 34:
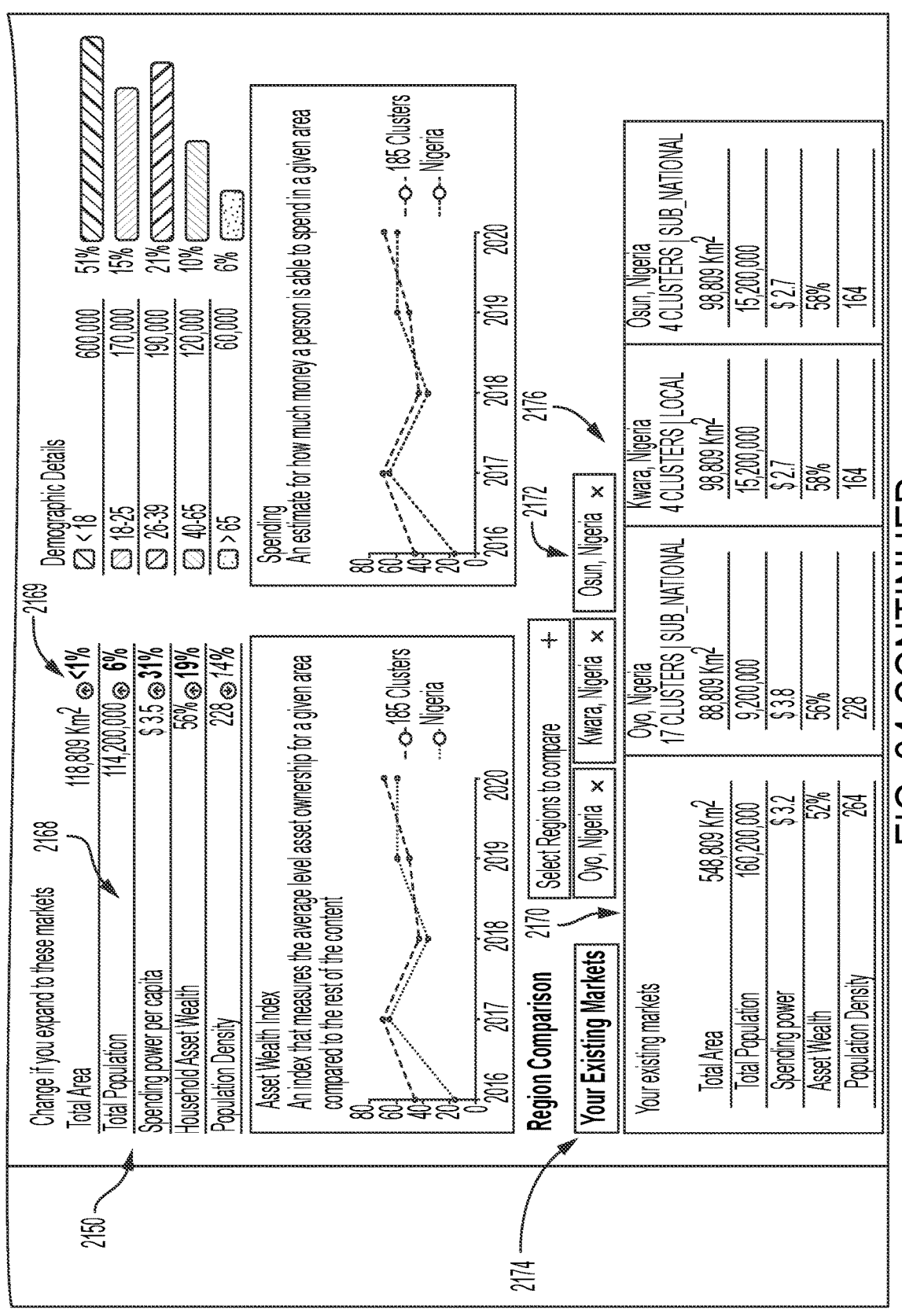

The user may then proceed to the data explorer module 86. The data explorer module 86 generates a market snapshot page, a region comparison page and a map comparison page. By way of example, a first snapshot page 2150 is shown in FIG. 34. In the first snapshot page 2150, a total market snapshot across Nigeria is displayed. In the first snapshot page 2150, a total of 185 clusters are identified. As used herein, the term clusters is used to identify regions that satisfy the filtered criteria selected above. The first snapshot page 2150 results from the user selecting a desired scope field 2152 and a desired geography field 2154. In the example shown, the desired scope field 2152 has been set to "National" while the desired geography field 2154 has been set to the country of "Nigeria". A cluster map 2160 is displayed on the first snapshot page 2150 highlighting the clusters that satisfy the selected criteria. The user is further able to select a desired dataset at a dataset field 2164, a desired resolution at a resolution field 2165, and a desired time at a time field 2166. In the example shown, the user has selected the "spending" dataset at the dataset field 2164, "point clusters" at the resolution field 2165 and "2020" at the time field 2166. The dataset field 2164 uses information determined at the models 22 (FIG. 1A). Notably, in the first snapshot page 2150, key highlights, or statistics are listed at a data field 2168. The exemplary data field 2168 includes total area, total population, spending power per capita, household asset wealth and population density data related to the identified proposed clusters. Other data may be included. Further, a delta field 2169 is displayed that indicates a change in the values of the highlighted clusters as compared to the values known by the user in the current markets the user is operating in. A region comparison display 2170, generated by the region comparison module 87, provides the user with a region selection field 2172 where the user can enter various regions to compare characteristics of proposed regions with known characteristics in their existing market. In the example shown, the user has selected Oyo, Nigeria; Kwara, Nigeria and Osun, Nigeria as proposed regions for comparison to their known markets. In this regard, the user can view an existing market summary page 2174 having first statistics associated with known existing markets and compare them to proposed market summary pages 2176 having respective second statistics associated with proposed future markets.

Figure 35:
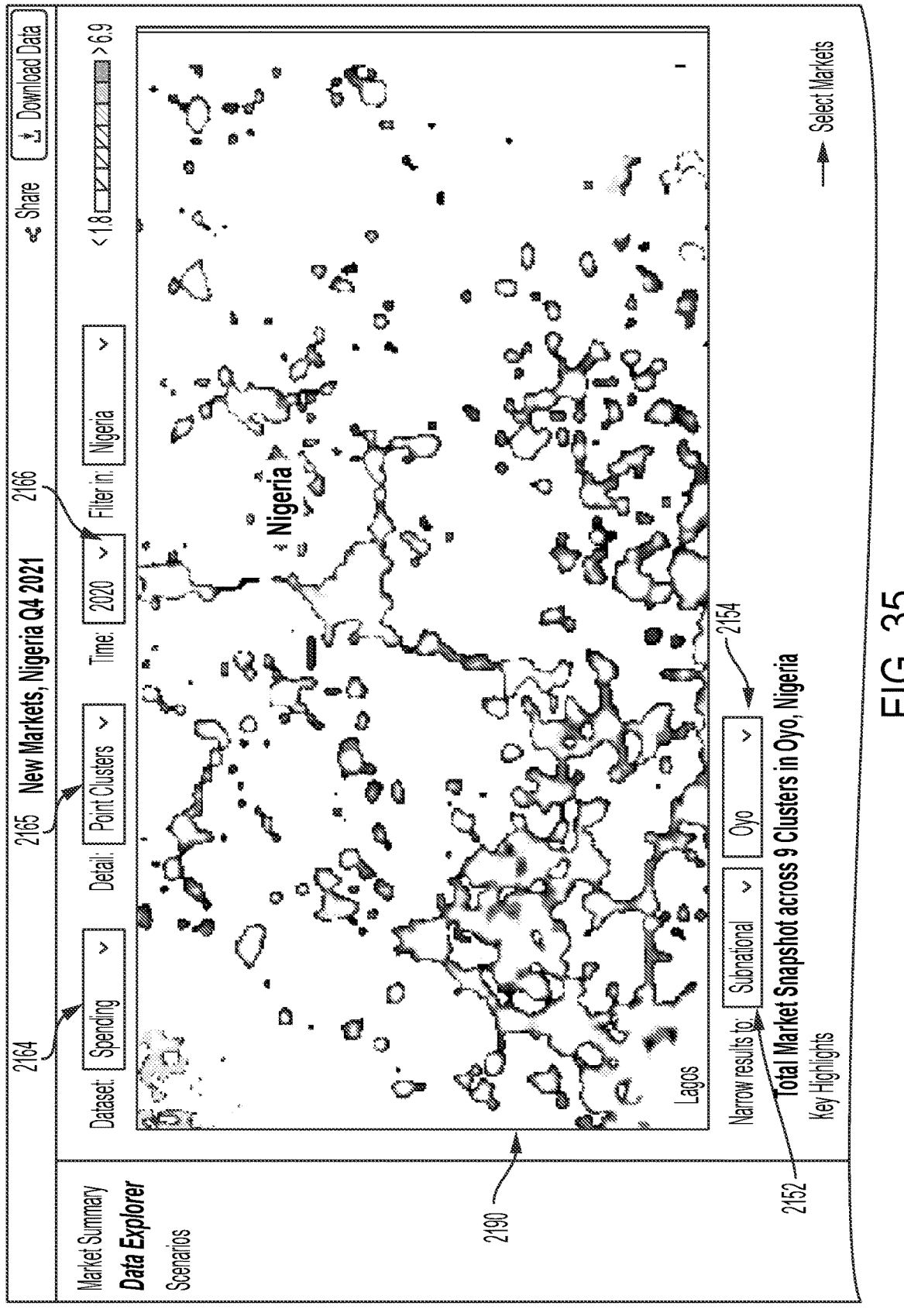
FIG. 35 illustrates a second snapshot page generated by the data explorer module according to various examples.
Figure 35:
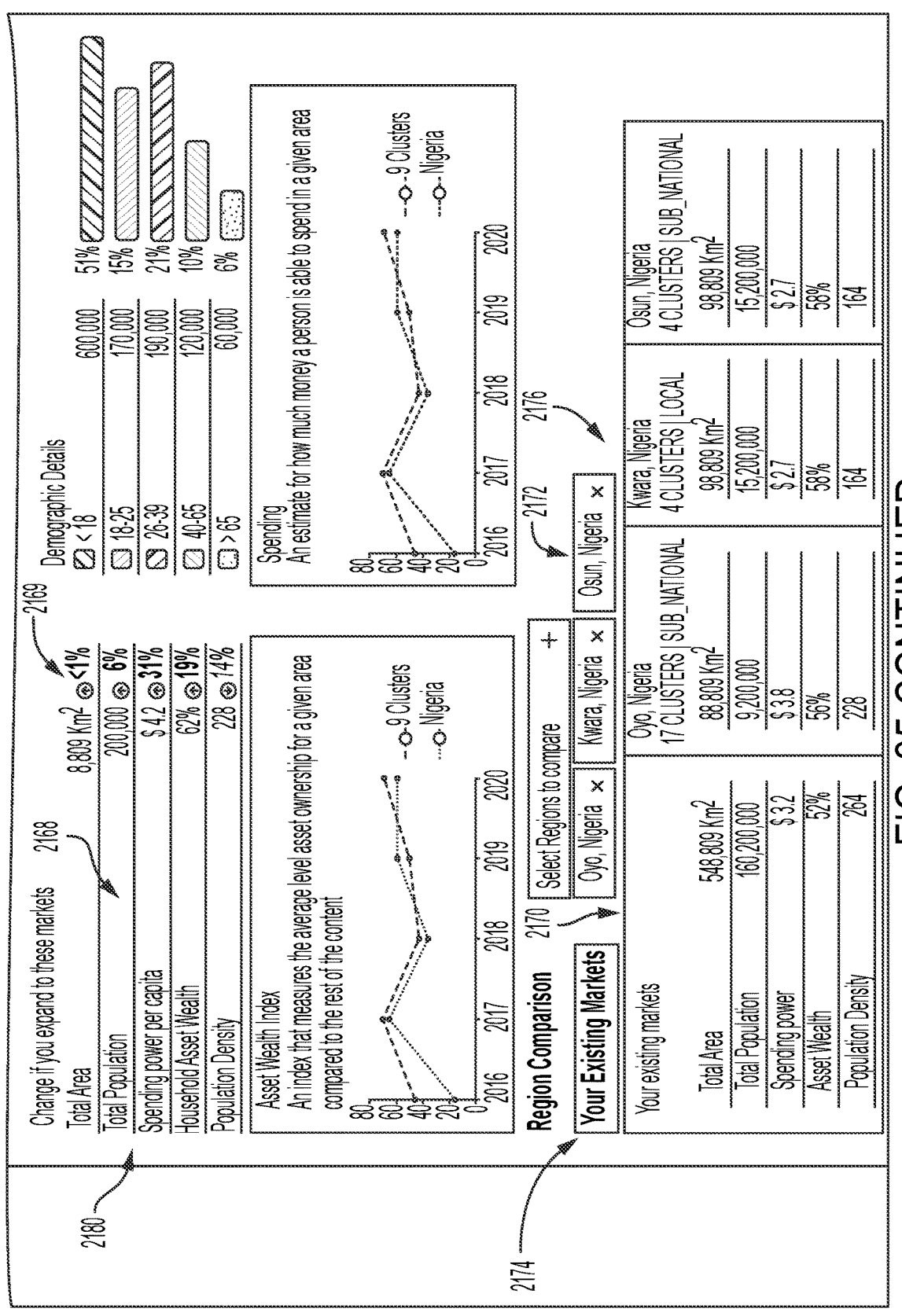
Figure 36:
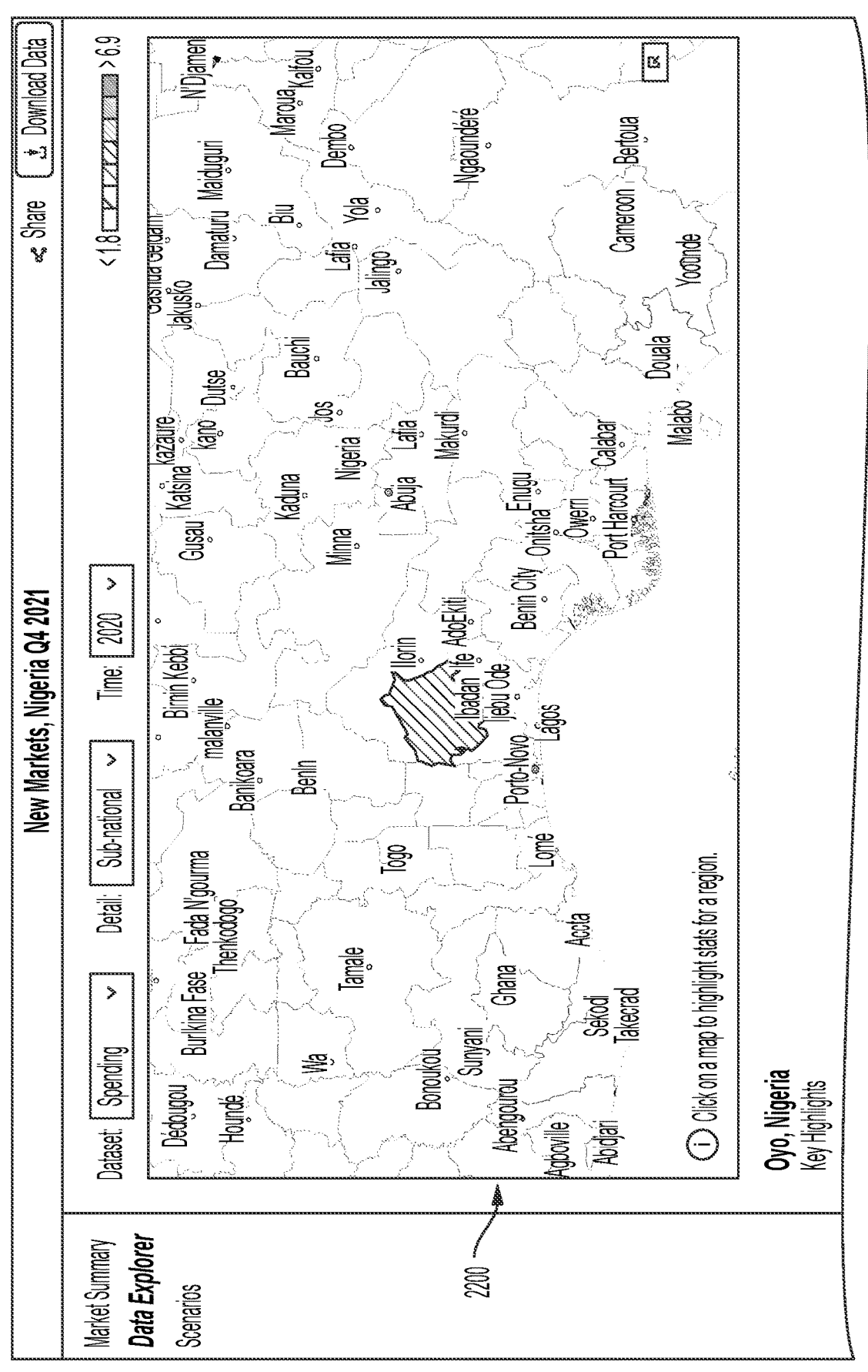
FIG. 36 illustrates a region or map comparison page generated by a region comparison module of the user interface and region recommendation platform according to various examples.
Figure 36:
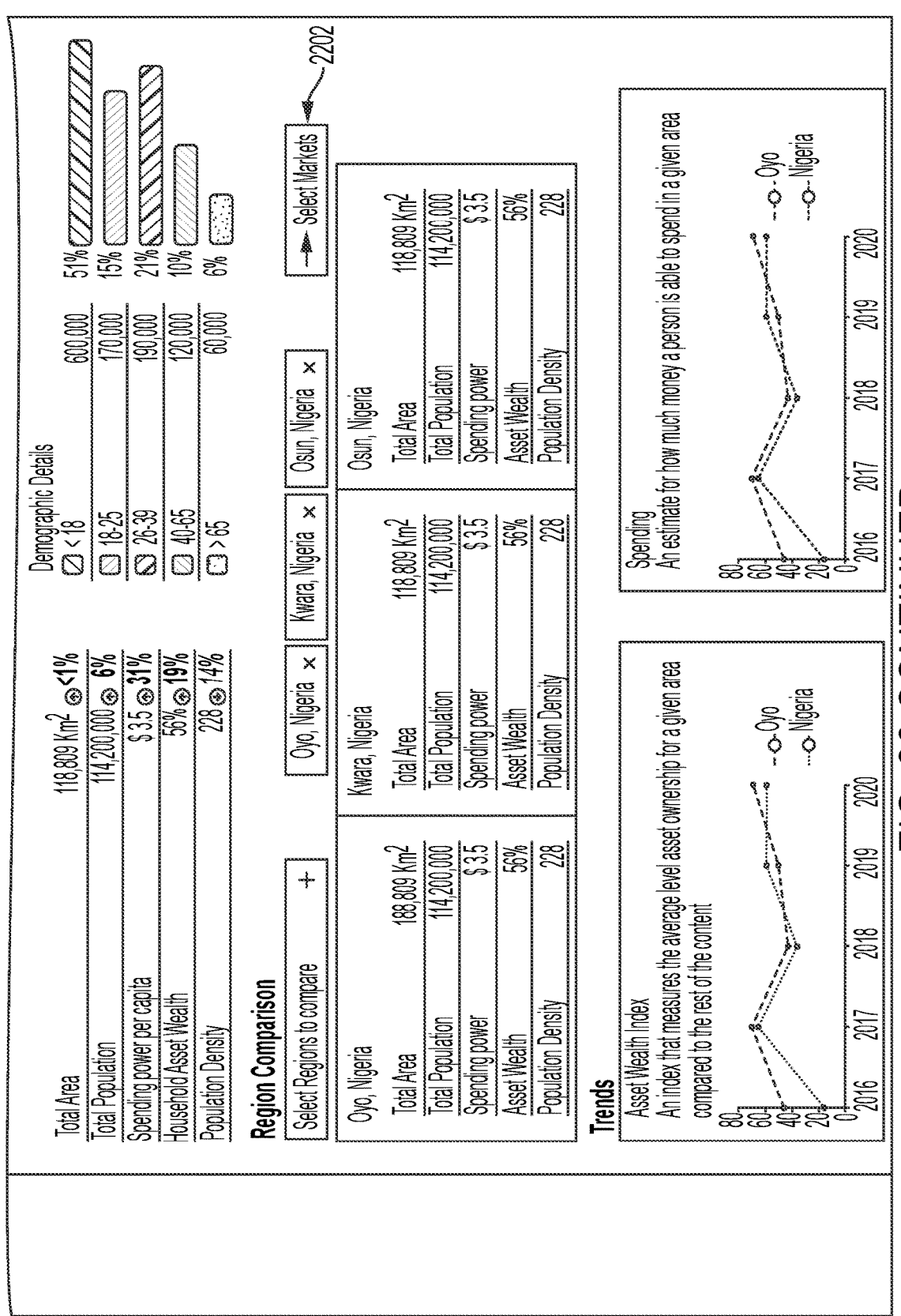

By way of example, a second snapshot page 2180 is shown in FIG. 35. In the second snapshot page 2180, a total market snapshot across Oyo, Nigeria is displayed. In the second snapshot page 2180, a total of 9 clusters are identified that satisfy the filtered criteria. The second snapshot page 2180 results from the user selecting different criteria (compared with the first snapshot page 2150, FIG. 34) into the desired scope field 2152 and the desired geography field 2154. In the example shown, the desired scope field 2152 has been set to "Subnational" while the desired geography field 2154 has been set to the region of "Oyo" Nigeria. A cluster map 2190 is displayed on the second snapshot page 2180 highlighting the clusters that satisfy the selected criteria. The user is further able to select a desired dataset at the dataset field 2164, a desired resolution at a resolution field 2165, and a desired time at a time field 2166. In the example shown, the user has selected the same dataset, resolution and time as discussed above in FIG. 34. The data field 2168 and delta field 2169 have been updated (compared to the first snapshot page 2150, FIG. 34) to reflect the new scope field 2152 (Subnational) and the new geography field 2154 (Oyo, Nigeria). FIG. 36 shows a map comparison page 2200 where the user can scroll over and click a region to display statistics associated with various characteristics.

Figure 37:
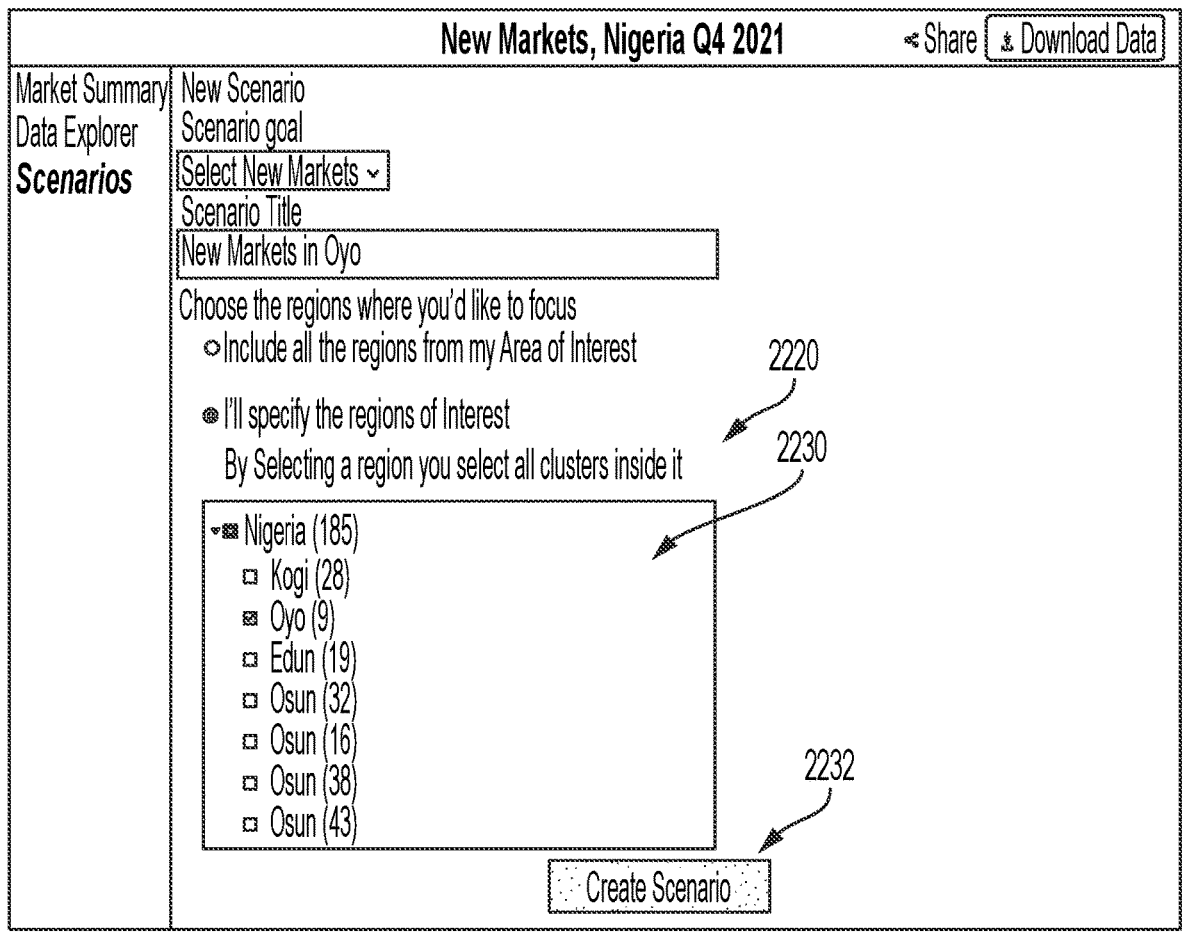
FIG. 37 illustrates a first scenario page generated by a scenario module of the user interface and region recommendation platform according to various examples.

Next, a user may wish to select desired markets by clicking the "select markets" button 2202. Once the select markets button 2202 has been selected, the user proceeds to the scenario module 88 where the user can select a potential market for scenario modeling analysis. FIG. 37 illustrates a first scenario page 2220 generated by the scenario module 88. The first scenario page provides the user with a region of interest field 2230. By way of example, the user has selected the Oyo, Nigeria region for scenario modeling. As identified above, the Oyo, Nigeria example contains 9 clusters that satisfy the selected criteria. After the user has identified the desired region for scenario modeling the user can click the "create scenario" button 2232.

Figure 38:
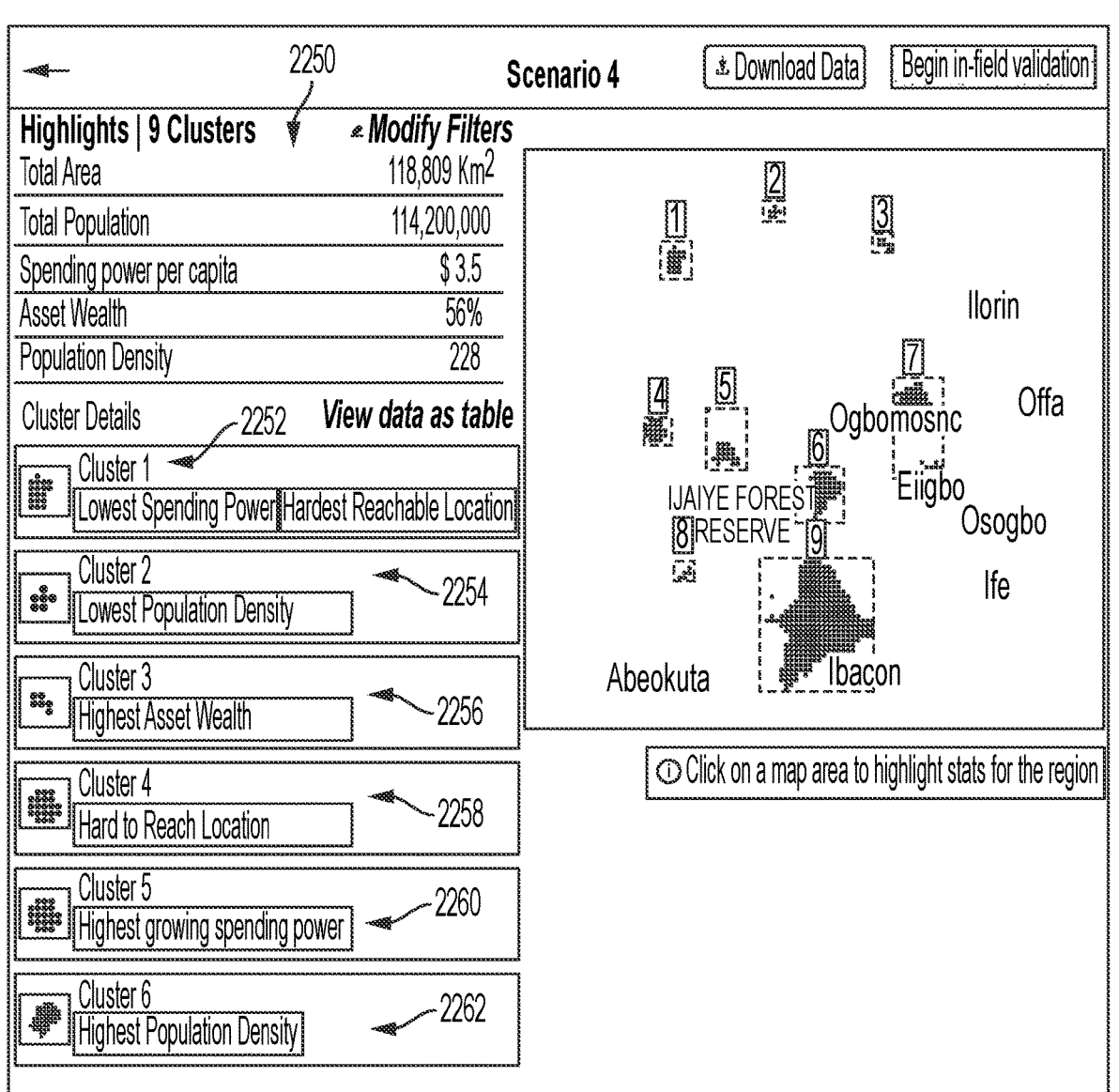
FIG. 38 illustrates a first display cluster page generated by the scenario module according to various examples.
Figure 39:
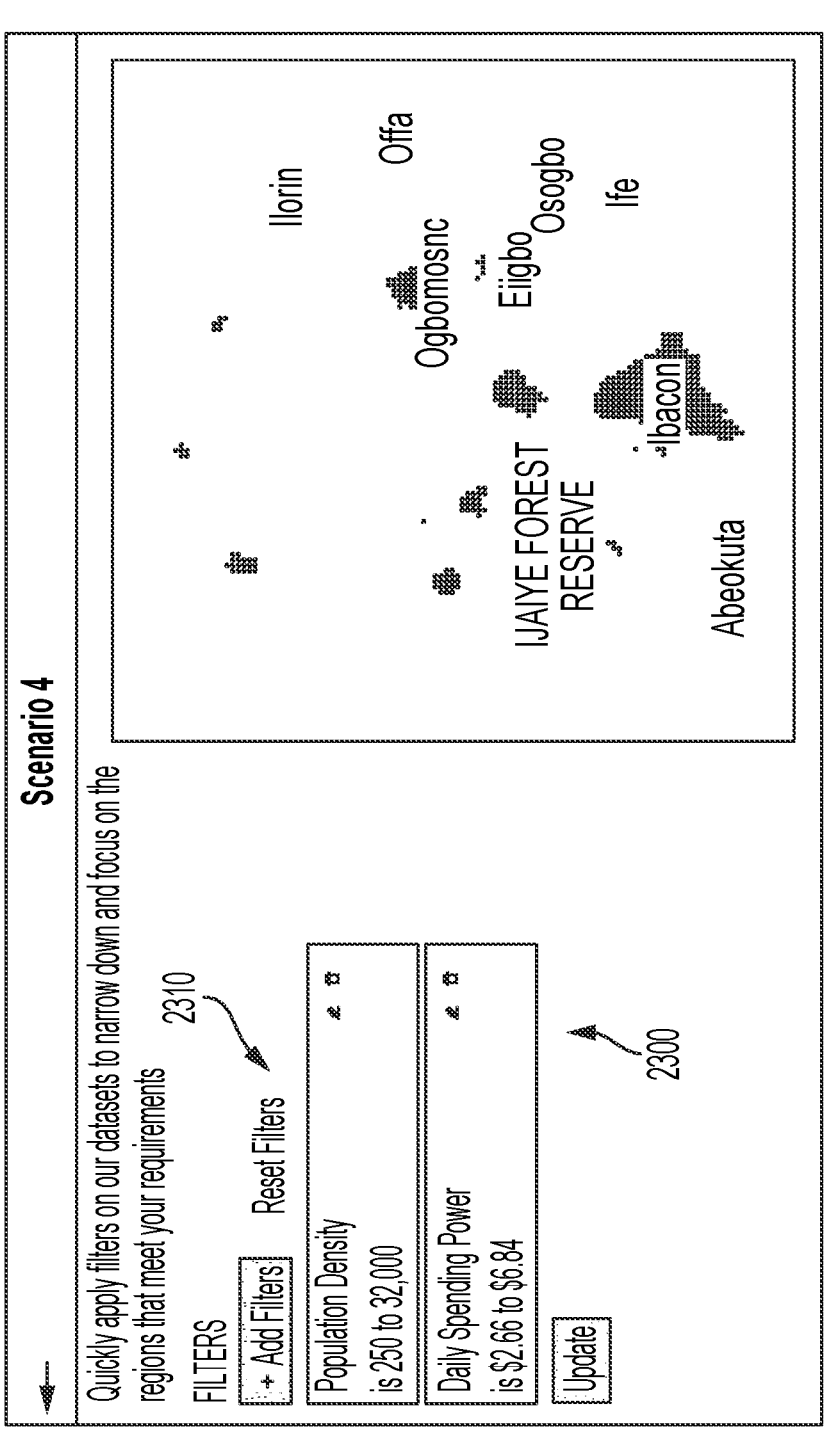
FIG. 39 illustrates a filter application page generated by the scenario module according to various examples.

Once the user has selected the "create scenario" button, the scenario module 88 generates a first cluster display page 2250 as shown in FIG. 38. In the example shown, "Cluster 1" 2252 includes "Lowest Spending Power" and "Hardest Reachable Location" tags; "Cluster 2" 2254 includes a "Lowest Population Density" tag; "Cluster 3" 2256 includes a "Hard to Reach Location" tag; "Cluster 4" 2258 includes a "Hard to Reach Location" tag; "Cluster 5" 2260 includes a "Highest Growing Spending Power" tag; and "Cluster 6" 2262 includes a "Highest Population Density" tag. Other clusters having other tags may be generated. Clusters 7-9 (not shown) include other tags. Each tag associated with the various clusters is produced by statistical analysis performed by the models 22 (FIG. 1A) of the decision support platform 10. Notably, the clusters are displayed in a ranked order determined by the decision support platform 10 based on the data imported into the onboarding module 82 and/or characteristics conveyed by the user as being important for scenario modelling. FIG. 39 shows a filter application page 2300 generated by the scenario module 88. At the filter application page 2300 the user can apply additional filters at the filter field 2310. In the example shown, the user has selected a "Population Density" filter and a "Daily Spending Power" filter. Applying these additional filters will further narrow down and focus on the regions that meet the requirements of the user.

Turning now to FIG. 40, an infield validation page 2400 generated by the scenario module 88 is shown. At the infield validation page 2400 the user can select various regions (cities and towns are shown in this example) that may be meeting the needs of the user's criteria for future development. FIG. 41 illustrates a second cluster display page 2500 generated by the scenario module 88. In the second cluster display page 2500 the user can view more specifically identified statistics associated with the various cities and towns shown belonging with the respective clusters at the first cluster display page 2250. The user can also select the "Download Data" button 2510 in instances where the user would like to additionally or alternatively make additional interpretations of the raw data.

Figure 42:
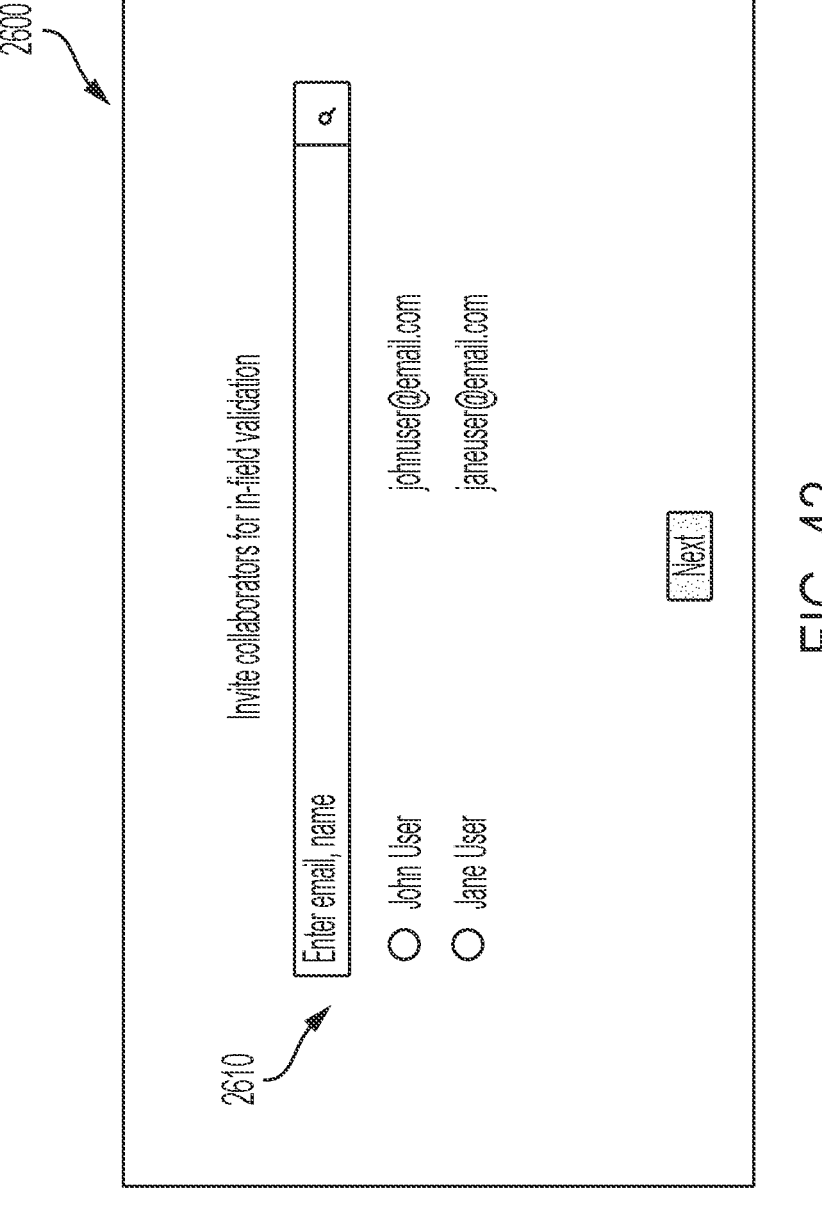
FIG. 42 illustrates an infield validation invitation page generated by a collaboration module of the user interface and region recommendation platform according to various examples.
Figure 43:
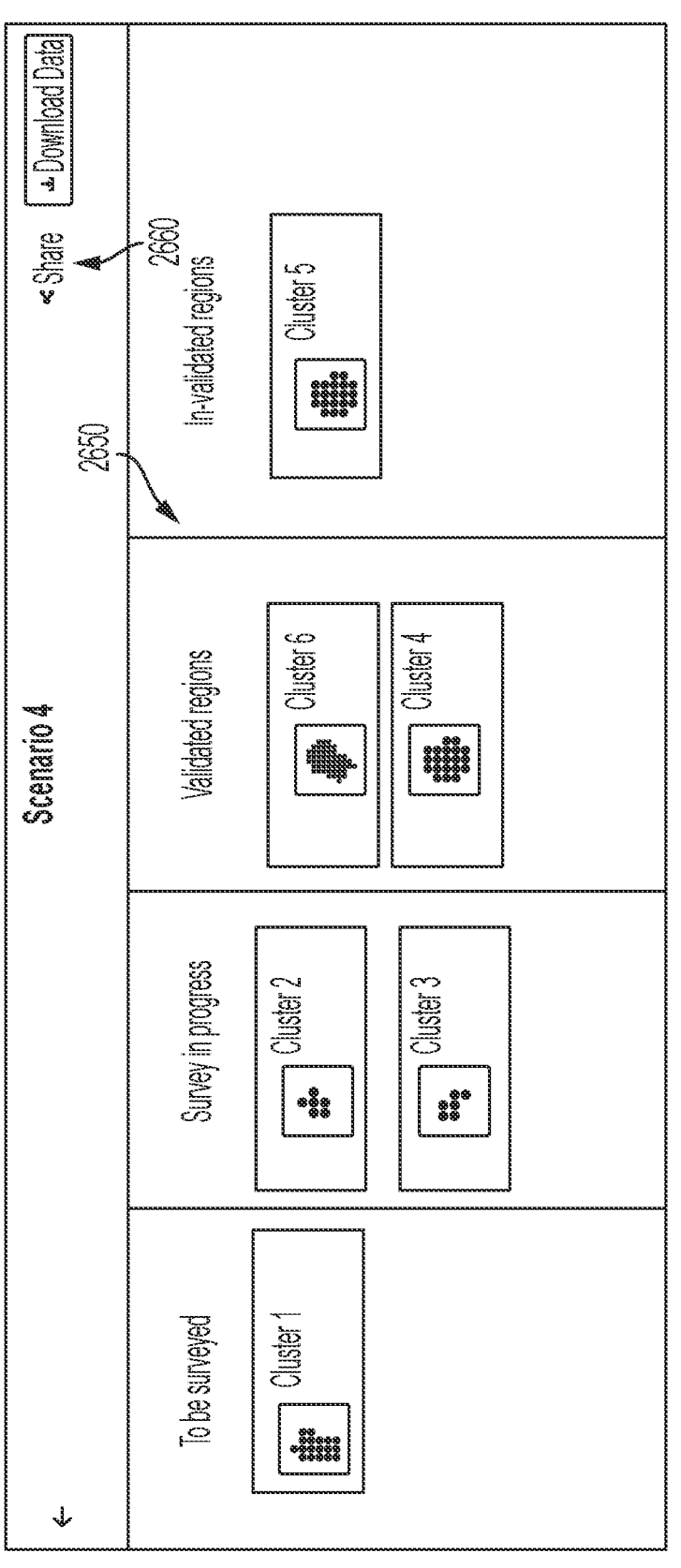
FIG. 43 illustrates a progress tracking page generated by the collaboration module according to various examples.

Next, the user can proceed to the collaboration module 89. In the collaboration module 89, an in-field validation invitation page 2600 is generated (FIG. 42). At the in-field validation invitation page the user can invite collaborators at the invitation field 2610. It is envisioned collaborators can be any individual chosen to add validation data such as a team member or sub-contractor. FIG. 43 illustrates a progress tracking page 2650 generated by the collaboration module 89. In the progress tracking page 2650, the clusters are arranged in columns according to their status. For example, "Cluster 1" has been identified as "To be surveyed"; "Cluster 2" and "Cluster 3" have been identified as "Survey in progress"; "Cluster 6" and "Cluster 4" have been identified as "Validated regions"; and "Cluster 5" has been identified as "In-validation region". The user can reference the in-field validation page 2600 to understand validation progress and also to understand where more resources may be needed to expedite any lagging validation region. A "Share" button 2660 is provided where the user can share the in-field validation page 2600 with other individuals.

Figure 44:
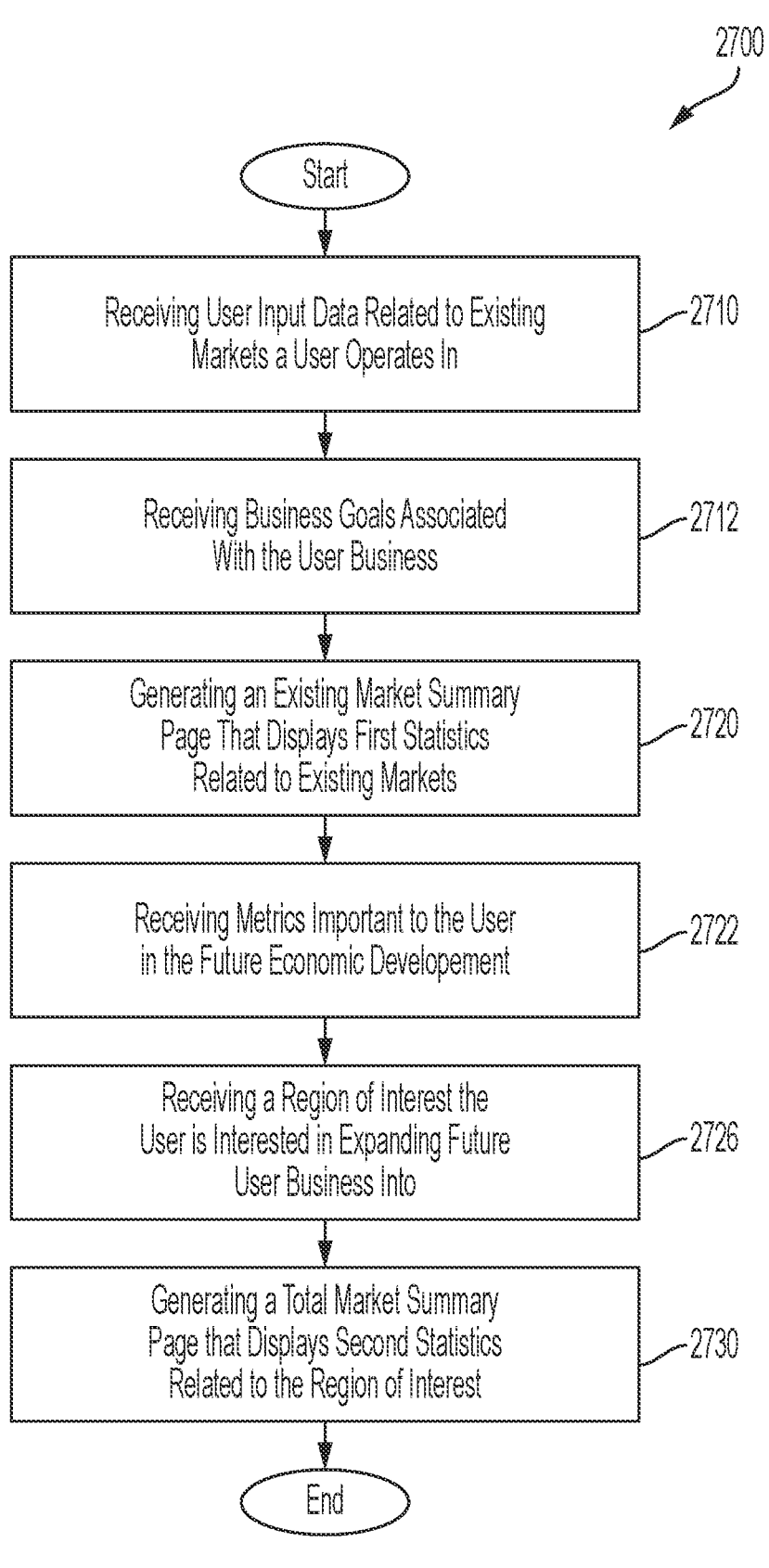
FIG. 44 is a flow chart showing a computer-implemented method of recommending a geographical region for future economic development according to examples of the present disclosure.

With reference to FIG. 44, a computer-implemented method of recommending a geographical region for future economic development according to examples of the present disclosure is shown and generally identified at reference numeral 2700. User input data related to existing markets a user currently operates in is received at 2710. Business goals associated with the user business are received at 2712. An existing market summary page is generated at 2720. The existing market summary page displays first statistics related to existing markets based on the user data. Metrics, important to the user in the future economic development are received at 2722. A region of interest the user is interested in expanding future user business into is received at 2726. A total market summary page is generated at 2730. The total market summary page displays second statistics related to the region of interest.

Figure 45:
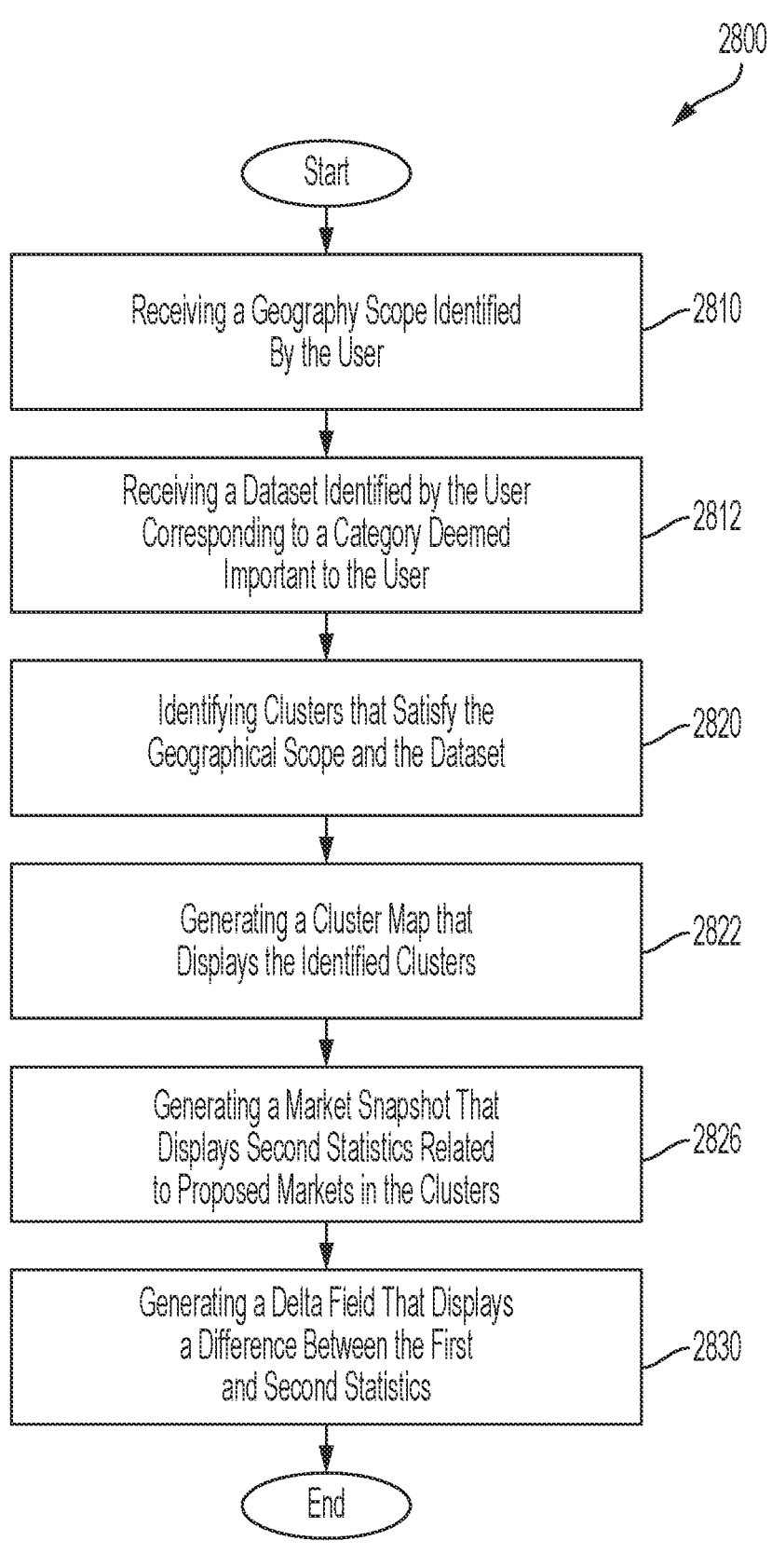
FIG. 45 is a flow chart showing a computer-implemented method of generating a market snapshot according to examples of the present disclosure.

With reference to FIG. 45, a computer-implemented method of generating a market snapshot according to examples of the present disclosure is shown and generally identified at reference 2800. In general, the market snapshot provides the user insights that can compare statistics associated with known existing markets the user operates in with proposed markets the user may wish to expand into. A geography scope identified by the user is received at 2810. A dataset identified by the user is received at 2812. The dataset corresponds to a category deemed important to the user. Clusters are identified at 2820. The clusters satisfy the geographical scope and the dataset. A cluster map is generated at 2822. The cluster map displays the identified clusters. A market snapshot is generated at 2826. The market snapshot displays second statistics related to proposed markets in the clusters. A delta field is generated at 2830. The delta field displays a difference between the first and second statistics.

Figure 46:
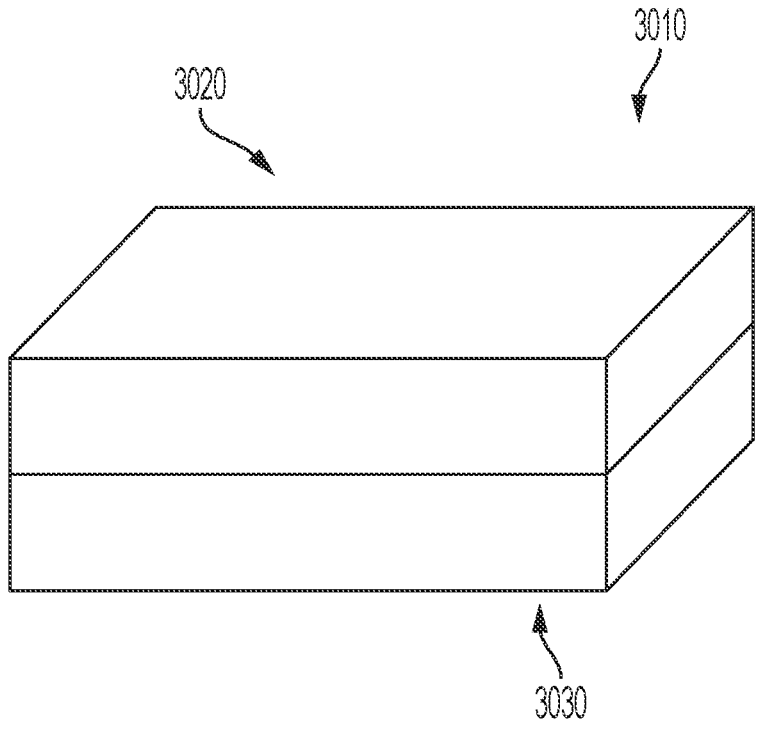
FIG. 46 is a schematic illustration of exemplary groupings of demand intelligence software as a service (SaaS) and a human and economic atlas (HEA) according to various examples.

FIG. 46 is a schematic illustration of exemplary groupings 3010 of demand intelligence software as a service (SaaS) 3020 and a human and economic atlas (HEA) 3022 according to various examples. The demand intelligence SaaS 3020 provides a software platform that enables organizations to better identify and serve unserved or underserved customers. In some examples, the software platform includes components of the decision support platform 10 described in detail above. Demand intelligence SaaS 3020 can provide useful outputs including the navigation map the forecasting map 72 and/or the recommendations 76 (FIG. 1A). In some examples, the HEA 3022 includes a comprehensive and authoritative global knowledge graph of human and economic systems. Attributes associated with the HEA include the various attributes described above in the data handling platform 40 (FIG. 1A). The HEA can also include the analytical models 22 related to various categorical data sets 24 including data sets related to population 30, economy 32, agriculture 34 and infrastructure 36 (FIG. 1A).

The following discussion identifies various features and details (alone or in combination) supported and executed by the computer-implemented systems, platforms and methods as disclosed herein.
Platform In embodiments, the present disclosure provides a development investment intelligence platform for planning, monitoring and analyzing investments in development projects. The present disclosure provides systems, platforms and methods to monitor the drivers of economic development across the emerging markets so that financial capital can advance societal well-being. Economic development can include various categories such as, but not limited to, infrastructure, roadways, bridges, electrification, renewable energy, water, sewer, and networking. A decision support system for investors in emerging markets is provided that allows investors to plan new investments by sitting them in the right locations to achieve financial and societal project objectives and to reduce the risk to investors by better forecasting demand. In addition, active investments can be monitored to ensure capital is being deployed most effectively and project objectives are being met. Further, the impact of investments on economic well-being and other downstream industries can be assessed.

The present disclosure provides systems, platforms and methods that classify and map key assets such as, but not limited to, crop fields, roads, markets, and health clinics. In addition, the systems, platforms and methods analyze the productivity and/or quality of those assets, measure changes in those metrics over time and associate those changes with key socioeconomic and financial outcomes. The systems, platforms and methods measure and predict or forecast the drivers of economic development more precisely, scalably and rigorously than available in industry. The present techniques inform a systems-level view to economic development, and ensure that traditionally siloed investments are coordinated to advance economic progress. Further, progress and impact over time is monitored to ensure maximum learning value from resource allocation decisions, and dynamic adjustments over time.

A public data and publications service, platform, and/or product for providing public access to data and publications is provided. A development investment intelligence platform is provided that is configured for planning, monitoring, and analyzing investments in development projects having a geospatial analytics service configured to enable users to optimize siting for a business activity. A development investment intelligence platform is provided that is configured for planning, monitoring, and analyzing investments in development projects having a development program analytics service, platform, and/or product configured for targeting, monitoring, and/or managing development programs. A development investment intelligence platform is provided that is configured for planning, monitoring, and analyzing investments in development projects having an agricultural analytics service, platform, and/or product for providing agricultural productivity analytics and/or modeling the impact of non-agricultural investments on agricultural productivity.

A development investment intelligence platform is provided that is configured for planning, monitoring, and analyzing investments in development projects having an agricultural analytics service, platform, and/or product for providing agricultural productivity analytics and/or modeling the impact of non-agricultural investments on agricultural productivity for small holder farmers. A development investment intelligence platform is provided that is configured for planning, monitoring, and analyzing investments in development projects having agribusiness financial services.

A development investment intelligence platform is provided that is configured for planning, monitoring, and analyzing investments in development projects having a rural infrastructure siting decision support service, platform, and/or product configured to provide decision support related to the siting of rural infrastructure. These investments are often made with a core economic premise (e.g., connect rural farms to markets, power underserved villages, etc.) but without sufficiently precise economic measurement capabilities to optimize the siting of infrastructure. The present disclosure provides a tool that allows the user to consider various economic, industrial, and infrastructure criteria to determine optimal site options for the project. The long-term viability of such a tool would define a roadmap that extends customer engagement to include both siting and monitoring so as to enable a recurring revenue stream from what would otherwise be a potentially infrequent use case for any single customer.

A development investment intelligence platform is provided that is configured for planning, monitoring, and analyzing investments in development projects having an impact assessment service, platform, and/or product configured to assess the impact of specific actions on one or more socioeconomic outcomes. A development investment intelligence platform is provided that is configured for planning, monitoring, and analyzing investments in development projects having an impact assessment service, platform, and/or product configured to assess the impact of specific actions on household-level well-being. A development investment intelligence platform is provided that is configured for planning, monitoring, and analyzing investments in development projects having a system for matching resource inputs to desired outcomes. A development investment intelligence platform is provided that is configured for planning, monitoring, and analyzing investments in development projects and platform services are accessible via the web.

A development investment intelligence platform is provided that is configured for planning, monitoring, and analyzing investments in development projects having an application programming interface (API) system that manages one or more APIs of the platform, so as to expose the APIs to one or more related applications or third-party systems. A development investment intelligence platform is provided that is configured for planning, monitoring, and analyzing investments in development projects having a data query application programming interface configured to support user-defined spatial and temporal inquiries. A development investment intelligence platform is provided that is configured for planning, monitoring, and analyzing investments in development projects having a software development kit for development or configuration of a set of services for integration with the platform.

A development investment intelligence platform is provided that is configured for planning, monitoring, and analyzing investments in development projects having a set of information technology services. A development investment intelligence platform is provided that is configured for planning, monitoring, and analyzing investments in development projects having a system for facilitating user subscriptions. A development investment intelligence platform is provided that is configured for planning, monitoring, and analyzing investments in development projects having a system for facilitating user subscriptions in which different levels of data can be provided for different subscription plans. A development investment intelligence platform is provided that is configured for planning, monitoring, and analyzing investments in development projects having a security system.

Geospatial Analytics Products

In embodiments, the present disclosure provides a geospatial analytics platform configured to optimize siting for a business activity. The present disclosure provides a location analytics platform that enables users to identify the best location to conduct a business activity (e.g., selecting new markets to expand operations, identifying optimal sites for specific projects) based on the triangulation of population/demographics, economic and infrastructure data. In embodiments, a subscription business model can be associated with the platform. Users can include retail, fast moving consumer goods (FMCG) companies, infrastructure and real estate developers, and consulting and market research firms.

A geospatial analytics platform is provided that is configured to enable users to optimize siting for a business activity having a mobile application integrated with the platform for enabling mobile access to the platform. A geospatial analytics platform is provided that is configured to enable users to optimize siting for a business activity and platform services are accessible via the web. A geospatial analytics platform is provided that is configured to enable users to optimize siting for a business activity having an application programming interface (API) system that manages one or more APIs of the platform, so as to expose the APIs to one or more related applications or third-party systems. A geospatial analytics platform is provided that is configured to enable users to optimize siting for a business activity having a data query application programming interface configured to support user-defined spatial and temporal inquiries.

A geospatial analytics platform is provided that is configured to enable users to optimize siting for a business activity having a software development kit for development or configuration of a set of services for integration with the platform. A geospatial analytics platform is provided that is configured to enable users to optimize siting for a business activity having a set of information technology services. A geospatial analytics platform is provided that is configured to enable users to optimize siting for a business activity having a system for facilitating user subscriptions. A geospatial analytics platform is provided that is configured to enable users to optimize siting for a business activity having a system for facilitating user subscriptions having a security system.

Development Finance Marketplace

In embodiments, the present disclosure provides a development finance marketplace that identifies the most economically impactful locations to invest in infrastructure, industrialization and agribusiness, promotes clustering of investments to maximize economic benefit, and facilitates transactions between investors and developers/entrepreneurs. While the present disclosure focuses generally around the energy-agriculture nexus across the continent of Africa, it is appreciated that the principles discussed herein can be similarly applied to other sectors and other parts of the world.

A development finance marketplace is provided that is configured to optimize siting for investments, cluster investments, and/or facilitate transactions between investors and developers. In these examples, platform services are accessible via the web. A development finance marketplace is provided that is configured to optimize siting for investments, cluster investments, and/or facilitate transactions between investors and developers having an application programming interface (API) system that manages one or more APIs of the platform, so as to expose the APIs to one or more related applications or third-party systems. A development finance marketplace is provided that is configured to optimize siting for investments, cluster investments, and/or facilitate transactions between investors and developers having a data query application programming interface configured to support user-defined spatial and temporal inquiries. A development finance marketplace is provided that is configured to optimize siting for investments, cluster investments, and/or facilitate transactions between investors and developers having a software development kit for development or configuration of a set of services for integration with the platform. A development finance marketplace is provided that is configured to optimize siting for investments, cluster investments, and/or facilitate transactions between investors and developers having a set of information technology services. A development finance marketplace is provided that is configured to optimize siting for investments, cluster investments, and/or facilitate transactions between investors and developers having a system for facilitating user subscriptions. A development finance marketplace is provided that is configured to optimize siting for investments, cluster investments, and/or facilitate transactions between investors and developers having a security system.

User Interfaces

In embodiments, a development investment intelligence platform is provided for planning, monitoring, and analyzing investments in development projects having a stakeholder user interface. A development investment intelligence platform is provided for planning, monitoring, and analyzing investments in development projects having a notification system for providing notifications to platform users.

Aggregation and Analytics

In embodiments, a development investment intelligence platform is provided for planning, monitoring, and analyzing investments in development projects having a data aggregation system for aggregating data across a set of devices, a set of locations, and/or a population of individuals. A development investment intelligence platform is provided for planning, monitoring, and analyzing investments in development projects having an analytics system for performing an analytic operation to produce an analytic measure for a geospatial segment.

A development investment intelligence platform is provided for planning, monitoring, and analyzing investments in development projects having an analytics system for performing an analytic operation to produce an analytic measure. In these examples, the analytic measure relates to the productivity of a set of assets. A development investment intelligence platform is provided for planning, monitoring, and analyzing investments in development projects having an analytics system for performing an analytic operation to produce an analytic measure. In these examples, the analytic measure relates to the quality of a set of assets. A development investment intelligence platform is provided for planning, monitoring, and analyzing investments in development projects having an analytics system for performing an analytic operation to produce an analytic measure. In these examples, the analytic measure relates to the impact of a proposed investment.

A development investment intelligence platform is provided for planning, monitoring, and analyzing investments in development projects having an analytics system for performing an analytic operation to produce a set of analytic measures. In these examples, the set of analytic measures relates to the comparative impacts of one or more proposed investments. A development investment intelligence platform is provided for planning, monitoring, and analyzing investments in development projects having an analytics system for performing an analytic operation to produce an analytic measure. In these examples, the analytic measure relates to the impact of a location of a proposed investment. A development investment intelligence platform is provided for planning, monitoring, and analyzing investments in development projects having an analytics system for performing an analytic operation to produce an analytic measure. In these examples, the analytic measure relates to the demographic impact of a proposed investment.

Economic Graph

In embodiments, a development investment intelligence platform is provided for planning, monitoring, and analyzing investments in development projects having an economic graph that digitally represents the global economy, identifies connections between entities of the global economy, and/or identifies trends relating to economic opportunities. A development investment intelligence platform is provided for planning, monitoring, and analyzing investments in development projects having an economic graph that digitally represents the global economy and/or the interrelated drivers of economic development. A development investment intelligence platform is provided for planning, monitoring, and analyzing investments in development projects having an economic graph that digitally represents the global economy and depicts connections between people and jobs.

A development investment intelligence platform is provided for planning, monitoring, and analyzing investments in development projects having an economic graph that digitally represents the global economy and depicts connections between people and skills. A development investment intelligence platform is provided for planning, monitoring, and analyzing investments in development projects having an economic graph that digitally represents the global economy and depicts connections between people and companies. A development investment intelligence platform is provided for planning, monitoring, and analyzing investments in development projects having an economic graph that digitally represents the global economy and depicts connections between people and professional knowledge. A development investment intelligence platform is provided for planning, monitoring, and analyzing investments in development projects having an economic graph that digitally represents the global economy and depicts connections between jobs and skills. A development investment intelligence platform is provided for planning, monitoring, and analyzing investments in development projects having an economic graph that digitally represents the global economy and depicts connections between jobs and skills.

A development investment intelligence platform is provided for planning, monitoring, and analyzing investments in development projects having an economic graph that digitally represents the global economy and depicts connections between jobs and professional knowledge. A development investment intelligence platform is provided for planning, monitoring, and analyzing investments in development projects having an economic graph that digitally represents the global economy and depicts connections between skills and companies. A development investment intelligence platform is provided for planning, monitoring, and analyzing investments in development projects having an economic graph that digitally represents the global economy and depicts connections between skills and professional knowledge.

Multi-Task Learning

In embodiments, a development investment intelligence platform for planning, monitoring, and analyzing investments in development projects having a multi-task learning system for running multiple learning tasks simultaneously.

Change Detection

In embodiments, a development investment intelligence platform is provided for planning, monitoring, and analyzing investments in development projects having a change detection system configured to monitor input features and identify changes in the input features. The present techniques provide continuous monitoring and identification of changes in the input features that are expected to generate significant changes in the output of interest. For example, wealth estimates can be updated dynamically as changes occur as opposed to fixed intervals. Users can be notified to changes in returns on investments (ROI's).

Unsupervised Embeddings

In embodiments, a development investment intelligence platform is provided for planning, monitoring, and analyzing investments in development projects having unsupervised and/or weakly supervised embeddings. Translation of high-dimensional vectors into a relatively low-dimensional space that captures some of the semantics of input by locating semantically similar inputs close together in the embedding space.

Causal Inference

In embodiments, a development investment intelligence platform for planning, monitoring, and analyzing investments in development projects having a causal inference system for linking an independent variable to a dependent variable while accounting for all possible extraneous factors. Causal inference, as discussed herein, attempts to link an independent variable to a dependent variable while accounting for all possible extraneous factors. For example, the present techniques consider what intervention (agriculture, roads, electricity, etc.) can cause the most significant change in a result (e.g., poverty level). The present techniques consider an economic value that results from a particular activity. For example, with electricity now available in a village, the present techniques determine whether the economic conditions have improved.

Similarity and Clustering

In embodiments, a development investment intelligence platform is provided for planning, monitoring, and analyzing investments in development projects having a similarity search system for identifying data points that are semantically close in a specific embedding. As discussed herein, similarity search techniques find data points (e.g., geographical locations) that are semantically close in a specific embedding. For example, a particular intervention (erecting a cell phone tower for example) was successful in a first geographical location. A second geographical location is identified having similar criteria for applying the same intervention with the desire to achieve the same success realized at the first location. A development investment intelligence platform is provided for planning, monitoring, and analyzing investments in development projects having a system for clustering similar infrastructure. A development investment intelligence platform is provided for planning, monitoring, and analyzing investments in development projects having a system for clustering similar projects.

A development investment intelligence platform is provided for planning, monitoring, and analyzing investments in development projects having a system for clustering similar stakeholders. A development investment intelligence platform is provided for planning, monitoring, and analyzing investments in development projects having a system for clustering similar data sources. A development investment intelligence platform is provided for planning, monitoring, and analyzing investments in development projects having a system for clustering similar countries and/or geospatial areas.

Artificial Intelligence for Optimization and Configuration.

In embodiments, a development investment intelligence platform is provided for planning, monitoring, and analyzing investments in development projects having a machine learning and/or artificial intelligence system configured to optimize the selection of new markets to expand one or more business operations.

Better and more frequent data on economic well-being, agricultural productivity and infrastructure access across the emerging markets offer a wide range of potential applications such as, but not limited to, positioning infrastructure, forecasting consumer demand, better program targeting and economic impact measurement. The present disclosure provides a location analytics platform that enables users to identify the best location to conduct a business activity (e.g., selecting new markets to expand operations, identifying optimal sites for specific projects) based on the triangulation of population/demographics, economic and infrastructure data.

A development investment intelligence platform is provided for planning, monitoring, and analyzing investments in development projects having a machine learning and/or artificial intelligence system configured to optimize the siting of infrastructure. A development investment intelligence platform is provided for planning, monitoring, and analyzing investments in development projects having a machine learning and/or artificial intelligence system configured to optimize the siting of a set of telecommunications towers. A development investment intelligence platform is provided for planning, monitoring, and analyzing investments in development projects having a machine learning and/or artificial intelligence system configured to optimize the siting of a set of health clinics. A development investment intelligence platform is provided for planning, monitoring, and analyzing investments in development projects having a machine learning and/or artificial intelligence system configured to optimize the siting of a set of power plants. New investments can be planned by siting them in the right geographic locations to achieve financial and societal project objectives and to reduce the risk to investors by better forecasting demand.

A development investment intelligence platform is provided for planning, monitoring, and analyzing investments in development projects having a machine learning and/or artificial intelligence system configured to optimize the siting of a set of factories. A development investment intelligence platform is provided for planning, monitoring, and analyzing investments in development projects having a machine learning and/or artificial intelligence system configured to optimize the siting of a set of electronic grids. A development investment intelligence platform is provided for planning, monitoring, and analyzing investments in development projects having a machine learning and/or artificial intelligence system configured to optimize the siting of a set of roads, road networks, and/or road network entities. A development investment intelligence platform is provided for planning, monitoring, and analyzing investments in development projects having a machine learning and/or artificial intelligence system configured to optimize the siting of a set of schools.

A development investment intelligence platform is provided for planning, monitoring, and analyzing investments in development projects having a machine learning and/or artificial intelligence system configured to optimize the siting of a set of markets. A development investment intelligence platform is provided for planning, monitoring, and analyzing investments in development projects having a machine learning and/or artificial intelligence system configured to optimize the siting of a set of gas stations. A development investment intelligence platform is provided for planning, monitoring, and analyzing investments in development projects having a machine learning and/or artificial intelligence system configured to optimize the siting of a set of electronic charging stations.

A development investment intelligence platform is provided for planning, monitoring, and analyzing investments in development projects having a machine learning and/or artificial intelligence system configured to optimize the siting of a set of retail stores. A development investment intelligence platform is provided for planning, monitoring, and analyzing investments in development projects having a machine learning and/or artificial intelligence system configured to optimize the siting of a set of public transportation networks and network entities. A development investment intelligence platform is provided for planning, monitoring, and analyzing investments in development projects having a machine learning and/or artificial intelligence system configured to optimize the siting of a set of aquifers. A development investment intelligence platform is provided for planning, monitoring, and analyzing investments in development projects having a machine learning and/or artificial intelligence system configured to optimize the siting of a set of ATMs.

A development investment intelligence platform is provided for planning, monitoring, and analyzing investments in development projects having a machine learning and/or artificial intelligence system configured to optimize the siting of a set of bridges. A development investment intelligence platform is provided for planning, monitoring, and analyzing investments in development projects having a machine learning and/or artificial intelligence system configured to optimize the siting of a set of waste treatment resources. A development investment intelligence platform is provided for planning, monitoring, and analyzing investments in development projects having a machine learning and/or artificial intelligence system configured to optimize the siting of a set of desalination resources. A development investment intelligence platform is provided for planning, monitoring, and analyzing investments in development projects having a machine learning and/or artificial intelligence system configured to prioritize maintaining, repairing, and/or upgrading existing infrastructure.

A development investment intelligence platform is provided for planning, monitoring, and analyzing investments in development projects having a machine learning and/or artificial intelligence system configured to prioritize maintaining, repairing, and/or upgrading an existing set of telecommunications towers. A development investment intelligence platform is provided for planning, monitoring, and analyzing investments in development projects having a machine learning and/or artificial intelligence system configured to prioritize maintaining, repairing, and/or upgrading equipment in an existing set of health clinics. A development investment intelligence platform is provided for planning, monitoring, and analyzing investments in development projects having a machine learning and/or artificial intelligence system configured to prioritize maintaining, repairing, and/or upgrading equipment in an existing set of power plants.

A development investment intelligence platform is provided for planning, monitoring, and analyzing investments in development projects having a machine learning and/or artificial intelligence system configured to prioritize maintaining, repairing, and/or upgrading equipment in an existing set of factories. A development investment intelligence platform is provided for planning, monitoring, and analyzing investments in development projects having a machine learning and/or artificial intelligence system configured to prioritize maintaining, repairing, and/or upgrading equipment in an existing set of electronic grids. A development investment intelligence platform is provided for planning, monitoring, and analyzing investments in development projects having a machine learning and/or artificial intelligence system configured to prioritize maintaining, repairing, and/or upgrading an existing set of roads, road networks, and/or road network entities. A development investment intelligence platform is provided for planning, monitoring, and analyzing investments in development projects having a machine learning and/or artificial intelligence system configured to prioritize maintaining, repairing, and/or upgrading an existing set of schools and/or school equipment.

A development investment intelligence platform is provided for planning, monitoring, and analyzing investments in development projects having a machine learning and/or artificial intelligence system configured to prioritize maintaining, repairing, and/or upgrading an existing set of gas stations and/or gas station equipment. A development investment intelligence platform is provided for planning, monitoring, and analyzing investments in development projects having a machine learning and/or artificial intelligence system configured to prioritize maintaining, repairing, and/or upgrading an existing set of electronic charging stations and/or electronic charging equipment. A development investment intelligence platform is provided for planning, monitoring, and analyzing investments in development projects having a machine learning and/or artificial intelligence system configured to prioritize maintaining, repairing, and/or upgrading an existing set of public transportation networks and network entities. A development investment intelligence platform is provided for planning, monitoring, and analyzing investments in development projects having a machine learning and/or artificial intelligence system configured to prioritize maintaining, repairing, and/or upgrading an existing set of aquifers.

A development investment intelligence platform is provided for planning, monitoring, and analyzing investments in development projects having a machine learning and/or artificial intelligence system configured to prioritize maintaining, repairing, and/or upgrading an existing set of bridges. A development investment intelligence platform is provided for planning, monitoring, and analyzing investments in development projects having a machine learning and/or artificial intelligence system configured to prioritize maintaining, repairing, and/or upgrading an existing set of waste treatment resources. A development investment intelligence platform is provided for planning, monitoring, and analyzing investments in development projects having a machine learning and/or artificial intelligence system configured to maintaining, repairing, and/or upgrading an existing set of desalination resources. A development investment intelligence platform is provided for planning, monitoring, and analyzing investments in development projects having a machine learning and/or artificial intelligence system configured to cluster investments to optimize for an economic benefit.

A development investment intelligence platform is provided for planning, monitoring, and analyzing investments in development projects having a machine learning and/or artificial intelligence system configured to optimize the siting of infrastructure to ensure commercially viable levels of demand while reaching underserved populations. A development investment intelligence platform is provided for planning, monitoring, and analyzing investments in development projects having a machine learning and/or artificial intelligence system configured to optimize subscription revenue. A development investment intelligence platform is provided for planning, monitoring, and analyzing investments in development projects having a machine learning and/or artificial intelligence system configured to optimize pixel display.

Artificial Intelligence for Machine Classification

In embodiments, a development investment intelligence platform is provided for planning, monitoring, and analyzing investments in development projects having a machine learning and/or artificial intelligence system configured to classify and/or map assets and/or infrastructure. A development investment intelligence platform is provided for planning, monitoring, and analyzing investments in development projects having a machine learning and/or artificial intelligence system configured to classify power grid assets and/or infrastructure. By way of non-limiting examples, such assets can include consumer durable goods and appliances, forest assets, agricultural assets including processing appliances and transportation hubs. A development investment intelligence platform is provided for planning, monitoring, and analyzing investments in development projects having a machine learning and/or artificial intelligence system configured to classify water assets and/or infrastructure.

A development investment intelligence platform is provided for planning, monitoring, and analyzing investments in development projects having a machine learning and/or artificial intelligence system configured to classify networking assets and/or infrastructure. A development investment intelligence platform is provided for planning, monitoring, and analyzing investments in development projects having a machine learning and/or artificial intelligence system configured to classify roadway assets and/or infrastructure. A development investment intelligence platform is provided for planning, monitoring, and analyzing investments in development projects having a machine learning and/or artificial intelligence system configured to classify bridge/tunnel assets and/or infrastructure.

A development investment intelligence platform is provided for planning, monitoring, and analyzing investments in development projects having a machine learning and/or artificial intelligence system configured to classify flood prevention assets and/or infrastructure. A development investment intelligence platform is provided for planning, monitoring, and analyzing investments in development projects having a machine learning and/or artificial intelligence system configured to classify erosion protection assets and/or infrastructure. A development investment intelligence platform is provided for planning, monitoring, and analyzing investments in development projects having a machine learning and/or artificial intelligence system configured to classify food storage/distribution assets and/or infrastructure. A development investment intelligence platform is provided for planning, monitoring, and analyzing investments in development projects having a machine learning and/or artificial intelligence system configured to classify food storage/distribution assets and/or infrastructure.

A development investment intelligence platform is provided for planning, monitoring, and analyzing investments in development projects having a machine learning and/or artificial intelligence system configured to estimate the probability that a pixel is cropland. In embodiments, machine learning models may be applied to estimate the probability that a pixel is cropland versus non-cropland. The probability is then translated into a discrete classification (cropland/non-cropland) by setting a minimum probability threshold. The dataset uses best available information to determine the threshold value. A development investment intelligence platform is provided for planning, monitoring, and analyzing investments in development projects having a machine learning and/or artificial intelligence system configured to classify crops. Core assets include a set of data layers that estimate key socioeconomic outcomes at high spatial resolution. Household well-being measures including asset wealth and consumption are estimated. Further, agricultural productivity measures including crop classification and yield estimation are estimated.

A development investment intelligence platform is provided for planning, monitoring, and analyzing investments in development projects having a machine learning and/or artificial intelligence system configured to classify activities. Activities can include actions or events such as, but not limited to, construction and accidents. A development investment intelligence platform is provided for planning, monitoring, and analyzing investments in development projects having a machine learning and/or artificial intelligence system configured to classify activities that require responses. A development investment intelligence platform is provided for planning, monitoring, and analyzing investments in development projects having a machine learning and/or artificial intelligence system configured for classification of states. A development investment intelligence platform is provided for planning, monitoring, and analyzing investments in development projects having a machine learning and/or artificial intelligence system configured for classification of a set of geospatial areas that correspond to a set of jurisdictions. Classification of areas by jurisdiction may occur at different levels (region, country, state, province, canton, county, township, town, neighborhood, zip code, etc.), such that an identified set of features may be linked to a single or an aggregated set of jurisdictional elements, such as to designate what stakeholders would be required in order to get permission to develop in an area.

Artificial Intelligence for Prediction

In embodiments, a development investment intelligence platform is provided for planning, monitoring, and analyzing investments in development projects having a machine learning and/or artificial intelligence system configured to predict socioeconomic outcomes. A development investment intelligence platform is provided for planning, monitoring, and analyzing investments in development projects having a machine learning and/or artificial intelligence system configured to predict household asset wealth future states and/or growth rates. A development investment intelligence platform is provided for planning, monitoring, and analyzing investments in development projects having a machine learning and/or artificial intelligence system configured to predict household asset health future states.

A development investment intelligence platform is provided for planning, monitoring, and analyzing investments in development projects having a machine learning and/or artificial intelligence system configured to predict household consumption future states and/or growth rates. A development investment intelligence platform is provided for planning, monitoring, and analyzing investments in development projects having a machine learning and/or artificial intelligence system configured to predict crop area future states and/or growth rates. A development investment intelligence platform is provided for planning, monitoring, and analyzing investments in development projects having a machine learning and/or artificial intelligence system configured to predict crop yield future states and/or growth rates.

A development investment intelligence platform is provided for planning, monitoring, and analyzing investments in development projects having a machine learning and/or artificial intelligence system configured to predict or anticipate states. A development investment intelligence platform is provided for planning, monitoring, and analyzing investments in development projects having a machine learning and/or artificial intelligence system configured to predict the number of human lives impacted by a specific action or set of actions.

A development investment intelligence platform is provided for planning, monitoring, and analyzing investments in development projects having a machine learning and/or artificial intelligence system configured to predict consumer demand for a product or service for a geospatial segment as a future state and/or growth rate. In embodiments, the computer-implemented systems, platforms and methods accordingly may provide improved and more frequent data on economic well-being, agricultural productivity and infrastructure access across the emerging markets to offer a wider range of applications. By way of non-limiting examples, the applications include positioning infrastructure, forecasting consumer demand, improved program targeting and economic impact measurement. In this regard, insights on the demand for resulting infrastructure, product or service are provided. Forecasting of product demand can be estimated and forecasted at a granular level.

A development investment intelligence platform is provided for planning, monitoring, and analyzing investments in development projects having a machine learning and/or artificial intelligence system configured to predict population for a geospatial area as a future state and/or growth rate. A development investment intelligence platform is provided for planning, monitoring, and analyzing investments in development projects having a machine learning and/or artificial intelligence system configured to predict population demographics for a geospatial area.

A development investment intelligence platform is provided for planning, monitoring, and analyzing investments in development projects having a machine learning and/or artificial intelligence system configured to predict successful locations for development projects. In embodiments, the platform may be configured to help predict future successful locations for development based on previous locations that have been successful in the past. By way of example, there can be review of key attributes, which may be best representative for such undertaking, should a user be interested in determining what geographic location is best to build a microgrid. In this regard, attributes such as structural density, signs of electricity usage, visible appliances, irrigated crops, asset wealth, consumption patterns can be considered that may be relevant to impacting a successful microgrid project at a given geography. A development investment intelligence platform is provided for planning, monitoring, and analyzing investments in development projects having a machine learning and/or artificial intelligence system configured to predict emerging locations for development projects.

Artificial Intelligence for Detection

In embodiments, a development investment intelligence platform is provided for planning, monitoring, and analyzing investments in development projects having a machine learning and/or artificial intelligence system configured to identify connections between global economic entities. In embodiments, the computer-implemented systems, platforms and methods may provide measurement approaches to scalably estimate industrial productivity and quality measures, market demand, and economic well-being. In embodiments, the computer-implemented systems, platforms and methods can estimate the interrelationships between these measures. Key assets are classified and mapped (locations of crop fields, roads, markets, medical facilities, etc.). The productivity and/or quality of those assets are analyzed. Changes in those metrics over time are measured. The changes are associated with key socioeconomic and financial outcomes.

A development investment intelligence platform is provided for planning, monitoring, and analyzing investments in development projects having a machine learning and/or artificial intelligence system configured to identify trends related to economic opportunities and/or identifying economic opportunities. The platform can further outline the interrelationships between people, industry, infrastructure and socioeconomic outcomes so that the world can more clearly work to realize economic opportunity and a more sustainable future. A development investment intelligence platform is provided for planning, monitoring, and analyzing investments in development projects having a machine learning and/or artificial intelligence system configured to identify population segments in the greatest need of one or more resources. A development investment intelligence platform is provided for planning, monitoring, and analyzing investments in development projects having a machine learning and/or artificial intelligence system configured to identify social programs and/or investments where monitored outcomes meet predetermined thresholds. The platform can further assess the impact of investments on economic well-being and other downstream industries.

A development investment intelligence platform is provided for planning, monitoring, and analyzing investments in development projects having a machine learning and/or artificial intelligence system configured to identify social programs and/or investments where monitored outcomes are not meeting one or more predetermined thresholds. A development investment intelligence platform is provided for planning, monitoring, and analyzing investments in development projects having a machine learning and/or artificial intelligence system configured to monitor the downstream benefits of upgraded infrastructure. A development investment intelligence platform is provided for planning, monitoring, and analyzing investments in development projects having a machine learning and/or artificial intelligence system configured to detect drivers of economic advancement.

Artificial Intelligence for Decision Support

In embodiments, a development investment intelligence platform is provided for planning, monitoring, and analyzing investments in development projects having a machine learning and/or artificial intelligence system configured to generate one or more measures related to poverty and/or represent poverty on a digital map. As disclosed herein, the computer-implemented systems, platforms and methods may use satellite imagery to map poverty and crop yields in Africa using a combination of economic data, space technology and machine learning algorithms.

In embodiments, the computer-implemented systems, platforms and methods may estimate asset wealth for a particular geography and output a poverty map that reflects the asset wealth. In examples, a temporal extent for a range of years (2003-2018, for example) can be received. A four year spatial extent can be determined using a predetermined spatial resolution (such as 2 km for example). Economists look for ways to measure economic well-being outside of currency. Determining asset wealth is one suitable method. Extensive survey data is collated on assets owned by households across the continent. Asset wealth index (AWI) is a first principal component of a principle component analysis (PCA). The PCA is computed on those assets over the selected households. An annualized data product from the values which represent a four-year window is created. Values for each year in the four-year window are duplicated. A sample pixel may have the same value for each year (e.g., in each year of years 2003-2006), and may have a different value for each year of another block of years (e.g., years 2007-2010). As explained herein, input datasets can include household surveys on economic well-being, Landsat multispectral imagery, and Nightlights imagery. Extensive cross-validation on datasets withheld from model training is conducted and evaluated. Example use cases include targeting of social support programs, monitoring and evaluation for poverty alleviation initiatives, mapping populations susceptible to shocks from weather, conflict and disease, modeling socio-environmental factors contributing to poverty, lending risk assessment and underwriting, and market sizing.

In embodiments, the computer-implemented systems, platforms and methods may estimate economic consumption for a particular geography and output a poverty map that reflects the asset wealth. In examples, a temporal extent for a range of years (2003-2018, for example) can be received. An annual temporal resolution can be used. A spatial resolution can be selected such as 2 km and coarser. The value of each pixel is economic consumption per capita per day, averaged over the population within the pixel. Consumption as applied herein means the use of goods and services, as distinct from consumption expenditure which is the purchase of goods and services. The value of using durable goods, like motorbikes, is included in a household's consumption amount, whereas the consumption expenditure of a motorbike only happens when it's bought or sold. In order to get the best pixel-level accuracy, baseline consumption estimates are calibrated to national-level datasets on the distribution of consumption. In many cases, the calibration process produces sharp difference in values at the border between countries. As explained herein, input datasets can include household surveys on economic consumption, national level data on the distribution of household consumption, Landsat multispectral imagery, Nightlights imagery and spatially explicit population datasets. Extensive cross-validation on datasets withheld from model training is conducted and evaluated. Example use cases include targeting of social support programs, monitoring and evaluation for poverty alleviation initiatives, mapping populations susceptible to shocks from weather, conflict and disease, modeling socio-environmental factors contributing to poverty, lending risk assessment and underwriting, and market sizing.

A development investment intelligence platform is provided for planning, monitoring, and analyzing investments in development projects having a machine learning and/or artificial intelligence system configured to generate one or more measures related to crop area and/or represent crop area on a digital map. A temporal index is chosen, for example, 2009-2019 and has an annual resolution. A spatial extend is chosen, for example, Ethiopia, Kenya, Zimbabwe, and/or Malawi. A special resolution is chosen, for example, 500 meters and having units in hectares (ha). The value of each pixel is area (ha) of cropland managed with annual crops. In some examples, the crop area dataset does not distinguish between crop type. A machine learning model is applied to estimate the probability that a pixel is cropland versus non-cropland. The probability is then translated into a discrete classification (cropland or non-cropland) by setting a minimum probability threshold. The current dataset uses best available information to determine the threshold value. Input datasets can include Landsat 5, 7, and 8 multispectral time-series imagery. Cross-validation techniques are used to guide model training and subsequently, model performance is evaluated against a pixel-level evaluation dataset withheld from model training. Further, the prediction quality is investigated by comparing aggregate estimates with those available from National Statistical Offices (NSO's). Example use cases can include regional agricultural monitoring and reporting, assessment of crop area and production losses from bad weather and pests, monitoring and enforcement of illegal land clearing for agriculture, assessing suitability of uncropped area for legal agricultural land expansion, crop insurance risk assessment. The disclosure further provides embodiments in which there are continuous monitoring and updating of greenness levels of crops in comparison with historical behavior. Post-harvest cropland area estimates are determined. Generic cropland is classified at the pixel level. The estimates are aggregated at the regional level providing a total area planted in each growing season.

A development investment intelligence platform is provided for planning, monitoring, and analyzing investments in development projects having a machine learning and/or artificial intelligence system configured to generate one or more measures related to maize area and/or represent maize area on a digital map. A development investment intelligence platform is provided for planning, monitoring, and analyzing investments in development projects having a machine learning and/or artificial intelligence system configured to generate one or more measures related to soy area and/or represent soy area on a digital map. A development investment intelligence platform is provided for planning, monitoring, and analyzing investments in development projects having a machine learning and/or artificial intelligence system configured to generate one or more measures related to wheat area and/or represent wheat area on a digital map.

A development investment intelligence platform is provided for planning, monitoring, and analyzing investments in development projects having a machine learning and/or artificial intelligence system configured to generate one or more measures related to teff area and/or represent teff area on a digital map. A development investment intelligence platform is provided for planning, monitoring, and analyzing investments in development projects having a machine learning and/or artificial intelligence system configured to generate one or more measures related to cassava area and/or represent cassava area on a digital map. A development investment intelligence platform is provided for planning, monitoring, and analyzing investments in development projects having a machine learning and/or artificial intelligence system configured to generate one or more measures related to cocoa area and/or represent cocoa area on a digital map.

A development investment intelligence platform is provided for planning, monitoring, and analyzing investments in development projects having a machine learning and/or artificial intelligence system configured to generate one or more measures related to crop yields and/or represent crop yields on a digital map. A development investment intelligence platform is provided for planning, monitoring, and analyzing investments in development projects having a scalable crop yield mapping algorithm for estimating crop yield in data-scarce environments. A development investment intelligence platform is provided for planning, monitoring, and analyzing investments in development projects having a machine learning and/or artificial intelligence system configured to generate one or more measures related to crop vigor and/or represent crop vigor on a digital map.

A development investment intelligence platform is provided for planning, monitoring, and analyzing investments in development projects having a machine learning and/or artificial intelligence system configured to generate one or more measures related to maize yield and/or represent maize yield on a digital map. A development investment intelligence platform is provided for planning, monitoring, and analyzing investments in development projects having a machine learning and/or artificial intelligence system configured to generate one or more measures related to soy yield and/or represent soy yield on a digital map. A development investment intelligence platform is provided for planning, monitoring, and analyzing investments in development projects having a machine learning and/or artificial intelligence system configured to generate one or more measures related to wheat yield and/or represent wheat yield on a digital map. A development investment intelligence platform is provided for planning, monitoring, and analyzing investments in development projects having a machine learning and/or artificial intelligence system configured to generate one or more measures related to teff yield and/or represent teff yield on a digital map.

A development investment intelligence platform is provided for planning, monitoring, and analyzing investments in development projects having a machine learning and/or artificial intelligence system configured to generate one or more measures related to cassava yield and/or represent cassava yield on a digital map. A development investment intelligence platform is provided for planning, monitoring, and analyzing investments in development projects having a machine learning and/or artificial intelligence system configured to generate one or more measures related to cocoa yield and/or represent cocoa yield on a digital map. A development investment intelligence platform is provided for planning, monitoring, and analyzing investments in development projects having a machine learning and/or artificial intelligence system configured to generate one or more measures related to pests and/or represent pest-prone areas on a digital map.

A development investment intelligence platform is provided for planning, monitoring, and analyzing investments in development projects having a machine learning and/or artificial intelligence system configured to generate one or more measures related to electrification and/or represent electrification on a digital map. A development investment intelligence platform is provided for planning, monitoring, and analyzing investments in development projects having a machine learning and/or artificial intelligence system configured to generate one or more measures related to population and/or represent population on a digital map. A development investment intelligence platform is provided for planning, monitoring, and analyzing investments in development projects having a machine learning and/or artificial intelligence system configured to generate one or more measures related to settlements and/or represent settlements on a digital map. A development investment intelligence platform is provided for planning, monitoring, and analyzing investments in development projects having a machine learning and/or artificial intelligence system configured to generate one or more measures related to inequality and/or represent inequality on a digital map.

A development investment intelligence platform is provided for planning, monitoring, and analyzing investments in development projects having a machine learning and/or artificial intelligence system configured to generate an estimate of daily per capita expenditure and/or represent daily per capita expenditure on a digital map. A development investment intelligence platform is provided for planning, monitoring, and analyzing investments in development projects having a machine learning and/or artificial intelligence system configured to provide decision support related to targeting resources for a geospatial segment. A development investment intelligence platform is provided for planning, monitoring, and analyzing investments in development projects having a machine learning and/or artificial intelligence system configured to provide decision support related to developing policies for a geospatial segment. A development investment intelligence platform is provided for planning, monitoring, and analyzing investments in development projects having a machine learning and/or artificial intelligence system configured to track accountability for social programs and/or investments.

A development investment intelligence platform is provided for planning, monitoring, and analyzing investments in development projects having a machine learning and/or artificial intelligence system configured to generate one or more measures of economic well-being for a geospatial segment and/or represent economic well-being on a digital map. A development investment intelligence platform is provided for planning, monitoring, and analyzing investments in development projects having a machine learning and/or artificial intelligence system configured to generate one or more measures of household asset wealth for a geospatial segment and/or represent household asset wealth on a digital map. A development investment intelligence platform is provided for planning, monitoring, and analyzing investments in development projects having a machine learning and/or artificial intelligence system configured to generate one or more measures of consumption for a geospatial segment and/or represent consumption on a digital map.

A development investment intelligence platform is provided for planning, monitoring, and analyzing investments in development projects having a machine learning and/or artificial intelligence system configured to generate one or more measures related to agricultural productivity for a geospatial segment and/or representing agricultural productivity on a digital map. A development investment intelligence platform is provided for planning, monitoring, and analyzing investments in development projects having a machine learning and/or artificial intelligence system configured to generate one or more measures related to infrastructure access for a geospatial segment and/or representing infrastructure access on a digital map. A development investment intelligence platform is provided for planning, monitoring, and analyzing investments in development projects having a machine learning and/or artificial intelligence system configured to generate one or more measures of infrastructure quality for a set of infrastructure assets and/or a geospatial segment and/or represent infrastructure quality on a digital map. A development investment intelligence platform is provided for planning, monitoring, and analyzing investments in development projects having a machine learning and/or artificial intelligence system configured to generate one or more measures related to road quality and/or representing road quality on a digital map.

A development investment intelligence platform is provided for planning, monitoring, and analyzing investments in development projects having a machine learning and/or artificial intelligence system configured to generate one or more measures related to electronic grid reliability and/or representing electronic grid reliability on a digital map. A development investment intelligence platform is provided for planning, monitoring, and analyzing investments in development projects having a machine learning and/or artificial intelligence system configured generating one or more measures related to disease risk for a geospatial segment and/or representing disease risk on a digital map. A development investment intelligence platform is provided for planning, monitoring, and analyzing investments in development projects having a machine learning and/or artificial intelligence system configured to generate one or more measures related to the productivity of an economic sector for a geospatial segment and/or representing the productivity of an economic sector on a digital map.

A development investment intelligence platform is provided for planning, monitoring, and analyzing investments in development projects having a machine learning and/or artificial intelligence system configured to generate one or more measures related to education for a geospatial segment and/or representing education on a digital map. A development investment intelligence platform is provided for planning, monitoring, and analyzing investments in development projects having a machine learning and/or artificial intelligence system configured to generate one or more measures related to pollution for a geospatial segment and/or representing pollution on a digital map. A development investment intelligence platform is provided for planning, monitoring, and analyzing investments in development projects having a machine learning and/or artificial intelligence system configured to generate one or more measures related to economic impact for a set of actions. A development investment intelligence platform is provided for planning, monitoring, and analyzing investments in development projects having a machine learning and/or artificial intelligence system configured to generate one or more non-economic measures related to impact for a set of actions.

A development investment intelligence platform is provided for planning, monitoring, and analyzing investments in development projects having a machine learning and/or artificial intelligence system configured to determine the amount of money required in incremental annual investments to achieve an objective. A development investment intelligence platform is provided for planning, monitoring, and analyzing investments in development projects having a machine learning and/or artificial intelligence system configured to link specific actions with target outcomes. A development investment intelligence platform is provided for planning, monitoring, and analyzing investments in development projects having a machine learning and/or artificial intelligence system configured to abstract complexities for non-technical decision makers. A development investment intelligence platform is provided for planning, monitoring, and analyzing investments in development projects having a machine learning and/or artificial intelligence system configured to monitor active investments. A development investment intelligence platform is provided for planning, monitoring, and analyzing investments in development projects having a machine learning and/or artificial intelligence system configured to generate a business strategy for a geospatial segment. A development investment intelligence platform for planning, monitoring, and analyzing investments in development projects having a machine learning and/or artificial intelligence system configured to monitor a supply chain.

A development investment intelligence platform is provided for planning, monitoring, and analyzing investments in development projects having a machine learning and/or artificial intelligence system configured to provide decision support related to urban development and planning for a geospatial segment. A development investment intelligence platform is provided for planning, monitoring, and analyzing investments in development projects having a machine learning and/or artificial intelligence system configured to provide decision support related to insurance. Other applications include business strategy such as new market opportunities and supply chain monitoring, urban development and planning, insurance, public sectors, and disaster response efforts. A development investment intelligence platform is provided for planning, monitoring, and analyzing investments in development projects having a machine learning and/or artificial intelligence system configured to provide decision support related to disaster response for a geospatial segment. A development investment intelligence platform is provided for planning, monitoring, and analyzing investments in development projects having a machine learning and/or artificial intelligence system configured to provide decision support related to program targeting for a geospatial segment. A development investment intelligence platform is provided for planning, monitoring, and analyzing investments in development projects having a machine learning and/or artificial intelligence system configured to perform market sizing.

A development investment intelligence platform is provided for planning, monitoring, and analyzing investments in development projects having a machine learning and/or artificial intelligence system configured to generate a plan to implement a sequence of development projects. A development investment intelligence platform is provided for planning, monitoring, and analyzing investments in development projects having a machine learning and/or artificial intelligence system configured to select implementers in a development project. A development investment intelligence platform is provided for planning, monitoring, and analyzing investments in development projects having a machine learning and/or artificial intelligence system configured to evaluate the performance of implementers in a development project. A development investment intelligence platform is provided for planning, monitoring, and analyzing investments in development projects having a machine learning and/or artificial intelligence system configured to plan a non-infrastructure development project.

Artificial Intelligence for Inference.

A development investment intelligence platform is provided for planning, monitoring, and analyzing investments in development projects having a machine learning and/or artificial intelligence system configured to transfer an insight and/or inference to one or more countries and/or geospatial areas. As explained herein, there are many countries where survey data is not collected for. The techniques discussed herein provide AI models that transfer the insight or inference to countries where data is missing or incomplete.

Data Fusion and Integration.

A development investment intelligence platform is provided for planning, monitoring, and analyzing investments in development projects having a data fusion system. The machine learning techniques discussed herein provide an ethical collection and fusion of large quantities of satellite, digital and ground truth data. Further, the software tools disclosed herein abstract the complexity of this technology for non-technical decision makers.

A development investment intelligence platform is provided for planning, monitoring, and analyzing investments in development projects having a data fusion system for fusing satellite and economic data. A development investment intelligence platform is provided for planning, monitoring, and analyzing investments in development projects having a data fusion system for fusing satellite and agricultural data. A development investment intelligence platform is provided for planning, monitoring, and analyzing investments in development projects having a data fusion system for fusing satellite and infrastructure data. A development investment intelligence platform is provided for planning, monitoring, and analyzing investments in development projects having a data fusion system for fusing satellite and geopolitical data.

A development investment intelligence platform is provided for planning, monitoring, and analyzing investments in development projects having a data fusion system for fusing satellite and demographic data. A development investment intelligence platform is provided for planning, monitoring, and analyzing investments in development projects having a data fusion system for fusing satellite and weather data. A development investment intelligence platform is provided for planning, monitoring, and analyzing investments in development projects having a data fusion system for fusing satellite and education data. A development investment intelligence platform is provided for planning, monitoring, and analyzing investments in development projects having a data fusion system for fusing satellite and health data.

A development investment intelligence platform is provided for planning, monitoring, and analyzing investments in development projects having a data fusion system for fusing different satellite data. A development investment intelligence platform is provided for planning, monitoring, and analyzing investments in development projects having a set of data integration services. Native resolution is one area that is sampled at some fundamental level. An image, for example, has a pixel that resolves to 500 meters, but other data sets may be at other resolutions such as two or five kilometers. These two data sets, in embodiments, may be related together through the data fusion module 60 (FIG. 1A) at different resolutions of input data sets. In embodiments, spatialized survey data (often textual) may be used that otherwise exists as non-image data. Information from public domain map sources may be at different degrees of resolution. According to examples, the layers of information can be normalized (such as at 2 kM). Different data sets can therefore be meshed or placed on top of each other while operating in their own resolution space.

A development investment intelligence platform is provided for planning, monitoring, and analyzing investments in development projects having a set of data integration services. In these examples, the set of data integration services include integrating user and/or customer data with platform data.

Enhanced Search.

A development investment intelligence platform is provided for planning, monitoring, and analyzing investments in development projects having a search engine. In these examples, the search engine is integrated with the platform and/or populated by unique data streams from the platform.

Crowdsourcing.

A development investment intelligence platform is provided for planning, monitoring, and analyzing investments in development projects having a crowdsourcing system for crowdsourcing data. A development investment intelligence platform is provided for planning, monitoring, and analyzing investments in development projects having a crowdsourcing system for crowdsourcing data and having a rewards system for rewarding users that contribute data.

Methods for Monitoring Investments.

A method for monitoring an investment in a geospatial segment is provided. The method includes: receiving a set of geospatial images; classifying assets in a geospatial segment in the set of geospatial images; generating a measure related to the productivity and/or quality of the assets; calculating changes in the measures of productivity and/or quality of the assets over time; and associating the changes with socio-economic and/or financial outcomes.

Integration with Other Systems.

A development investment intelligence platform is provided for planning, monitoring, and analyzing investments in development projects. In these examples, the development investment intelligence platform is integrated with a satellite system. A development investment intelligence platform is provided for planning, monitoring, and analyzing investments in development projects. In these examples, the development investment intelligence platform is integrated with a social media system.

A development investment intelligence platform is provided for planning, monitoring, and analyzing investments in development projects. In these examples, the development investment intelligence platform is integrated with a supply chain system. A development investment intelligence platform is provided for planning, monitoring, and analyzing investments in development projects. In these examples, the development investment intelligence platform is integrated with an Internet of Things system. A development investment intelligence platform is provided for planning, monitoring, and analyzing investments in development projects. In these examples, the development investment intelligence platform is integrated with computer-aided design system. A development investment intelligence platform is provided for planning, monitoring, and analyzing investments in development projects having a machine intelligence system for automating the generation of an investment thesis for a development project.

Planning Automation

A development investment intelligence platform is provided for planning, monitoring, and analyzing investments in development projects having a machine intelligence system for automating the generation of an investment thesis for a development project.

Matching

A development investment intelligence platform is provided for planning, monitoring, and analyzing investments in development projects having a system for matching a set of resources, resource providers, and beneficiaries to a set of development projects.

Funding

A development investment intelligence platform is provided for planning, monitoring, and analyzing investments in development projects having a funding management system.

Asset Catalog

A development investment intelligence platform is provided for planning, monitoring, and analyzing investments in development projects having a global asset catalog system for cataloging assets in a geo-spatial area and/or globally.

Stakeholder Intelligence

A development investment intelligence platform is provided for planning, monitoring, and analyzing investments in development projects having a machine learning and/or artificial intelligence system configured to identify stakeholders related to a development investment project. Identifying relevant stakeholders can be done based on various factors, including geospatial location, jurisdiction classification (for political stakeholders), type of development project, type of finance, and many others. This may include federated searches for stakeholders in relevant databases of political figures, government agencies, non-government organizations (NGO's), vendors of relevant technologies, property owners, rights holders (e.g., for rights-of-way, liens or encumbrances), service providers, financiers, developers, and others.

A development investment intelligence platform is provided for planning, monitoring, and analyzing investments in development projects having a machine learning and/or artificial intelligence system configured to classify a set of stakeholders related to a development investment project. A development investment intelligence platform is provided for planning, monitoring, and analyzing investments in development projects having a stakeholder taxonomy to organize and classify a set of stakeholders related to a development investment project. A taxonomy can include many attributes, such as geospatial location, jurisdiction classification (for political stakeholders), type of development project, type of finance, and many others.

A development investment intelligence platform is provided for planning, monitoring, and analyzing investments in development projects having a machine learning and/or artificial intelligence system configured to predict stakeholder behavior related to a development project. Stakeholder behavioral data sets can be used to predict future behavior, including relating to probability of granting approvals and permits, prediction of time periods to make decisions, prediction of misbehavior (e.g., graft, corruption, requests for bribes), public relations behavior, political action behavior, lobbying behavior, pricing behavior, bidding behavior, investment behavior, project development behavior, and the like. Aggregate predictions can be made to anticipate the likelihood of success of a product (completion, timing, cost, etc.).

A development investment intelligence platform is provided for planning, monitoring, and analyzing investments in development projects having a machine learning and/or artificial intelligence system configured to recommend a set of stakeholders for a development project. A development investment intelligence platform is provided for planning, monitoring, and analyzing investments in development projects having a machine learning and/or artificial intelligence system configured to recommend a development project based on behavioral data for a set of stakeholders. Stakeholder behavioral data sets and other data sets can be used to generate recommendations for a project, among a set of possible projects, based on predicted stakeholder behavior, including relating to probability of granting approvals and permits, prediction of time periods to make decisions, prediction of misbehavior (e.g., graft, corruption, requests for bribes), public relations behavior, political action behavior, lobbying behavior, pricing behavior, bidding behavior, investment behavior, project development behavior, and the like. Aggregate predictions can be made to anticipate the likelihood of success of a product (completion, timing, cost, etc.). This may include selecting the right project for a known set of stakeholders, such as by collaborative filtering, similarity or other techniques that pattern match a project to the interests, resources and competencies of a defined set of stakeholders. Essentially, the present techniques can be implemented to determine "for this group, this is the best project right now."

Government Economic Planning.

A national economic planning platform is provided that is configured to enable governments to plan, monitor, and analyze investments in national development projects. National economic planning relates to how governments determine which parts of a country are ready for what types of investment, and how to ensure capital flows in the right ways into the right sectors to support development.

Early Warning

In embodiments, an early warning system is provided that is configured to provide warnings related to economic, natural, and/or other disasters. An early warning system is provided that is configured to provide warnings related to vector-borne diseases. An early warning system is provided that is configured to provide warnings related to food insecurity. An early warning system is provided that is configured to provide warnings related to economic, natural, and/or other disasters having a machine learning and/or artificial intelligence system configured to provide decision support related to mitigating a disaster.

The instant disclosure provides important market-relevant features, components, applications, use cases, or the like, that may be combined with embodiments discussed above. The present disclosure measures industrial outcomes such as, but not limited to, agricultural productivity, infrastructure quality and infrastructure access. Further, economic well-being outcomes are measured such as, but not limited to, household asset wealth and consumption. The present disclosure considers various indicators that are relevant to the various outputs discussed herein. Indicators include consumption, assets, income, wealth, education, demographics, population, economy, land use, cover and ownership, water supply and control, education, transportation use, health and medical and communication use. Demographics can include household size, head of household, language, religion and ethnicity. Population information can include poverty index and vulnerability index. Economic information can include consumer classes, bank account ownership, employment sector, electricity access and generator ownership. Land use, cover and ownership can include housing quality, farm size and livestock ownership. Water supply and control can include water source and sanitation. Education can include adult literacy and adult illiteracy. Transportation use can include ownership of vehicles including cars, mopeds, bicycles and boats. Health and medical can include distance to health clinic, child vaccination rate, indoor cooking, obesity rate, stunting rate, tobacco usage, health insurance and attitudes toward domestic abuse. Communication use can include radio ownership, radio listenership, television ownership, newspaper readership, mobile phone ownership, computer ownership and internet.

The present disclosure further considers COVID-19 related indicators. Such indicators can include no water for hand washing, communication risk, exposure risk, water, sanitation, and hygiene, no soap for handwashing, household size, communications risk, health facilities access risk, socioeconomic vulnerability, elderly population, total COVID-19 risk, motorcycle ownership, socio-economic vulnerability, co-morbidities risk, community density and household density and occupation.

The present disclosure considers various data sources including: wealth, consumption, farm yields, agribusiness analytics, satellite imagery/geospatial/earth observation (EO), sensors and information communications technology (ICT) tools to capture and open source ground truth data, population, settlements, Landsat multispectral imagery, nightlights imagery, spatially explicit population datasets, survey data, household surveys on economic consumption, household surveys on economic well-being, national-level data on the distribution of household consumption, Landsat 5, 7 and 8 multispectral time-series imagery, point locations of cropped areas from several data sources, point locations of crop observations from several field data sources, weather datasets from a variety of sources, soil datasets from a variety of sources, crop simulation (APSIM and/or DSSAT model results), drones, airplanes, terrestrial data, ground truth data, public organizations, government data, crime data, trade groups, industry publications pricing data, market data, remote sensors, elevation data, crowdsourced data, smartphone-captured data including photos, videos and geo-location information.

The present disclosure considers various objectives including: drive down poverty, increase food security, strengthen economies, improve human health, improve education, reduce inequalities (gender and racial), clean water and sanitation, renewable energy, creation of quality jobs, economic growth, innovation, infrastructure, sustainable cities and communities, responsible consumption, climate action, improve life below water, improve life on land, peace, justice, reduce crime.

The present disclosure considers various crop types including: maize, wheat teff, cassava, soy and cocoa. The present disclosure considers various infrastructure including: power plants, electronic grids, telecommunications towers, factories, health clinics, transportation, fields, markets, gas stations, retail stores, aquifers, bridges, automated teller machines (ATM's). The present disclosure considers various social media including Facebook™, Instagram™, Twitter™, TikTok™, SnapChat™, Twitch™, YouTube™, WeChat™, Clubhouse™, Periscope™, LinkedIn™ platforms and combinations thereof. The present disclosure considers various machine-learned models including: neural networks, regression-based models, decision trees, random forests, hidden Markov models, and Bayesian models.

While the instant disclosure is specifically directed to the emerging markets of Africa, the applications are not so limited. In this regard, the present disclosure may be applicable to other emerging markets including, but not limited to, Argentina, Brazil, Chile, China, Colombia, Czech Republic, Hungary, India, Indonesia, Korea, Malaysia, Mexico, Pakistan, Peru, Philippines, Poland, Qatar, Russia, Saudi Arabia, South Africa, Taiwan, Thailand, Turkey, United Arab Emirates, Hong Kong, Jordan, Kuwait, Singapore and Vietnam. The present disclosure considers application to any country of Africa including Nigeria, Ethiopia, Egypt, Democratic Republic of Congo, Tanzania, Kenya, Uganda, Algeria, Sudan, Morocco, Angola, Mozambique, Ghana, Madagascar, Cameroon, Côte d'Ivoire, Niger, Burkina Faso, Mali, Malawi, Zambia, Senegal, Chad, Somalia, Zimbabwe, Guinea, Rwanda, Benin, Burundi, Tunisia, South Sudan, Togo, Sierra Leone, Libya, Congo, Liberia, Central African Republic, Mauritania, Eritrea, Namibia, Gambia, Botswana, Gabon, Lesotho, Guinea-Bissau, Equatorial Guinea, Mauritius, Eswatini, Djibouti, Comoros, Cabo Verde, Sao Tome & Principe and Seychelles.

The present disclosure can be applied to address various resource allocation problems including, but not limited to, business expansion, investment targeting and allocation, development program targeting, disaster recovery and national economic planning. Top attributes for clustering (locations) include: structural density, observable signs of electricity usage (night lights), appliances visible, irrigated crops, wealth, and consumption patterns. Non-infrastructure projects include nutrition intervention and vaccination. Assets can include consumer durable goods and appliances, forest assets, agricultural assets such as processing appliances and transportation hubs. LEGAL The background description is presented simply for context, and is not necessarily well-understood, routine, or conventional. Further, the background description is not an admission of what does or does not qualify as prior art. In fact, some or all of the background description may be work attributable to the named inventors that is otherwise unknown in the art.

Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements.

Example relationship terms include "adjoining," "transmitting," "receiving," "connected," "engaged," "coupled," "adjacent," "next to," "on top of," "above," "below," "abutting," and "disposed."

The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure.

No language in the specification should be construed as indicating that any non-claimed element is essential or critical to the practice of the disclosure.

The term "exemplary" simply means "example" and does not indicate a best or preferred example.

The term "set" does not necessarily exclude the empty set—in other words, in some circumstances a "set" may have zero elements. The term "non-empty set" may be used to indicate exclusion of the empty set—that is, a non-empty set must have one or more elements.

The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C."

The use of the terms "a," "an," "the," and similar referents in the context of describing the disclosure and claims encompasses both the singular and the plural, unless contradicted explicitly or by context.

Unless otherwise specified, the terms "comprising," "having," "with," "including," and "containing," and their variants, are open-ended terms, meaning "including, but not limited to."

Each publication referenced in this disclosure, including foreign and domestic patent applications and patents, is hereby incorporated by reference in its entirety.

Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure.

One or more elements (for example, steps within a method, instructions, actions, or operations) may be executed in a different order (and/or concurrently) without altering the principles of the present disclosure.

Unless technically infeasible, elements described as being in series may be implemented partially or fully in parallel. Similarly, unless technically infeasible, elements described as being in parallel may be implemented partially or fully in series.

While the disclosure describes structures corresponding to claimed elements, those elements do not necessarily invoke a means plus function interpretation unless they explicitly use the signifier "means for."

While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks.

Unless explicitly stated as mutually exclusive, features depicted in different drawings can be combined consistent with the principles of the present disclosure.

In the drawings, reference numbers may be reused to identify identical elements or may simply identify elements that implement similar functionality.

Numbering or other labeling of instructions or method steps is done for convenient reference, not to indicate a fixed order.

In the drawings, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A.

Unless otherwise indicated, recitations of ranges of values are merely intended to serve as a shorthand way of referring individually to each separate value falling within the range, and each separate value is hereby incorporated into the specification as if it were individually recited.

Special-Purpose System

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio.

In this application, including the claims, the term module refers to a special-purpose system. The module may be implemented by one or more special-purpose systems. The one or more special-purpose systems may also implement some or all of the other modules.

In this application, including the claims, the term module may be replaced with the terms controller or circuit.

In this application, including the claims, the term platform refers to one or more modules that offer a set of functions.

In this application, including the claims, the term system may be used interchangeably with module or with the term special-purpose system.

The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment.

For example, the special-purpose system may be partially or fully hosted by a third party offering software as a service (SaaS), platform as a service (PaaS), and/or infrastructure as a service (IaaS).

The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

Device Examples

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc.

A special-purpose system may be partially or fully implemented using or by a network device. Examples of network devices include switches, routers, firewalls, gateways, hubs, base stations, access points, repeaters, head-ends, user equipment, cell sites, antennas, towers, etc.

A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system.

Examples of servers include a file server, print server, domain server, internet server, intranet server, cloud server, infrastructure-as-a-service server, platform-as-a-service server, web server, secondary server, host server, distributed server, failover server, and backup server.

Hardware

The term hardware encompasses components such as processing hardware, storage hardware, networking hardware, and other general-purpose and special-purpose components. Note that these are not mutually-exclusive categories. For example, processing hardware may integrate storage hardware and vice versa.

Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc.

Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack.

Examples of a system-on-chip include a radio frequency (RF) system-on-chip, an artificial intelligence (AI) system-on-chip, a video processing system-on-chip, an organ-on-chip, a quantum algorithm system-on-chip, etc.

The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Processing Hardware

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co-processor.

Processor Architecture

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application.

A processor may be implemented as a packaged semiconductor die. The die includes one or more processing cores and may include additional functional blocks, such as cache. In various embodiments, the processor may be implemented by multiple dies, which may be combined in a single package or packaged separately.

Networking Hardware

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs).

Examples of cellular networks include GSM, GPRS, 3G, 4G, 5G, LTE, and EVDO. The cellular network may be implemented using frequency division multiple access (FDMA) network or code division multiple access (CDMA) network.

Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard).

Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG).

A WAN may also be referred to as a distributed communications system (DCS). One example of a WAN is the internet.

Storage Hardware

Storage hardware is or includes a computer-readable medium. The term computer-readable medium, as used in this disclosure, encompasses both nonvolatile storage and volatile storage, such as dynamic random access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

Examples

Examples of storage implemented by the storage hardware include a database (such as a relational database or a NoSQL database), a data store, a data lake, a column store, a data warehouse.

Example of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware.

Storage hardware may have read-only, write-once, or read/write properties. Storage hardware may be random access or sequential access. Storage hardware may be location-addressable, file-addressable, and/or content-addressable.

Example of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM).

Example of volatile memory devices include processor registers and random access memory (RAM), such as static RAM (SRAM), dynamic RAM (DRAM), synchronous DRAM (SDRAM), synchronous graphics RAM (SGRAM), and video RAM (VRAM).

Example of magnetic storage media include analog magnetic tape, digital magnetic tape, and rotating hard disk drive (HDDs).

Examples of optical storage media include a CD (such as a CD-R, CD-RW, or CD-ROM), a DVD, a Blu-ray disc, and an Ultra HD Blu-ray disc.

Examples of storage implemented by the storage hardware include a distributed ledger, such as a permissioned or permissionless blockchain.

Entities recording transactions, such as in a blockchain, may reach consensus using an algorithm such as proof-of-stake, proof-of-work, and proof-of-storage.

Elements of the present disclosure may be represented by or encoded as non-fungible tokens (NFTs). Ownership rights related to the non-fungible tokens may be recorded in or referenced by a distributed ledger.

Transactions initiated by or relevant to the present disclosure may use one or both of fiat currency and cryptocurrencies, examples of which include bitcoin and ether.

Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware.

A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.
Software Software includes instructions that are machine-readable and/or executable. Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++, JavaScript, Java, Python, R, etc.

Software also includes data. However, data and instructions are not mutually-exclusive categories. In various embodiments, the instructions may be used as data in one or more operations. As another example, instructions may be derived from data.

The functional blocks and flowchart elements in this disclosure serve as software specifications, which can be translated into software by the routine work of a skilled technician or programmer.

Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5).

Software may include artificial intelligence systems, which may include machine learning or other computational intelligence. For example, artificial intelligence may include one or more models used for one or more problem domains.

When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformer (GPT).

Training a machine-learning model may include supervised learning (for example, based on labelled input data), unsupervised learning, and reinforcement learning. In various embodiments, a machine-learning model may be pre-trained by their operator or by a third party.

Problem domains include nearly any situation where structured data can be collected, and includes natural language processing (NLP), computer vision (CV), classification, image recognition, etc.

73

Architectures

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc.

In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server."

Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

All documents referenced herein are hereby incorporated by reference as if fully set forth herein.

What is claimed is:

1. A computer-implemented method of determining economic well-being geographically, the method comprising;
  receiving from a user, at a user interface of a computing device having one or more processors and a display interface, a geographical region of interest;
  receiving, at the computing device, historical observations taken over a predefined timeframe associated with image data and survey data for the geographical region;
  compiling, at the computing device, the image data and the survey data such that the image data and the survey data collectively produce unique geospatial datasets related to (i) economic information, (ii) demographic information and (iii) infrastructure information based on the historical observations;
  generating, at the computing device, a first categorical model having a first geospatial dataset related to the economic information based on the historical observations;
  generating, at the computing device, a second categorical model having a second geospatial dataset related to the demographic information based on the historical observations;

generating, at the computing device, a third categorical model having a third geospatial dataset related to infrastructure information based on the historical observations;
  displaying, graphically at the display interface, first, second and third drop down menus representing user selectable criteria related to the respective first, second and third categorical models;
  receiving, at the user interface, a user defined selection from each of the first, second and third criteria;
  generating, at the computing device and displaying on the display interface, a navigation map that displays clusters in the form of pixels that signify distinct values viewable by the user across the selected geographical region, the clusters representing geographical areas that satisfy the user defined selections from the first, second and third criteria for a previous or current timeframe;
  forecasting, at the computing device, outcomes based on the first, second and third categorical models;
  generating, at the computing device and displaying on the display interface, a prediction model map that forecasts a geographical location of growth for a future time based on the forecasted outcomes and the user defined selections from the first, second and third criteria, wherein the growth comprises at least one of economic growth and socioeconomic growth.

2. The computer-implemented method of claim 1, further comprising:
  compiling the image data and survey data such that the image data and the survey data collectively produce a unique geospatial dataset related to economic information.

3. The computer-implemented method of claim 2 wherein generating the categorical model related to economic information comprises assigning an asset wealth index (AWI) to the geospatial dataset and wherein the AWI is based on the survey data wherein the survey data comprises household surveys on economic well-being.

4. The computer-implemented method of claim 2 wherein generating the categorical model related to economic information comprises assigning economic consumption estimates to the geospatial dataset.

5. The computer-implemented method of claim 1, further comprising:
  compiling the image data and survey data such that the image data and the survey data collectively produce a unique geospatial dataset related to demographic information.

6. The computer-implemented method of claim 5 wherein generating the categorical model related to land use comprises estimating crop area within the geospatial dataset.

7. The computer-implemented method of claim 5 wherein generating the categorical model related to land use comprises estimating crop yield within the geospatial dataset.

8. The computer-implemented method of claim 1, further comprising:
  compiling the image data and survey data such that the image data and the survey data collectively produce a unique geospatial dataset related to infrastructure.

9. The computer-implemented method of claim 8 wherein generating the categorical model related to infrastructure comprises estimating electrification locations within the geospatial dataset based on a time series of illuminance values generated from the night light satellite image data.

10. The computer-implemented method of claim 1 wherein the predetermined timeframe collectively comprises:

a first range of time from a first date to a second date;

a second range of time from the second date to a third date; and a third range of time from the third date to a fourth date, wherein the first, second, third and fourth dates are sequential.

11. The computer-implemented method of claim 10 wherein the historical observations received include a first data input of historical observations associated with the first range of time and a second data input of historical observations associated with the third range of time, the computer-implemented method further comprising:

generating a third data input of historical observations associated with the second range of time based on the first and second data inputs.

12. The computer-implemented method of claim 1 wherein the historical observations associated with image data comprises satellite image data taken over the predefined timeframe.

13. The computer-implemented method of claim 12 wherein the satellite image data includes night light satellite image data.

14. The computer-implemented method of claim 13 wherein the night light satellite image data comprises visible infrared imaging radiometer suite (VIIRS).

15. The computer-implemented method of claim 12 wherein the satellite image data includes at least one of Landsat-8 multispectral satellite image data, Sentinel-2 satellite image data, and radar satellite image data.

16. The computer-implemented method of claim 12 wherein the satellite image data comprises a combination of night light satellite image data, Landsat-8 satellite image data, Sentinel-2 satellite image data and radar image data.

17. The computer-implemented method of claim 1 wherein the survey data comprises at least one of data taken over a predetermined timeframe and sourced from one of Demographic and Health Surveys (DHS), household survey data, The World Bank and Gallup, Inc.

18. The computer-implemented method of claim 1 wherein generating the categorical model comprises compiling multiple historical observations for correspondence with multiple pixels over the predefined timeframe.

19. The computer-implemented method of claim 1, further comprising;

receiving, at the computing device, population datasets related to the geographical region.

20. The computer-implemented method of claim 1 wherein the historical observations further include at least one of Open Street Map data taken over the predetermined timeframe, internet speed data taken over the predetermined timeframe, advertising data taken over the predetermined timeframe, and cellular phone data taken over the predetermined timeframe.

21. The computer-implemented method of claim 20 wherein the historical observations include cellular phone data taken over the predetermined timeframe and wherein the cellular phone data includes Econet Wireless Zimbabwe Ltd. data taken over the predetermined timeframe.

22. The computer-implemented method of claim 1 wherein the historical observations further include at least one of social media data taken over the predetermined timeframe, property data taken over the predetermined timeframe, and plant data taken over the predetermined timeframe.

23. The computer-implemented method of claim 22 wherein the historical observations include plant data taken over the predetermined timeframe and wherein plant data includes Plantix data.

24. The computer-implemented method of claim 1 wherein generating a prediction model map comprises:

identifying multiple factors related to an outcome;

determining at least one factor of the multiple factors that influences the outcome;

performing an intervention by modifying the at least one factor;

measuring the impact of the intervention on the outcome; and modifying the at least one factor to influence an alternate outcome.

25. The computer-implemented method of claim 24 wherein generating a prediction model map comprises:

identifying a first set of criteria for application to a first geographic situation having a known outcome;

identifying a second set of criteria for application to a second geographic situation having an unknown outcome; and applying the first set of criteria for the second set of criteria to influence an outcome similar to the known outcome at the second geographic location.

26. The computer-implemented method of claim 1 wherein generating a navigation map comprises at least one of generating a navigation map having 2 kilometer by 2 kilometer resolution, generating a navigation map having 1 kilometer by 1 kilometer resolution based on the economic information, and generating a navigation map having 10 meter by 10 meter resolution based on the land use.

27. A computer-implemented method of determining economic well-being geographically, the method comprising;

receiving from a user, at a user interface of a computing device having one or more processors and a display interface, a geographical region of interest;

receiving, at the computing device, historical observations taken over a predefined timeframe associated with image data and survey data for the geographical region, wherein the predetermined timeframe collectively comprises:

a first range of time from a first date to a second date;

a second range of time from the second date to a third date; and a third range of time from the third date to a fourth date, wherein the first, second, third and fourth dates are sequential, wherein the historical observations received include a first data input of historical observations associated with the first range of time and a second data input of historical observations associated with the third range of time;

generating a third data input of historical observations associated with the second range of time based on the first and second data inputs;

storing, at the computing device, the historical observations;

generating a first categorical model having a first geospatial dataset related to one of economic, demographic and infrastructure information based on the historical observations;

displaying, graphically at the display interface, a first drop down menu representing a user selectable criteria related to the first categorical model;

receiving, at the user interface, a user defined selection from the first criteria; and generating, at the computing device and displaying on the display interface, a navigation map that displays clusters in the form of pixels that signify distinct values viewable by the user across the selected geographical region, the clusters representing geographical areas that satisfy the user defined selection from the first criteria for a previous or current timeframe.

28. The computer-implemented method of claim 27, further comprising:

generating, at the computing device and displaying on the display interface, a prediction model that forecasts a geographical location of growth based on the categorical model, wherein the growth comprises at least one of economic growth and socioeconomic growth; and generating, at the computing device and displaying on the display interface, a map that displays the prediction model.

29. The computer-implemented method of claim 28 wherein generating a prediction model comprises:

identifying multiple factors related to an outcome;

determining at least one factor of the multiple factors that influences the outcome;

performing an intervention by modifying the at least one factor;

measuring the impact of the intervention on the outcome; and modifying the at least one factor to influence an alternate outcome.

30. The computer-implemented method of claim 24 wherein generating a prediction model comprises:

identifying a first set of criteria for application to a first geographic situation having a known outcome;

identifying a second set of criteria for application to a second geographic situation having an unknown outcome; and applying the first set of criteria for the second set of criteria to influence an outcome similar to the known outcome at the second geographic location.

\* \* \* \* \*